United States Patent
Chacon Simon et al.

(10) Patent No.: US 12,545,649 B2
(45) Date of Patent: Feb. 10, 2026

(54) WDR5-MYC INHIBITORS

(71) Applicant: Vanderbilt University, Nashville, TN (US)

(72) Inventors: Selena Chacon Simon, Nashville, TN (US); Alex Waterson, Nashville, TN (US); Jonathan D. MacDonald, Nashville, TN (US); Stephen Fesik, Nashville, TN (US); Shaun R. Stauffer, Brentwood, TN (US); William P. Tansey, Brentwood, TN (US)

(73) Assignee: Vanderbilt University, Nashville, TN (US)

( * ) Notice: Subject to any disclaimer, the term of this patent is extended or adjusted under 35 U.S.C. 154(b) by 885 days.

(21) Appl. No.: 17/777,686

(22) PCT Filed: Nov. 18, 2020

(86) PCT No.: PCT/US2020/060948
§ 371 (c)(1),
(2) Date: May 18, 2022

(87) PCT Pub. No.: WO2021/101927
PCT Pub. Date: May 27, 2021

(65) Prior Publication Data
US 2023/0022304 A1 Jan. 26, 2023

Related U.S. Application Data

(60) Provisional application No. 62/936,853, filed on Nov. 18, 2019.

(51) Int. Cl.
| | |
|---|---|
| *C07D 233/88* | (2006.01) |
| *C07D 231/42* | (2006.01) |
| *C07D 249/14* | (2006.01) |
| *C07D 277/54* | (2006.01) |
| *C07D 277/82* | (2006.01) |
| *C07D 401/12* | (2006.01) |
| *C07D 403/04* | (2006.01) |
| *C07D 403/06* | (2006.01) |
| *C07D 403/12* | (2006.01) |
| *C07D 405/06* | (2006.01) |

(52) U.S. Cl.
CPC ......... *C07D 233/88* (2013.01); *C07D 231/42* (2013.01); *C07D 249/14* (2013.01); *C07D 277/54* (2013.01); *C07D 277/82* (2013.01); *C07D 401/12* (2013.01); *C07D 403/04* (2013.01); *C07D 403/06* (2013.01); *C07D 403/12* (2013.01); *C07D 405/06* (2013.01)

(58) Field of Classification Search
CPC .. C07D 233/88; C07D 231/42; C07D 249/14; C07D 277/54; C07D 277/82; C07D 401/12; C07D 403/04; C07D 403/06; C07D 403/12; C07D 405/06
See application file for complete search history.

(56) References Cited

U.S. PATENT DOCUMENTS

| | | | |
|---|---|---|---|
| 5,858,924 | A | 1/1999 | Johnson et al. |
| 2018/0105504 | A1 | 4/2018 | Sutherlin et al. |
| 2022/0289673 | A1 | 9/2022 | Tansey et al. |

FOREIGN PATENT DOCUMENTS

| | | |
|---|---|---|
| DE | 3539386 A1 | 5/1987 |
| EP | 0419831 A2 | 4/1991 |
| JP | 2003292485 A | 10/2003 |
| WO | 2001090090 A1 | 11/2001 |
| WO | 2002036595 A2 | 5/2002 |
| WO | 2002085891 A1 | 10/2002 |
| WO | 2004103980 A1 | 12/2004 |
| WO | 2004112784 A1 | 12/2004 |
| WO | 2005097764 A1 | 10/2005 |
| WO | 2006051662 A1 | 5/2006 |
| WO | 2010026365 A1 | 3/2010 |
| WO | 2013064984 A1 | 5/2013 |
| WO | 2013126608 A1 | 8/2013 |
| WO | 2021021951 A1 | 2/2021 |

OTHER PUBLICATIONS

Registry No. 1517681-61-6, File Registry on STN, entered STN Jan. 12, 2014.*
Andrieu, G.; et al. Clinical Trials for BET Inhibitors Run Ahead of the Science. Drug Discovery Today: Technol. 2016, 19, 45-50.
Brand, S., et al. "Discovery of a novel class of orally active trypanocidal N-myristoyltransferase inhibitors." Journal of medicinal chemistry 55.1 (2012): 140-152.
C.T.F.A. Cosmetic Ingredient Handbook, 1992, pp. 587-592.
Chacon Simon, S., et al. "Discovery of WD repeat-containing protein 5 (WDR5)-MYC inhibitors using fragment-based methods and structure-based design." Journal of medicinal chemistry 63.8 (2020): 4315-4333.
Chen, H.; et al. Targeting Oncogenic Myc as a Strategy for Cancer Treatment. Signal Transduct. Target. Ther. 2018, 3 (1), 1-7.
Conacci-Sorrell M, et al. 2014. An overview of MYC and its interactome. Cold Spring Harbor perspectives in medicine 4: a014357.
Dang CV. 2011. Therapeutic targeting of Myc-reprogrammed cancer cell metabolism. Cold Spring Harbor symposia on quantitative biology 76: 369-374.
Delmore JE, et al. 2011. BET bromodomain inhibition as a therapeutic strategy to target c-Myc. Cell 146: 904-917.
English, J. P., et al. "Studies in Chemotherapy. XIV. Antimalarials. The Synthesis of Substituted Metanilamides and Related Compounds1." Journal of the American Chemical Society 68.6 (1946): 1039-1049.
Filippakopoulos, P.; et al. Selective Inhibition of BET Bromodomains. Nature 2010, 468 (7327), 1067-1073.

(Continued)

*Primary Examiner* — Rebecca L Anderson
(74) *Attorney, Agent, or Firm* — Michael Best & Friedrich LLP

(57) ABSTRACT

Substituted N-heteroaryl sulfonamide compounds inhibit WDR5-MYC interactions, and the compounds and their pharmaceutical compositions are useful for treating disorders and conditions in a subject such as cancer cell proliferation.

17 Claims, 4 Drawing Sheets

(56) References Cited

OTHER PUBLICATIONS

Hao, C.; et al. Structure-Based Design of 6-Chloro-4-Aminoquinazoline-2-Carboxamide Derivatives as Potent and Selective P21-Activated Kinase 4 (PAK4) Inhibitors. J. Med. Chem. 2018, 61 (1), 265-285.

Helal, C. J., et al. "Potent and cellularly active 4-aminoimidazole inhibitors of cyclin-dependent kinase 5/p25 for the treatment of Alzheimer's disease." Bioorganic & medicinal chemistry letters 19.19 (2009): 5703-5707.

Hultquist, Martin E., et al. "N-Heterocyclic benzenesulfonamides." Journal of the American Chemical Society 73.6 (1951): 2558-2566.

International Preliminary Report on Patentability for Application No. PCT/US2020/060948 dated May 17, 2022 (7 pages).

International Search Report and Written Opinion for Application No. PCT/US2020/060948 dated Mar. 18, 2021 (17 pages).

Ionescu, C. Pathways of Biotransformation—Phase II Reactions. In Drug Metabolism: Current Concepts; Caira, M. R., Eds.; Springer: Dordrecht, 2005; pp. 129-170.

Joshi, K. C., et al. "Studies in potential organo-fluorine oral hypoglycaemic agents. IV. Synthesis and hypoglycaemic activity of some 5-arylsulfonamido-1, 2, 4-triazoles." Journal für Praktische Chemie 313.1 (1971): 169-173.

Lorenzin F, Benary U, Baluapuri A, Walz S, Jung LA, von Eyss B, Kisker C, Wolf J, Eilers M, Wolf E. 2016. Different promoter affinities account for specificity in MYC-dependent gene regulation. eLife 5:e15161.

MacDonald, J. D.; et al. Discovery and Optimization of Salicylic Acid-Derived Sulfonamide Inhibitors of the WD Repeat-Containing Protein 5-MYC Protein-Protein Interaction. J. Med. Chem. 2019, 62 (24), 11232-11259.

Masuda, N., et al. "Studies of non-nucleoside HIV-1 reverse transcriptase inhibitors. Part 2: Synthesis and structure-activity relationships of 2-cyano and 2-hydroxy thiazolidenebenzenesulfonamide derivatives." Bioorganic & medicinal chemistry 13.4 (2005): 949-961.

McCutcheon's vol. 1, Emulsifiers & Detergents, 1994, North American Edition, pp. 236-239.

Mertz, J. A.; et al. Targeting MYC Dependence in Cancer by Inhibiting BET Bromodomains. Proc. Natl. Acad. Sci. U. S. A. 2011, 108 (40), 16669-16674.

Mocanu, A. M., et al. "Optimization Study Based on Genetic Algorithms and Neural Networks Applied on an Ammidation Reaction." Revista De Chimie 63.11 (2012): 1138-1142.

Modern Pharmaceutics, Chapters 9 and 10, Banker & Rhodes, eds. (1979).

Prochownik, E. V.; Vogt, P. K. Therapeutic Targeting of Myc. Genes Cancer 2010, 1 (6), 650-659.

Pubchem-SID-214816417, Modify Date: Oct. 20, 2014 (Oct. 20, 2014) (7 pages).

Pubchem-SID-81241697, Create Date: Oct. 20, 2014 (Oct. 20, 2014) (7 pages).

Remington's Pharmaceutical Sciences, 15th Ed. 1975, pp. 335-337.

Rietjens, I. M. C. M.; et al. Cytochrome P450-Catalyzed Oxidation of Halobenzene Derivatives. Chem. Res. Toxicol. 1997, 10 (6), 629-635.

Soucek L, et al. 2013. Inhibition of Myc family proteins eradicates KRas-driven lung cancer in mice. Genes Dev 27: 504-513.

Sun Y, et al. 2015. WDR5 supports an N-Myc transcriptional complex that drives a pro-tumorigenic gene expression signature in neuroblastoma. Cancer Res. 75: 5143-5154.

Tansey WP. 2014. Mammalian MYC proteins and cancer. New Journal of Science 2014: 1-27.

Yu, C.; et al. Structure-Based Inhibitor Design for the Intrinsically Disordered Protein c-Myc. Sci. Rep. 2016, 6, 1-11.

Zhang, Q. Y., et al. "Structure-based rational quest for potential novel inhibitors of human HMG-COA reductase by combining CoMFA 3D Qsar modeling and virtual screening." Journal of Combinatorial Chemistry 9.1 (2007): 131-138.

* cited by examiner

WDR5-MYC INHIBITORS

RELATED APPLICATIONS

This patent application is the U.S. national stage entry, under 35 U.S.C. § 371, of International Application Number PCT/US2020/060948, filed Nov. 18, 2020, which claims priority to U.S. Provisional Application No. 62/936,853, filed Nov. 18, 2019, the entire contents of each of which are hereby incorporated by reference.

STATEMENT OF GOVERNMENT INTEREST

This invention was made with government support under Contract No. HHSN261200800001E, awarded by the National Institutes of Health. The government has certain rights in the invention.

TECHNICAL FIELD

The present disclosure relates to compounds, compositions, and methods for treating MYC-related cancers, such as ovarian cancer, breast cancer, colorectal cancer, pancreatic cancer, gastric cancer, stomach cancer, lung cancer, cervical cancer, uterine cancer, cancers of the blood, and cancers of the lymphatic system.

BACKGROUND

The MYC oncogenes (c-, N-, and L-MYC) encode a family of related transcription factors (hereafter "MYC") that are overexpressed in the majority of malignancies and contribute to ~100,000 cancer related deaths annually in the USA alone. MYC drives tumorigenesis by dimerizing with its obligate partner MAX to form a sequence-specific transcription factor that controls the expression of genes linked to cell growth, metabolism, proliferation, and genome instability (Tansey 2014). Unlike many oncogenes, activation of MYC is not dependent on changes to its protein sequence, but instead results from mutations that increase MYC expression, either by altering MYC gene copy number or location, or by subverting regulatory mechanisms that normally restrict MYC accumulation. The advantages of MYC overexpression to a cancer cell—together with the myriad of ways this can occur—means that increased MYC levels are common in cancer, and has led to the concept that loss of control of MYC underlies the etiology of all malignancies (Conacci-Sorrell et al. 2014).

The pervasive involvement of MYC in cancer has fueled interest in the notion that MYC can be targeted to treat malignancies. It is clear that attenuating MYC expression or activity in the context of an existing cancer promotes tumor regression in mice (Conacci-Sorrell et al. 2014), even in cases where MYC is not the primary oncogenic driver (Soucek et al. 2013). A number of strategies have been developed to mitigate MYC overexpression in cancer (Delmore et al. 2011), or to interfere with processes hijacked by MYC in the malignant state (Dang 2011), but in terms of directly blocking MYC function, there appears to be few if any viable options. Indeed, the obvious route to direct MYC inhibition—disrupting interaction with MAX—is daunting, as the MYC:MAX interface is large and tight, and not readily amenable to inhibition by drug-like molecules. Accordingly, there exists a need for small molecule modulators of MYC that selectively interact with and disrupt the oncogenic activity of MYC.

Recently, it emerged that target gene recognition by MYC does not solely depend on the DNA-binding characteristics of MYC:MAX dimers, and that additional factors can facilitate MYC recruitment to chromatin. Modeling reveals that upwards of 90% of MYC binding events cannot be accounted for in terms of the affinity of MYC:MAX dimers for DNA (Lorenzin et al. 2016), and that even weak interactions ($K_i$~10 µM) with chromatin resident-proteins could stabilize MYC:MAX dimers and explain MYC binding patterns observed in vivo. If the factors that facilitate recruitment of MYC to chromatin can be identified, they could serve as novel therapeutic targets for blocking this basic MYC function in cancer cells. One such factor that facilitates recruitment of MYC to chromatin is the WD40-repeat protein WDR5 (Thomas et al. 2015).

WD40-repeat proteins are a ubiquitous family of scaffolding proteins, containing β-propeller domains that form donut-shaped structures which participate in many multi-protein complexes. WDR5 scaffolds the assembly of protein complexes related to chromatin structure and epigenetic modifications. Like most WD40-repeat proteins, WDR5 is involved in many direct and indirect protein-protein interactions, but all known direct partners of WDR5 interact through one of two sites, referred to as the "WDR5-interaction" (WIN) site and the "WDR5 binding motif" (WBM) site.

The interaction of c-MYC and L-MYC with the WBM site of WDR5 has been previously described (Thomas et al., 2015), and it has been further reported that WDR5 is a crucial partner in the facilitated recruitment of MYC to chromatin. N-MYC also binds WDR5 (Sun et al. 2015). Co-immunoprecipitation and X-ray crystallography confirmed that WDR5 binds to the central-portion of MYC via the conserved 'MYC box' MbIIIb motif that is invariant in all MYC proteins throughout evolution. Within MbIIIb is a consensus WBM (sequence "EEIDVV") that engages the shallow hydrophobic WBM site on WDR5. Mutations in MYC that disrupt interaction with WDR5 disrupt binding of MYC to chromatin and disable its tumorigenic potential in mice, defining the MYC-WDR5 interaction as critical for MYC-driven cancer. The identification of WDR5 as a universal MYC co-factor, and the characterization of a defined WDR5-MYC interaction site, presents a potentially tractable target for small molecule inhibition of MYC-driven tumors.

SUMMARY

Disclosed herein are inhibitors or disruptors of the WDR5-MYC protein-protein interaction. The inhibitors can be compounds of formula (I). Compounds of formula (I) may bind to the WBM site of WDR5 and prevent MYC from binding to WDR5. Targeting the WBM site of WDR5 with a small molecule inhibitor may disrupt the association of MYC with WDR5 and block MYC's recruitment to key target genes required for the onset or maintenance of the tumorigenic state. As a result, inhibitors of the WDR5-MYC protein-protein interaction can result in inhibition of oncogenic processes governed by MYC and provide therapeutic benefits for cancers caused by MYC dysregulation. Overexpression and dysregulation of MYC has been implicated in a number of different cancers including, but not limited to, ovarian cancer, breast cancer, colorectal cancer, pancreatic cancer, gastric cancer, uterine cancer, and cancers of the blood. Accordingly, compounds of formula (I) can be used to treat cancers associated with MYC by preventing association of MYC with WDR5.

In one aspect, disclosed are compounds of formula (I), or pharmaceutically acceptable salts thereof,

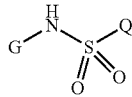
(I)

wherein
G is
(a) a 5-membered heteroaryl containing 2-3 ring nitrogen heteroatoms, the heteroaryl being optionally substituted with 1-3 $R^1$ substituents;

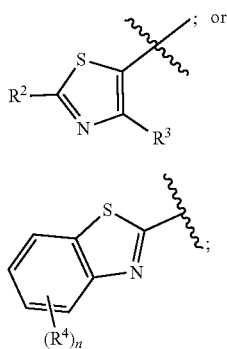

Q is

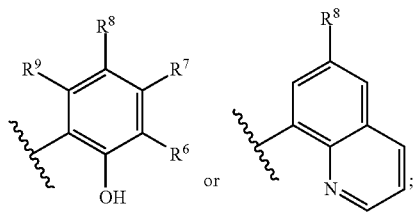

$R^1$, $R^2$, $R^3$, and $R^4$, at each occurrence, are independently $C_{1-8}$alkyl, $C_{1-8}$haloalkyl, halogen, $X^1$, —$C_{1-6}$alkylene-$X^1$, $G^1$, —$C_{1-6}$alkylene-$G^1$, —CH($G^1$)$_2$, or -$G^1$-$G^2$;
$X^1$ is cyano, nitro, —$OR^b$, —$N(R^b)_2$, —$C(O)R^b$, —$SR^b$, —$SOR^a$, —$SO_2R^a$, —$C(O)OR^b$, —$C(O)N(R^b)_2$, —$SO_2N(R^b)_2$, —$N(R^b)C(O)R^b$, —$N(R^b)C(O)OR^b$, —$N(R^b)C(O)N(R^b)_2$, or —$N(R^b)SO_2R^a$;
$R^a$, at each occurrence, is independently $C_{1-8}$alkyl, $C_{1-8}$haloalkyl, $G^1$, —$C_{1-6}$alkylene-$G^1$, —CH($G^1$)$_2$, or -$G^1$-$G^2$,
$R^b$, at each occurrence, is independently hydrogen, $C_{1-8}$alkyl, $C_{1-8}$haloalkyl, $G^1$, —$C_{1-6}$alkylene-$G^1$, —CH($G^1$)$_2$, or -$G^1$-$G^2$,
$G^1$ and $G^2$, at each occurrence, are independently a 6- to 12-membered aryl, a $C_{3-12}$carbocyclyl, a 4- to 12-membered heterocyclyl, or a 5- to 12-membered heteroaryl, wherein $G^1$ and $G^2$ are independently optionally substituted with 1-5 substituents independently selected from the group consisting of halogen, $C_{1-4}$alkyl, $C_{1-4}$haloalkyl, oxo, $X^2$, and —$C_{1-6}$alkylene-$X^2$;
$X^2$ is cyano, —$OR^{10}$, —$N(R^{10})_2$, —$C(O)R^{10}$, —$SR^{10}$, —$SOR^{10}$, —$SO_2R^{10}$, —$C(O)OR^{10}$, —$C(O)N(R^{10})_2$, —$SO_2N(R^{10})_2$, —$N(R^{10})C(O)R^{10}$, —$N(R^{10})C(O)OR^{10}$, —$N(R^{10})C(O)N(R^{10})_2$, or —$N(R^{10})SO_2R^{10}$;
$R^{10}$ is hydrogen, $C_{1-4}$alkyl, —$C_{1-4}$haloalkyl, $C_{3-6}$cycloalkyl, or —$C_{1-3}$alkylene-$C_{3-6}$cycloalkyl, wherein alternatively two $R^{10}$, together with a common nitrogen to which they attach, form a 4- to 8-membered heterocyclyl optionally substituted with 1-4 substituents independently selected from the group consisting of halogen, $C_{1-4}$alkyl, $C_{1-4}$haloalkyl, and oxo;
n is 0, 1, 2, 3, or 4;
$R^6$ is hydrogen, halogen, cyano, C(O)OH, $SF_5$, $NO_2$, $C_{1-4}$alkyl, $C_{1-4}$haloalkyl, —$OC_{1-4}$alkyl, —$OC_{1-4}$haloalkyl, —$C_{1-6}$alkylene-OH, —$C_{1-6}$alkylene-$OC_{1-4}$alkyl, $C_{3-6}$cycloalkyl, or a 4- to 7-membered heterocyclyl, wherein the cycloalkyl and heterocyclyl are optionally substituted with 1-4 substituents independently selected from the group consisting of halogen, cyano, $C_{1-4}$alkyl, and $C_{1-4}$haloalkyl; and
$R^7$, $R^8$, and $R^9$ are independently hydrogen, halogen, cyano, $SF_5$, $NO_2$, $C_{1-4}$alkyl, $C_{1-4}$haloalkyl, —$OC_{1-4}$alkyl, —$OC_{1-4}$haloalkyl, or $C_{3-6}$cycloalkyl;
provided the compound of formula (I) is not
3,5-dichloro-2-hydroxy-N-(1,3,5-trimethyl-1H-pyrazol-4-yl)-benzenesulfonamide;
2-hydroxy-5-methyl-3-[[[1-(1-methylethyl)-1H-pyrazol-3-yl]amino]sulfonyl]-benzoic acid;
3-[[(1,5-dimethyl-1H-1,2,3-triazol-4-yl)amino]sulfonyl]-2-hydroxy-5-methyl-benzoic acid;
3-[[(4-cyano-1-methyl-1H-pyrazol-3-yl)amino]sulfonyl]-2-hydroxy-5-methyl-benzoic acid;
3-[[(5-ethyl-1-methyl-1H-pyrazol-3-yl)amino]sulfonyl]-2-hydroxy-5-methyl-benzoic acid;
N-(1-cyclopentyl-5-methyl-1H-pyrazol-4-yl)-2-hydroxy-5-(trifluoromethyl)-benzenesulfonamide;
N-(1-cyclopentyl-5-methyl-1H-pyrazol-4-yl)-2-hydroxy-5-methoxy-benzenesulfonamide;
N-[1-(2-fluorophenyl)-5-methyl-1H-pyrazol-4-yl]-2-hydroxy-5-(trifluoromethyl)-benzenesulfonamide;
2-hydroxy-N-[1-(2-methylpropyl)-1H-pyrazol-4-yl]-5-(trifluoromethyl)-benzenesulfonamide;
2-hydroxy-5-methyl-N-(1-methyl-1H-pyrazol-3-yl)-benzenesulfonamide;
2-hydroxy-5-methyl-N-[1-(phenylmethyl)-1H-pyrazol-4-yl]-benzenesulfonamide;
N-(1-ethyl-1H-pyrazol-4-yl)-2-hydroxy-5-methyl-benzenesulfonamide;
2-hydroxy-5-methyl-N-[1-(phenylmethyl)-1H-pyrazol-3-yl]-benzenesulfonamide;
2-hydroxy-5-methyl-3-[[(1-methyl-1H-pyrazol-4-yl)amino]sulfonyl]-benzoic acid;
3-[[(1-ethyl-1H-pyrazol-4-yl)amino]sulfonyl]-2-hydroxy-5-methyl-benzoic acid;
N-[3,5-dimethyl-1-(1-methylethyl)-1H-pyrazol-4-yl]-2-hydroxy-5-methyl-benzenesulfonamide;
3,5-dichloro-2-hydroxy-N-[1-methyl-5-(methylthio)-1H-1,2,4-triazol-3-yl]-benzenesulfonamide;
3,5-dichloro-2-hydroxy-N-[1-methyl-3-(2-thienyl)-1H-pyrazol-5-yl]-benzenesulfonamide;
3,5-dichloro-2-hydroxy-N-(3-methyl-1-phenyl-1H-pyrazol-5-yl)-benzenesulfonamide; or
3,5-dichloro-2-hydroxy-N-(1-methyl-1H-pyrazol-5-yl)-benzenesulfonamide.
In another aspect, the invention provides a pharmaceutical composition comprising a compound of formula (I), or a pharmaceutically acceptable salt thereof, and a pharmaceutically acceptable carrier.

In another aspect, the invention provides a method for the treatment of cancer, comprising administering to a subject in need thereof a therapeutically effective amount of a compound of formula (I), or a pharmaceutically acceptable salt or composition thereof.

In another aspect, the invention provides a method for inhibiting the binding of MYC to WDR5, comprising administering to a subject in need thereof a therapeutically effective amount of a compound of formula (I), or a pharmaceutically acceptable salt or composition thereof.

In another aspect, the invention provides a compound of formula (I), or a pharmaceutically acceptable salt or composition thereof, for use in the treatment of cancer.

In another aspect, the invention provides a compound of formula (I), or a pharmaceutically acceptable salt or composition thereof, for use in the inhibition of binding of MYC to WDR5.

In another aspect, the invention provides the use of a compound of formula (I), or a pharmaceutically acceptable salt or composition thereof, in the manufacture of a medicament for the treatment of cancer.

In another aspect, the invention provides the use of a compound of formula (I), or a pharmaceutically acceptable salt or composition thereof, in the manufacture of a medicament for the inhibition of binding of MYC to WDR5.

In another aspect, the invention provides a kit comprising a compound of formula (I), or a pharmaceutically acceptable salt or composition thereof, and instructions for use.

DETAILED DESCRIPTION

1. Definitions

Figure 1:
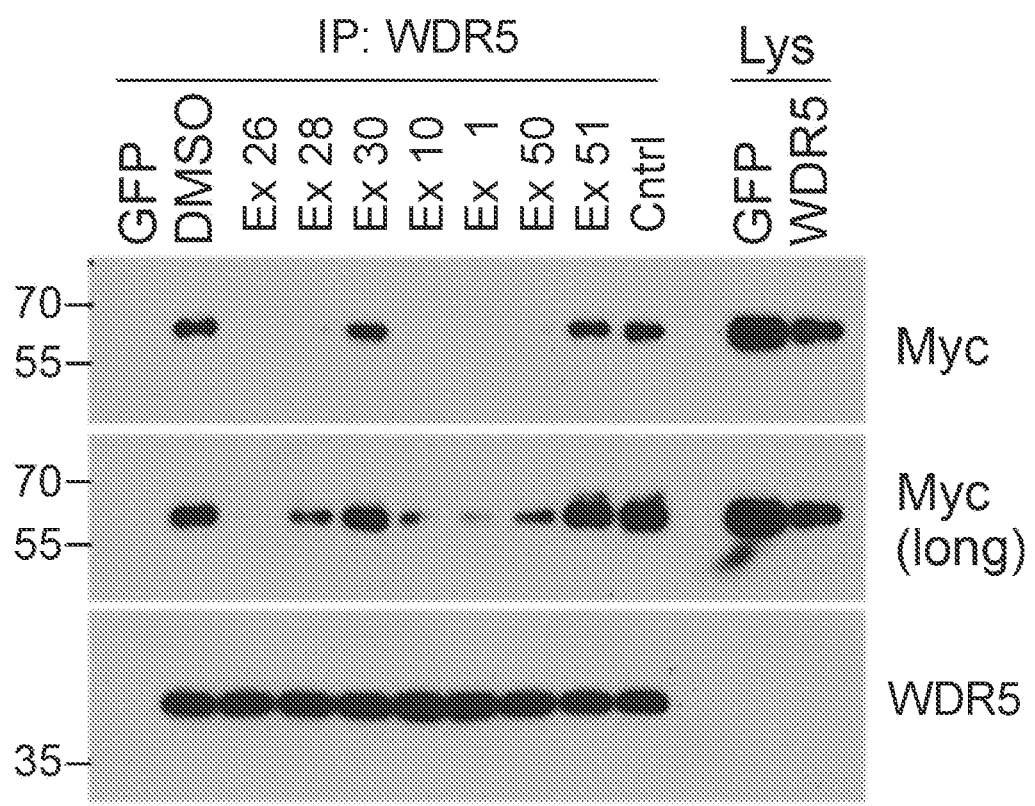
FIG. 1 shows the inhibition of binding between MYC and WDR5 in cell lysates for selected example compounds at a concentration of 50 μM, as described in Biological Example 2.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an," and "the" include plural references unless the context clearly dictates otherwise. The present disclosure also contemplates other embodiments "comprising," "consisting of," and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The term "alkyl," as used herein, means a straight or branched, saturated hydrocarbon chain. The term "lower alkyl" or "$C_{1-6}$alkyl" means a straight or branched chain hydrocarbon containing from 1 to 6 carbon atoms. The term "$C_{1-4}$alkyl" means a straight or branched chain saturated hydrocarbon containing from 1 to 4 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkenyl," as used herein, means a straight or branched, hydrocarbon chain containing at least one carbon-carbon double bond.

The term "alkylene," as used herein, refers to a divalent group derived from a straight or branched saturated chain hydrocarbon, for example, of 1 to 6 carbon atoms. Representative examples of alkylene include, but are not limited to, —CH$_2$CH$_2$—, —CH$_2$CH$_2$CH$_2$—, —CH$_2$CH$_2$CH$_2$CH$_2$—, and —CH$_2$CH$_2$CH$_2$CH$_2$CH$_2$—.

The term "alkenylene," as used herein, refers to a divalent group derived from a straight or branched chain hydrocarbon having at least one carbon-carbon double bond The term "aryl," as used herein, refers to a phenyl or a phenyl appended to the parent molecular moiety and fused to a cycloalkane group (e.g., the aryl may be indan-4-yl), fused to a 6-membered arene group (i.e., the aryl is naphthyl), or fused to a non-aromatic heterocycle (e.g., the aryl may be benzo[d][1,3]dioxol-5-yl). The term "phenyl" is used when referring to a substituent and the term 6-membered arene is used when referring to a fused ring. The 6-membered arene is monocyclic (e.g., benzene or benzo).

The aryl may be monocyclic (phenyl) or bicyclic (e.g., a 9- to 12-membered fused bicyclic system).

The term "cycloalkyl" or "cycloalkane," as used herein, refers to a saturated ring system containing all carbon atoms as ring members and zero double bonds. The term "cycloalkyl" is used herein to refer to a cycloalkane when present as a substituent. A cycloalkyl may be a monocyclic cycloalkyl (e.g., cyclopropyl), a fused bicyclic cycloalkyl (e.g., decahydronaphthalenyl), or a bridged cycloalkyl in which two non-adjacent atoms of a ring are linked by an alkylene bridge of 1, 2, 3, or 4 carbon atoms (e.g., bicyclo[2.2.1]heptanyl). Representative examples of cycloalkyl include, but are not limited to, cyclopropyl, cyclobutyl, cyclopentyl, cyclohexyl, cycloheptyl, cyclooctyl, cyclononyl, cyclodecyl, adamantyl, and bicyclo[1.1.1]pentanyl.

The term "cycloalkenyl" or "cycloalkene," as used herein, means a non-aromatic monocyclic or multicyclic ring system containing all carbon atoms as ring members and at least one carbon-carbon double bond and preferably having from 5-10 carbon atoms per ring. The term "cycloalkenyl" is used herein to refer to a cycloalkene when present as a substituent. A cycloalkenyl may be a monocyclic cycloalkenyl (e.g., cyclopentenyl), a fused bicyclic cycloalkenyl (e.g., octahydronaphthalenyl), or a bridged cycloalkenyl in which two non-adjacent atoms of a ring are linked by an alkylene bridge of 1, 2, 3, or 4 carbon atoms (e.g., bicyclo[2.2.1]heptenyl). Exemplary monocyclic cycloalkenyl rings include cyclopentenyl, cyclohexenyl or cycloheptenyl.

The term "carbocyclyl" means a "cycloalkyl" or a "cycloalkenyl." The term "carbocycle" means a "cycloalkane" or a "cycloalkene." The term "carbocyclyl" refers to a "carbocycle" when present as a substituent.

The term "fluoroalkyl," as used herein, means an alkyl group, as defined herein, in which one, two, three, four, five, six, seven or eight hydrogen atoms are replaced by fluorine. Representative examples of fluoroalkyl include, but are not limited to, 2-fluoroethyl, 2,2,2-trifluoroethyl, trifluoromethyl, difluoromethyl, pentafluoroethyl, and trifluoropropyl such as 3,3,3-trifluoropropyl.

The term "halogen" or "halo," as used herein, means Cl, Br, I, or F.

The term "haloalkyl," as used herein, means an alkyl group, as defined herein, in which one, two, three, four, five, six, seven or eight hydrogen atoms are replaced by a halogen.

The term "heteroaryl," as used herein, refers to an aromatic monocyclic heteroatom-containing ring (monocyclic heteroaryl) or a bicyclic ring system containing at least one monocyclic heteroaromatic ring (bicyclic heteroaryl). The term "heteroaryl" is used herein to refer to a heteroarene when present as a substituent. The monocyclic heteroaryl are five or six membered rings containing at least one heteroatom independently selected from the group consisting of N, O and S (e.g. 1, 2, 3, or 4 heteroatoms independently selected from O, S, and N). The five membered aromatic monocyclic rings have two double bonds and the six membered aromatic monocyclic rings have three double bonds. The bicyclic heteroaryl is an 8- to 12-membered ring system and includes a fused bicyclic heteroaromatic ring system (i.e., 10n electron system) such as a monocyclic heteroaryl ring fused to a 6-membered arene (e.g., quinolin-4-yl, indol-1-yl), a monocyclic heteroaryl ring fused to a monocyclic heteroarene (e.g., naphthyridinyl), and a phenyl fused to a monocyclic heteroarene (e.g., quinolin-5-yl, indol-4-yl). A bicyclic heteroaryl/heteroarene group includes a 9-membered fused bicyclic heteroaromatic ring system having four double bonds and at least one heteroatom contributing a lone electron pair to a fully aromatic 10π electron system, such as ring systems with a nitrogen atom at the ring junction (e.g., imidazopyridine) or a benzoxadiazolyl. A bicyclic heteroaryl also includes a fused bicyclic ring system composed of one heteroaromatic ring and one non-aromatic ring such as a monocyclic heteroaryl ring fused to a monocyclic carbocyclic ring (e.g., 6,7-dihydro-5H-cyclopenta[b]pyridinyl), or a monocyclic heteroaryl ring fused to a monocyclic heterocycle (e.g., 2,3-dihydrofuro[3,2-b]pyridinyl). The bicyclic heteroaryl is attached to the parent molecular moiety at an aromatic ring atom. Other representative examples of heteroaryl include, but are not limited to, indolyl (e.g., indol-1-yl, indol-2-yl, indol-4-yl), pyridinyl (including pyridin-2-yl, pyridin-3-yl, pyridin-4-yl), pyrimidinyl, pyrazinyl, pyridazinyl, pyrazolyl (e.g., pyrazol-4-yl), pyrrolyl, benzopyrazolyl, 1,2,3-triazolyl (e.g., triazol-4-yl), 1,3,4-thiadiazolyl, 1,2,4-thiadiazolyl, 1,3,4-oxadiazolyl, 1,2,4-oxadiazolyl, imidazolyl, thiazolyl (e.g., thiazol-4-yl), isothiazolyl, thienyl, benzimidazolyl (e.g., benzimidazol-5-yl), benzothiazolyl, benzoxazolyl, benzoxadiazolyl, benzothienyl, benzofuranyl, isobenzofuranyl, furanyl, oxazolyl, isoxazolyl, purinyl, isoindolyl, quinoxalinyl, indazolyl (e.g., indazol-4-yl, indazol-5-yl), quinazolinyl, 1,2,4-triazinyl, 1,3,5-triazinyl, isoquinolinyl, quinolinyl, imidazo[1,2-a]pyridinyl (e.g., imidazo[1,2-a]pyridin-6-yl), naphthyridinyl, pyridoimidazolyl, thiazolo[5,4-b]pyridin-2-yl, and thiazolo[5,4-d]pyrimidin-2-yl.

The term "heterocycle" or "heterocyclic," as used herein, means a monocyclic heterocycle, a bicyclic heterocycle, or a tricyclic heterocycle. The term "heterocyclyl" is used herein to refer to a heterocycle when present as a substituent. The monocyclic heterocycle is a three-, four-, five-, six-, seven-, or eight-membered ring containing at least one heteroatom independently selected from the group consisting of O, N, and S. The three- or four-membered ring contains zero or one double bond, and one heteroatom selected from the group consisting of O, N, and S. The five-membered ring contains zero or one double bond and one, two or three heteroatoms selected from the group consisting of O, N and S. The six-membered ring contains zero, one or two double bonds and one, two, or three heteroatoms selected from the group consisting of O, N, and S. The seven- and eight-membered rings contains zero, one, two, or three double bonds and one, two, or three heteroatoms selected from the group consisting of O, N, and S. Representative examples of monocyclic heterocyclyls include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, 2-oxo-3-piperidinyl, 2-oxoazepan-3-yl, oxadiazolinyl, oxadiazolidinyl, oxazolinyl, oxazolidinyl, oxetanyl, oxepanyl, oxocanyl, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydrothienyl, thiadiazolinyl, thiadiazolidinyl, 1,2-thiazinanyl, 1,3-thiazinanyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a 6-membered arene, or a monocyclic heterocycle fused to a monocyclic cycloalkane, or a monocyclic heterocycle fused to a monocyclic cycloalkene, or a monocyclic heterocycle fused to a monocyclic heterocycle, or a monocyclic heterocycle fused to a monocyclic heteroarene, or a spiro heterocycle group, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. The bicyclic heterocyclyl is attached to the parent molecular moiety at a non-aromatic ring atom (e.g., indolin-1-yl). Representative examples of bicyclic heterocyclyls include, but are not limited to, chroman-4-yl, 2,3-dihydrobenzofuran-2-yl, 2,3-dihydrobenzothien-2-yl, 1,2,3,4-tetrahydroisoquinolin-2-yl, 2-azaspiro[3.3]heptan-2-yl, 2-oxa-6-azaspiro[3.3]heptan-6-yl, azabicyclo[2.2.1]heptyl (including 2-azabicyclo[2.2.1]hept-2-yl), azabicyclo[3.1.0]hexanyl (including 3-azabicyclo[3.1.0]hexan-3-yl), 2,3-dihydro-1H-indol-1-yl, isoindolin-2-yl, octahydrocyclopenta[c]pyrrolyl, octahydropyrrolopyridinyl, and tetrahydroisoquinolinyl. Tricyclic heterocycles are exemplified by a bicyclic heterocycle fused to a 6-membered arene, or a bicyclic heterocycle fused to a monocyclic cycloalkane, or a bicyclic heterocycle fused to a monocyclic cycloalkene, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-adamantane (1-azatricyclo[3.3.1.1$^{3,7}$]decane), and oxa-adamantane (2-oxatricyclo[3.3.1.1$^{3,7}$]decane). The monocyclic, bicyclic, and tricyclic heterocyclyls are connected to the parent molecular moiety at a non-aromatic ring atom.

The term "hydroxyl" or "hydroxy," as used herein, means an —OH group.

The term "hydroxyalkyl," as used herein, means at least one —OH group, is appended to the parent molecular moiety through an alkylene group, as defined herein.

Terms such as "alkyl," "cycloalkyl," "alkylene," etc. may be preceded by a designation indicating the number of atoms present in the group in a particular instance (e.g., "$C_{1-4}$alkyl," "$C_{3-6}$cycloalkyl," "$C_{1-4}$alkylene"). These designations are used as generally understood by those skilled in the art. For example, the representation "C" followed by a subscripted number indicates the number of carbon atoms present in the group that follows. Thus, "$C_3$alkyl" is an alkyl group with three carbon atoms (i.e., n-propyl, isopropyl). Where a range is given, as in "$C_{1-4}$," the members of the group that follows may have any number of carbon atoms falling within the recited range. A "$C_{1-4}$alkyl," for example, is an alkyl group having from 1 to 4 carbon atoms, however arranged (i.e., straight chain or branched).

The term "substituted" refers to a group that may be further substituted with one or more non-hydrogen substituent groups. Substituent groups may include, for example, halogen, =O (oxo), =S (thioxo), cyano, nitro, fluoroalkyl, alkoxyfluoroalkyl, fluoroalkoxy, alkyl, alkenyl, alkynyl, haloalkyl, haloalkoxy, heteroalkyl, cycloalkyl, cycloalkenyl, aryl, heteroaryl, heterocycle, cycloalkylalkyl, heteroarylalkyl, arylalkyl, hydroxy, hydroxyalkyl, alkoxy, alkoxyalkyl, alkylene, aryloxy, phenoxy, benzyloxy, amino, alkylamino, acylamino, aminoalkyl, arylamino, sulfonylamino, sulfinylamino, sulfonyl, alkylsulfonyl, arylsulfonyl, aminosulfonyl, sulfinyl, —COOH, ketone, amide, carbamate, and acyl.

For compounds described herein, groups and substituents thereof may be selected in accordance with permitted valence of the atoms and the substituents, such that the selections and substitutions result in a stable compound, e.g., which does not spontaneously undergo transformation such as by rearrangement, cyclization, elimination, etc.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Compounds

Aspects of the invention provide compounds of formula (I), wherein G and Q are as defined herein.

In the following, embodiments of the invention are disclosed. The first embodiment is denoted E1, the second embodiment is denoted E2 and so forth.

E1. A compound of formula (I), or a pharmaceutically acceptable salt thereof,

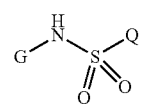

(I)

wherein
G is
(a) a 5-membered heteroaryl containing 2-3 ring nitrogen heteroatoms, the heteroaryl being optionally substituted with 1-3 $R^1$ substituents;

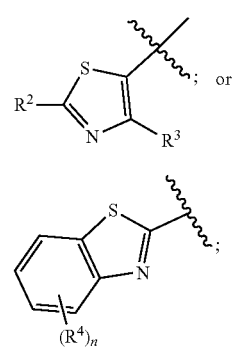

Q is

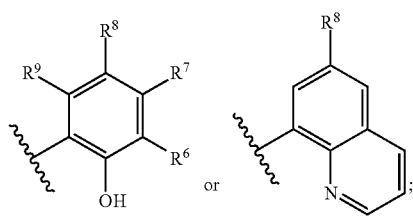

$R^1$, $R^2$, $R^3$, and $R^4$, at each occurrence, are independently $C_{1-8}$alkyl, $C_{1-8}$haloalkyl, halogen, $X^1$, —$C_{1-6}$alkylene-$X^1$, $G^1$, —$C_{1-6}$alkylene-$G^1$, —CH($G^1$)$_2$, or -$G^1$-$G^2$;

$X^1$ is cyano, nitro, —$OR^b$, —$N(R^b)_2$, —$C(O)R^b$, —$SR^b$, —$SOR^a$, —$SO_2R^a$, —$C(O)OR^b$, —$C(O)N(R^b)_2$, —$SO_2N(R^b)_2$, —$N(R^b)C(O)R^b$, —$N(R^b)C(O)OR^b$, —$N(R^b)C(O)N(R^b)_2$, or —$N(R^b)SO_2R^a$;

R$^a$, at each occurrence, is independently C$_{1-8}$alkyl, C$_{1-8}$haloalkyl, G$^1$, —C$_{1-6}$alkylene-G$^1$, —CH(G$^1$)$_2$, or -G$^1$-G$^2$, R$^b$, at each occurrence, is independently hydrogen, C$_{1-8}$alkyl, C$_{1-8}$haloalkyl, G$^1$, —C$_{1-6}$alkylene-G$^1$, —CH(G$^1$)$_2$, or -G$^1$-G$^2$, G$^1$ and G$^2$, at each occurrence, are independently a 6- to 12-membered aryl, a C$_{3-12}$carbocyclyl, a 4- to 12-membered heterocyclyl, or a 5- to 12-membered heteroaryl, wherein G$^1$ and G$^2$ are independently optionally substituted with 1-5 substituents independently selected from the group consisting of halogen, C$_{1-4}$alkyl, C$_{1-4}$haloalkyl, oxo, X$^2$, and —C$_{1-6}$alkylene-X$^2$;

X$^2$ is cyano, —OR$^{10}$, —N(R$^{10}$)$_2$, —C(O)R$^{10}$, —SR$^{10}$, —SOR$^{10}$, —SO$_2$R$^{10}$, —C(O)OR$^{10}$, —C(O)N(R$^{10}$)$_2$, —SO$_2$N(R$^{10}$)$_2$, —N(R$^{10}$)C(O)R$^{10}$, —N(R$^{10}$)C(O)OR$^{10}$, —N(R$^{10}$)C(O)N(R$^{10}$)$_2$, or —N(R$^{10}$)SO$_2$R$^{10}$;

R$^{10}$ is hydrogen, C$_{1-4}$alkyl, —C$_{1-4}$haloalkyl, C$_{3-6}$cycloalkyl, or —C$_{1-3}$alkylene-C$_{3-6}$cycloalkyl, wherein alternatively two R$^{10}$, together with a common nitrogen to which they attach, form a 4- to 8-membered heterocyclyl optionally substituted with 1-4 substituents independently selected from the group consisting of halogen, C$_{1-4}$alkyl, C$_{1-4}$haloalkyl, and oxo;

n is 0, 1, 2, 3, or 4;

R$^6$ is hydrogen, halogen, cyano, C(O)OH, SF$_5$, NO$_2$, C$_{1-4}$alkyl, C$_{1-4}$haloalkyl, —OC$_{1-4}$alkyl, —OC$_{1-4}$haloalkyl, —C$_{1-6}$alkylene-OH, —C$_{1-6}$alkylene-OC$_{1-4}$alkyl, C$_{3-6}$cycloalkyl, or a 4- to 7-membered heterocyclyl, wherein the cycloalkyl and heterocyclyl are optionally substituted with 1-4 substituents independently selected from the group consisting of halogen, cyano, C$_{1-4}$alkyl, and C$_{1-4}$haloalkyl; and R$^7$, R$^8$, and R$^9$ are independently hydrogen, halogen, cyano, SF$_5$, NO$_2$, C$_{1-4}$alkyl, C$_{1-4}$haloalkyl, —OC$_{1-4}$alkyl, —OC$_{1-4}$haloalkyl, or C$_{3-6}$cycloalkyl;

provided the compound of formula (I) is not 3,5-dichloro-2-hydroxy-N-(1,3,5-trimethyl-1H-pyrazol-4-yl)-benzenesulfonamide;

2-hydroxy-5-methyl-3-[[[1-(1-methylethyl)-1H-pyrazol-3-yl]amino]sulfonyl]-benzoic acid;

3-[[(1,5-dimethyl-1H-1,2,3-triazol-4-yl)amino]sulfonyl]-2-hydroxy-5-methyl-benzoic acid;

3-[[(4-cyano-1-methyl-1H-pyrazol-3-yl)amino]sulfonyl]-2-hydroxy-5-methyl-benzoic acid;

3-[[(5-ethyl-1-methyl-1H-pyrazol-3-yl)amino]sulfonyl]-2-hydroxy-5-methyl-benzoic acid;

N-(1-cyclopentyl-5-methyl-1H-pyrazol-4-yl)-2-hydroxy-5-(trifluoromethyl)-benzenesulfonamide;

N-(1-cyclopentyl-5-methyl-1H-pyrazol-4-yl)-2-hydroxy-5-methoxy-benzenesulfonamide;

N-[1-(2-fluorophenyl)-5-methyl-1H-pyrazol-4-yl]-2-hydroxy-5-(trifluoromethyl)-benzenesulfonamide;

2-hydroxy-N-[1-(2-methylpropyl)-1H-pyrazol-4-yl]-5-(trifluoromethyl)-benzenesulfonamide;

2-hydroxy-5-methyl-N-(1-methyl-1H-pyrazol-3-yl)-benzenesulfonamide;

2-hydroxy-5-methyl-N-[1-(phenylmethyl)-1H-pyrazol-4-yl]-benzenesulfonamide;

N-(1-ethyl-1H-pyrazol-4-yl)-2-hydroxy-5-methyl-benzenesulfonamide;

2-hydroxy-5-methyl-N-[1-(phenylmethyl)-1H-pyrazol-3-yl]-benzenesulfonamide;

2-hydroxy-5-methyl-3-[[(1-methyl-1H-pyrazol-4-yl)amino]sulfonyl]-benzoic acid;

3-[[(1-ethyl-1H-pyrazol-4-yl)amino]sulfonyl]-2-hydroxy-5-methyl-benzoic acid;

N-[3,5-dimethyl-1-(1-methylethyl)-1H-pyrazol-4-yl]-2-hydroxy-5-methyl-benzenesulfonamide;

3,5-dichloro-2-hydroxy-N-[1-methyl-5-(methylthio)-1H-1,2,4-triazol-3-yl]-benzenesulfonamide;

3,5-dichloro-2-hydroxy-N-[1-methyl-3-(2-thienyl)-1H-pyrazol-5-yl]-benzenesulfonamide;

3,5-dichloro-2-hydroxy-N-(3-methyl-1-phenyl-1H-pyrazol-5-yl)-benzenesulfonamide; or 3,5-dichloro-2-hydroxy-N-(1-methyl-1H-pyrazol-5-yl)-benzenesulfonamide.

E2. The compound of embodiment 1, or a pharmaceutically acceptable salt thereof, wherein G is the 5-membered heteroaryl containing 2-3 ring nitrogen heteroatoms.

E3. The compound of embodiment 2, or a pharmaceutically acceptable salt thereof, wherein the 5-membered heteroaryl containing 2-3 ring nitrogen heteroatoms is an imidazolyl, a pyrazolyl, or a triazolyl.

E4. The compound of embodiment 2 or 3, or a pharmaceutically acceptable salt thereof, wherein the 5-membered heteroaryl containing 2-3 ring nitrogen heteroatoms is

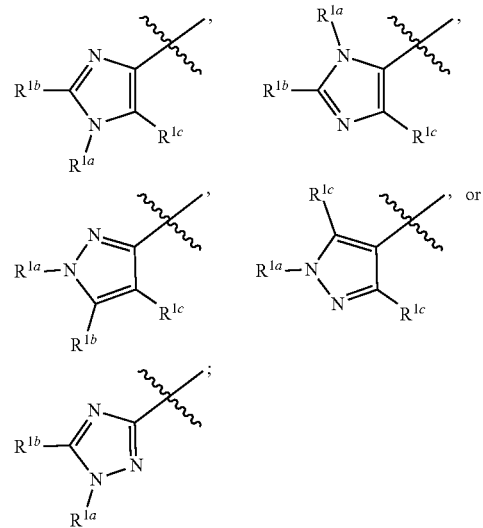

R$^{1a}$ is hydrogen, C$_{1-8}$alkyl, C$_{1-8}$haloalkyl, —C(O)R$^b$, —SO$_2$R$^a$, —C(O)OR$^b$, —C(O)N(R$^b$)$_2$, —SO$_2$N(R$^b$)$_2$, G$^1$, —C$_{1-6}$alkylene-G$^1$, —CH(G$^1$)$_2$, or -G$^1$-G$^2$;

R$^{1b}$ is hydrogen, C$_{1-8}$alkyl, C$_{1-8}$haloalkyl, cyano, halogen, nitro, —OR$^b$, —N(R$^b$)$_2$, —C(O)R$^b$, —SO$_2$R$^a$, —C(O)OR$^b$, —C(O)N(R$^b$)$_2$, —SO$_2$N(R$^b$)$_2$, —N(R$^b$)C(O)R$^b$, —N(R$^b$)C(O)OR$^b$, —N(R$^b$)C(O)N(R$^b$)$_2$, —N(R$^b$)SO$_2$R$^a$, G$^1$, —C$_{1-6}$alkylene-G$^1$, or -G$^1$-G$^2$; and R$^{1c}$ is hydrogen or C$_{1-4}$alkyl.

E5. The compound of embodiment 4, or a pharmaceutically acceptable salt thereof, wherein the 5-membered heteroaryl containing 2-3 ring nitrogen heteroatoms is

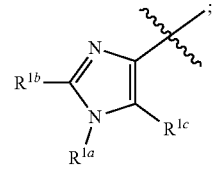

R¹ᵃ is hydrogen, C₁₋₈alkyl, C₁₋₈haloalkyl, —C(O)R^b, G¹, —C₁₋₆alkylene-G¹, or —CH(G¹)₂; and
R¹ᵇ is hydrogen, C₁₋₈alkyl, C₁₋₈haloalkyl, —C(O)R^b, —SO₂R^a, —C(O)OR^b, —C(O)N(R^b)₂, or G¹.

E6. The compound of embodiment 5, or a pharmaceutically acceptable salt thereof, wherein
R¹ᵃ is hydrogen, C₁₋₈alkyl, C₁₋₈haloalkyl, —C(O)G¹ (i.e., —C(O)R^b, where R^b is G¹), G¹, —C₁₋₆alkylene-G¹, or —CH(G¹)₂; and
R¹ᵇ is hydrogen, C₁₋₈alkyl, C₁₋₈haloalkyl, —C(O)G¹ (i.e., —C(O)R^b, where R^b is G¹), —C(O)G¹-G² (i.e., —C(O)R^b, where R^b is G¹-G²), —SO₂C₁₋₈alkyl (i.e., —SO₂R^a, where R^a is C₁₋₈alkyl), —C(O)OC₁₋₈alkyl (i.e., —C(O)OR^b, where R^b is C₁₋₈alkyl), COOH (i.e., —C(O)OR^b, where R^b is hydrogen), —C(O)NH₂ (i.e., —C(O)N(R^b)₂, where R^b is hydrogen), —C(O)NHC₁₋₈alkyl (i.e., —C(O)N(R^b)₂, where one R^b is hydrogen and one R^b is C₁₋₈alkyl), —C(O)N(C₁₋₈alkyl)₂ (i.e., —C(O)N(R^b)₂, where R^b is C₁₋₈alkyl), or G¹.

E7. The compound of embodiment 5 or 6, or a pharmaceutically acceptable salt thereof, wherein
G¹ and G² are each independently phenyl, a C₃₋₈cycloalkyl, or a 4- to 8-membered heterocyclyl, wherein G¹ and G² are independently optionally substituted with 1-5 substituents independently selected from the group consisting of halogen, cyano, C₁₋₄alkyl, C₁₋₄haloalkyl, oxo, —OR¹⁰, —N(R¹⁰)₂, —C₁₋₆alkylene-OR¹⁰, and —C₁₋₆alkylene-N(R¹⁰)₂.

E8. The compound of embodiment 4, or a pharmaceutically acceptable salt thereof, wherein
the 5-membered heteroaryl containing 2-3 ring nitrogen heteroatoms is

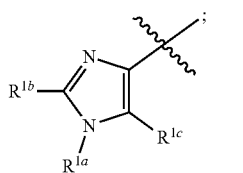

R¹ᵃ is C₁₋₈alkyl, C₁₋₈haloalkyl, C₃₋₆cycloalkyl (i.e., G¹ at R¹ᵃ is C₃₋₆cycloalkyl), —C(O)C₃₋₆cycloalkyl (i.e., —C(O)R^b, where R^b is G¹ and G¹ is C₃₋₆cycloalkyl), phenyl (i.e., G¹ at R¹ᵃ is phenyl), —CH(C₃₋₆cycloalkyl)₂ (i.e., —CH(G¹)₂, where G¹ is C₃₋₆cycloalkyl), —C₁₋₃alkylene-C₃₋₆cycloalkyl (i.e., —C₁₋₃alkylene-G¹, where G¹ is C₃₋₆cycloalkyl), or —C₁₋₃alkylene-G¹, wherein the phenyl is optionally substituted with 1-5 substituents independently selected from the group consisting of halogen, cyano, C₁₋₄alkyl, C₁₋₄haloalkyl, and —OC₁₋₄alkyl;
R¹ᵇ is hydrogen, C₁₋₈alkyl, C₁₋₈haloalkyl, —C(O)G¹ (i.e., —C(O)R^b, where R^b is G¹), —C(O)G¹-G² (i.e., —C(O)R^b, where R^b is G¹-G²), —SO₂C₁₋₈alkyl (i.e., —SO₂R^a, where R^a is C₁₋₈alkyl), —C(O)OC₁₋₈alkyl (i.e., —C(O)OR^b, where R^b is C₁₋₈alkyl), COOH (i.e., —C(O)OR^b, where R^b is hydrogen), —C(O)NH₂ (i.e., —C(O)N(R^b)₂, where R^b is hydrogen), —C(O)NHC₁₋₈alkyl (i.e., —C(O)N(R^b)₂, where one R^b is hydrogen and one R^b is C₁₋₈alkyl), —C(O)N(C₁₋₈alkyl)₂ (i.e., —C(O)N(R^b)₂, where R^b is C₁₋₈alkyl); and
G¹ and G² are each independently a 4- to 8-membered heterocyclyl, wherein G¹ and G² are independently optionally substituted with 1-5 substituents independently selected from the group consisting of C₁₋₄alkyl, C₁₋₄haloalkyl, oxo, —OR¹⁰, —N(R¹⁰)₂, —C₁₋₆alkylene-OR¹⁰, or —C₁₋₆alkylene-N(R¹⁰)₂.

E9. The compound of embodiment 4, or a pharmaceutically acceptable salt thereof, wherein the 5-membered heteroaryl containing 2-3 ring nitrogen heteroatoms is

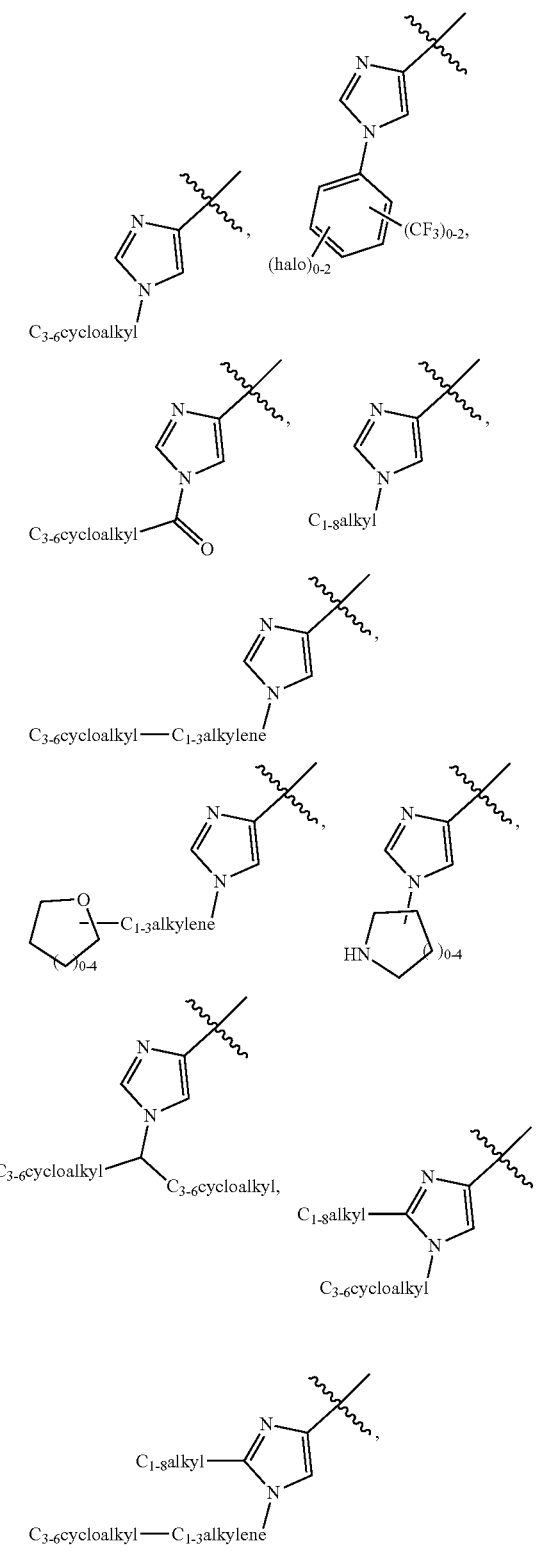

-continued
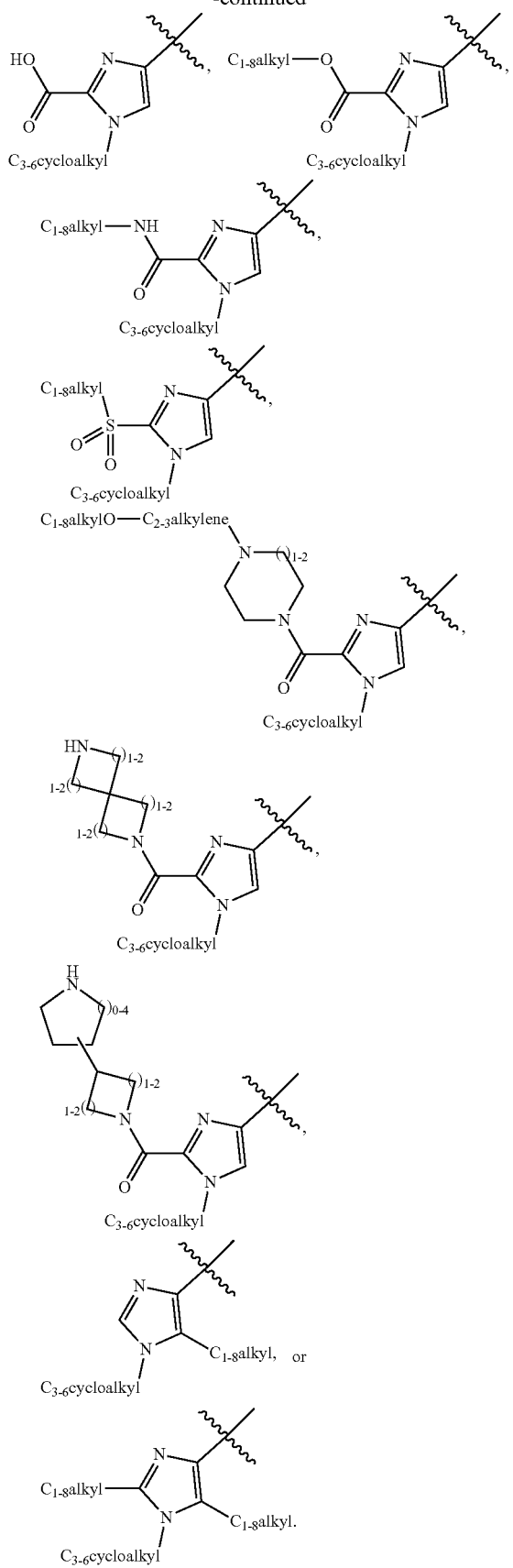
E9.1. The compound of embodiment 9, or a pharmaceutically acceptable salt thereof, wherein the 5-membered heteroaryl containing 2-3 ring nitrogen heteroatoms
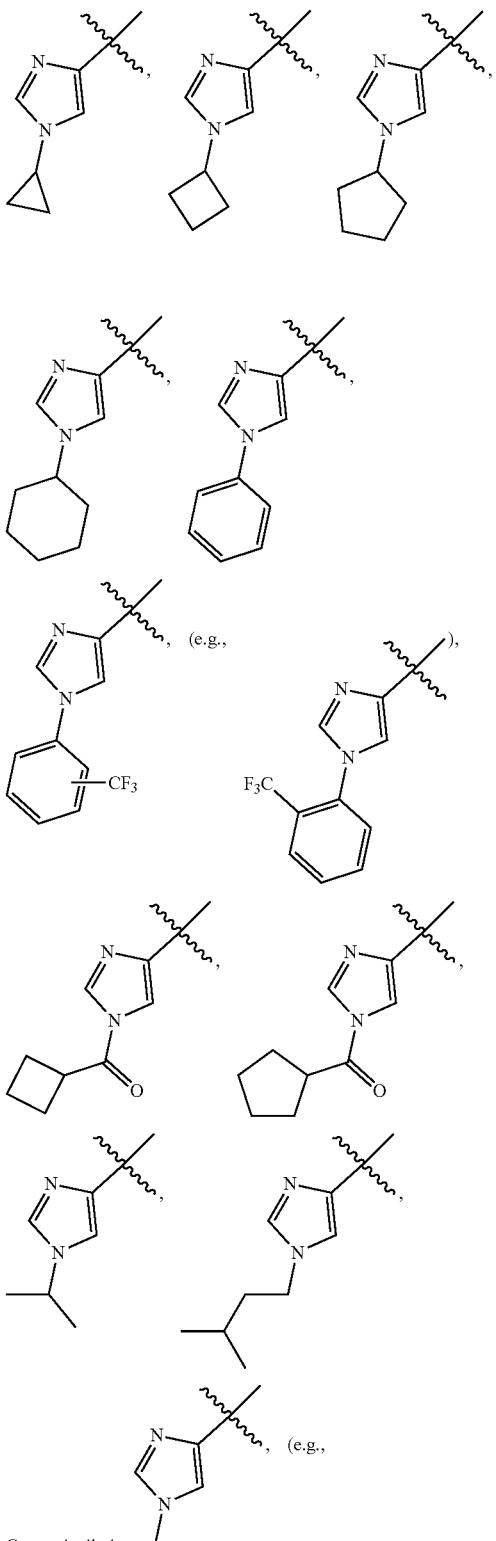

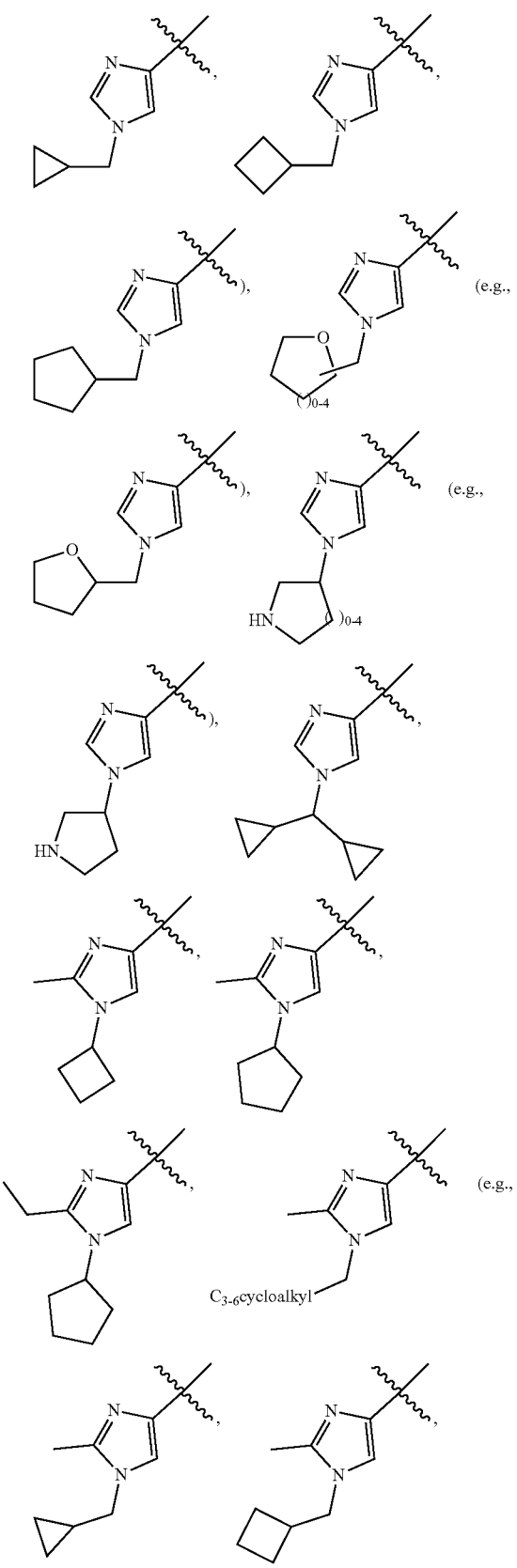
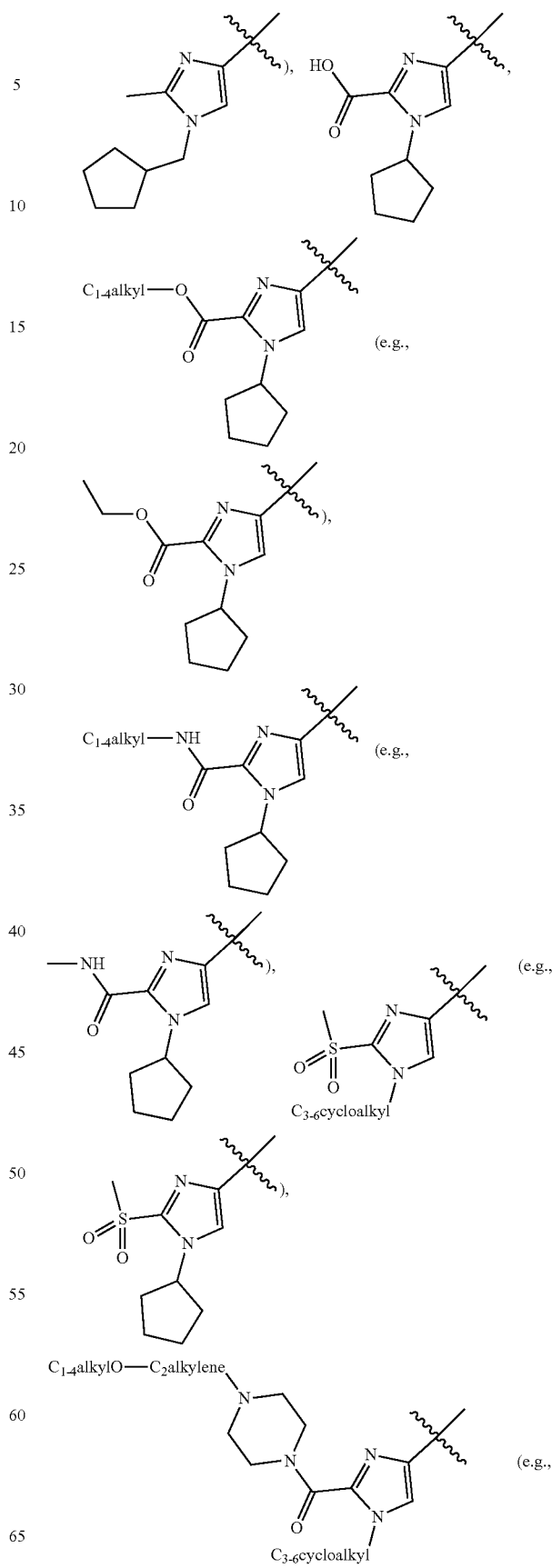

-continued

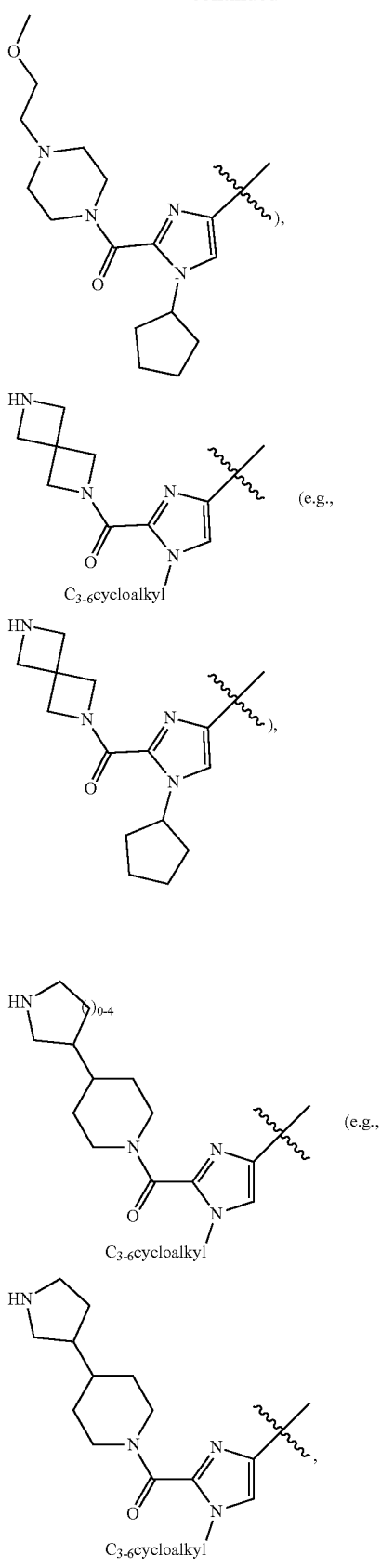

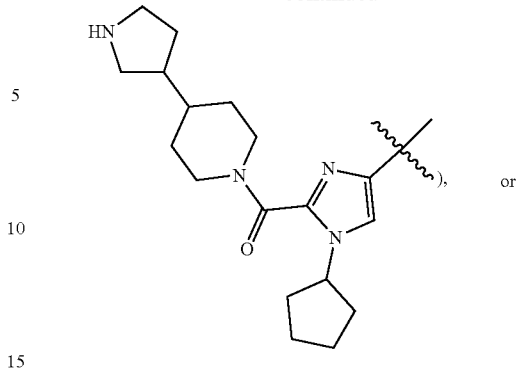

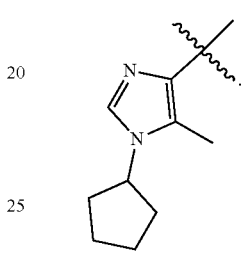

E10. The compound of embodiment 4, or a pharmaceutically acceptable salt thereof, wherein
the 5-membered heteroaryl containing 2-3 ring nitrogen heteroatoms is

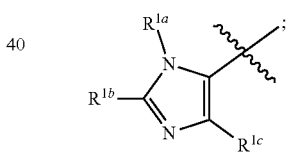

$R^{1a}$ is $G^1$ or —$C_{1-6}$alkylene-$G^1$; and
$R^{1b}$ is hydrogen, $C_{1-8}$alkyl, or $C_{1-8}$haloalkyl.

E11. The compound of embodiment 10, or a pharmaceutically acceptable salt thereof, wherein the 5-membered heteroaryl containing 2-3 ring nitrogen heteroatoms is

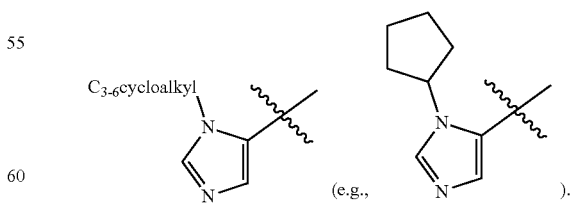

E12. The compound of embodiment 4, or a pharmaceutically acceptable salt thereof, wherein
the 5-membered heteroaryl containing 2-3 ring nitrogen heteroatoms is

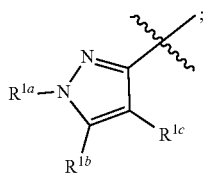

$R^{1a}$ is hydrogen, $C_{1-8}$alkyl, $C_{1-8}$haloalkyl, $G^1$, or —$C_{1-6}$alkylene-$G^1$; and $R^{1b}$ is hydrogen, $C_{1-8}$alkyl, or $G^1$.

E13. The compound of embodiment 4, or a pharmaceutically acceptable salt thereof, wherein the 5-membered heteroaryl containing 2-3 ring nitrogen heteroatoms

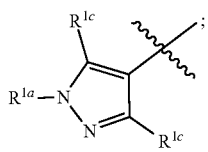

$R^{1a}$ is $C_{1-8}$alkyl, $C_{1-8}$haloalkyl, $G^1$, or —$C_{1-6}$alkylene-$G^1$; and $R^{1c}$ is hydrogen.

E14. The compound of embodiment 4, or a pharmaceutically acceptable salt thereof, wherein the 5-membered heteroaryl containing 2-3 ring nitrogen heteroatoms is

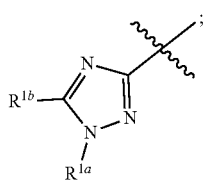

$R^{1a}$ is $C_{1-8}$alkyl, $C_{1-8}$haloalkyl, $G^1$, or —$C_{1-6}$alkylene-$G^1$; and $R^{1b}$ is hydrogen or $C_{1-8}$alkyl.

E15. The compound of any of embodiments 12-14, or a pharmaceutically acceptable salt thereof, wherein $G^1$ is phenyl, a $C_{3-8}$cycloalkyl, or a 4- to 8-membered heterocyclyl, wherein $G^1$ is independently optionally substituted with 1-5 substituents independently selected from the group consisting of halogen, cyano, $C_{1-4}$alkyl, $C_{1-4}$haloalkyl, oxo, —$OR^{10}$, —$N(R^{10})_2$, —$C_{1-6}$alkylene-$OR^{10}$, and —$C_{1-6}$alkylene-$N(R^{10})_2$.

E16. The compound of any of embodiments 12-14, or a pharmaceutically acceptable salt thereof, wherein $G^1$ is phenyl or $C_{3-8}$cycloalkyl, wherein $G^1$ is independently optionally substituted with 1-5 substituents independently selected from the group consisting of halogen, cyano, $C_{1-4}$alkyl, $C_{1-4}$haloalkyl, and —$OC_{1-4}$alkyl.

E17. The compound of embodiment 4, or a pharmaceutically acceptable salt thereof, wherein the 5-membered heteroaryl containing 2-3 ring nitrogen heteroatoms is

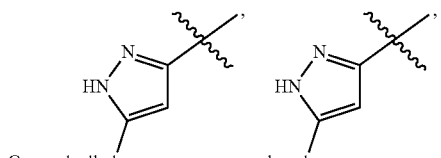

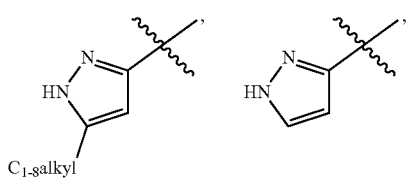

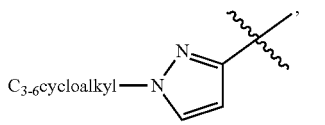

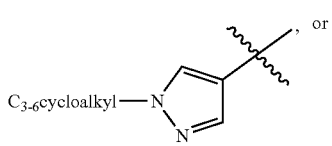

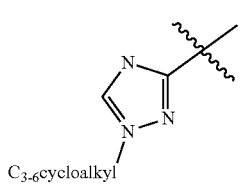

E17.1 The compound of embodiment 4, or a pharmaceutically acceptable salt thereof, wherein the 5-membered heteroaryl containing 2-3 ring nitrogen heteroatoms is

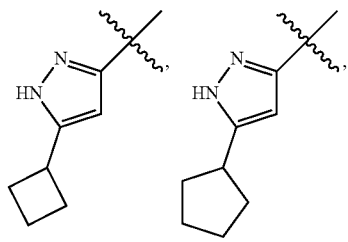

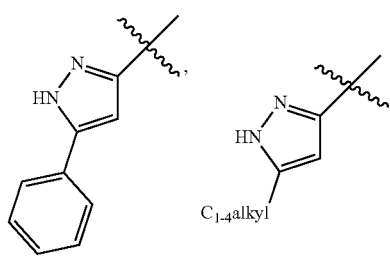

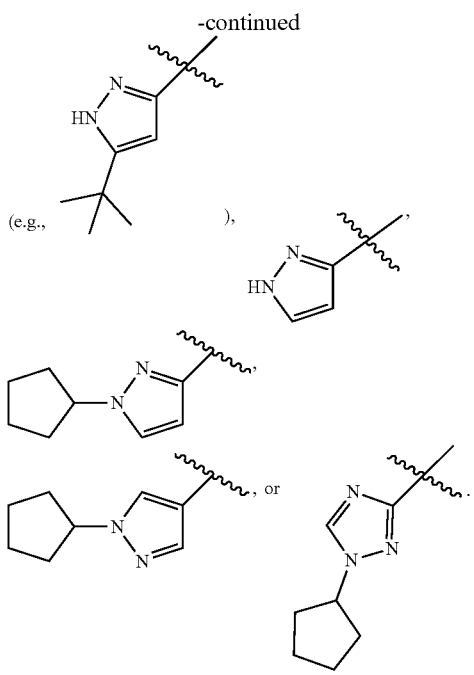

(e.g., ),

E18. The compound of embodiment 1, or a pharmaceutically acceptable salt thereof, wherein G is

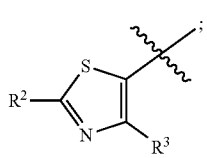

$R^2$ is $G^1$; and
$R^3$ is hydrogen.

E19. The compound of embodiment 18, or a pharmaceutically acceptable salt thereof, wherein $G^1$ is the $C_{3-12}$carbocyclyl.

E20. The compound of embodiment 19, or a pharmaceutically acceptable salt thereof, wherein $G^1$ is a $C_{3-8}$cycloalkyl or a $C_{5-8}$cycloalkenyl.

E21. The compound of embodiment 1, or a pharmaceutically acceptable salt thereof, wherein G is

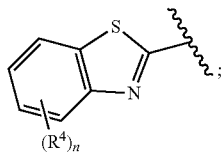

$R^4$ is $C_{1-8}$alkyl, $C_{1-8}$haloalkyl, cyano, halogen, nitro, $-OR^b$, or $-N(R^b)_2$;
$R^b$ is hydrogen, $C_{1-4}$alkyl, $C_{1-8}$haloalkyl, $G^1$, or $-C_{1-3}$alkylene-$G^1$;
$G^1$ is $C_{3-6}$cycloalkyl; and
n is 0 or 1.

E22. The compound of embodiment 1, or a pharmaceutically acceptable salt thereof, wherein G is

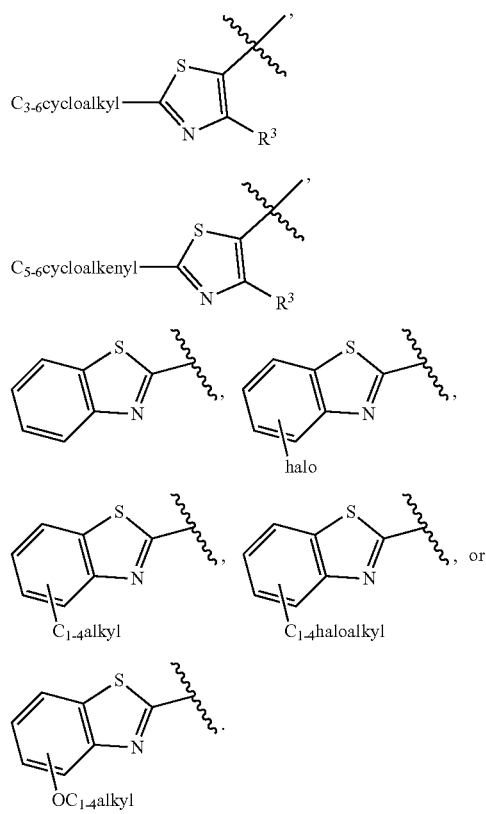

E22.1 The compound of embodiment 22, or a pharmaceutically acceptable salt thereof, wherein G is

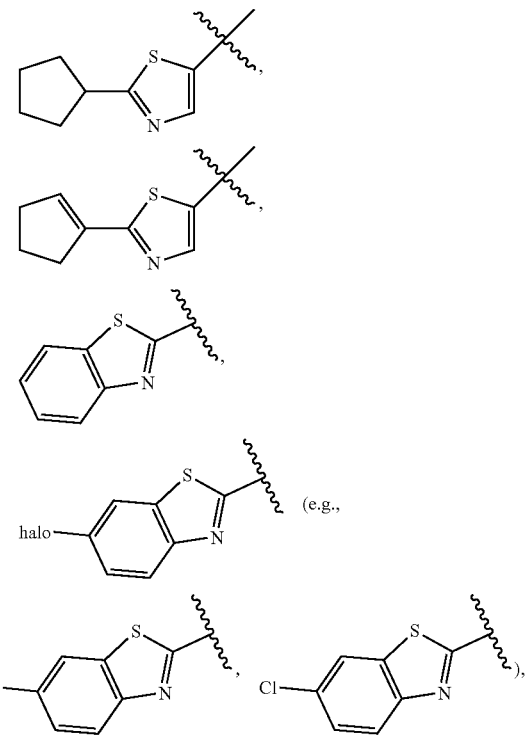

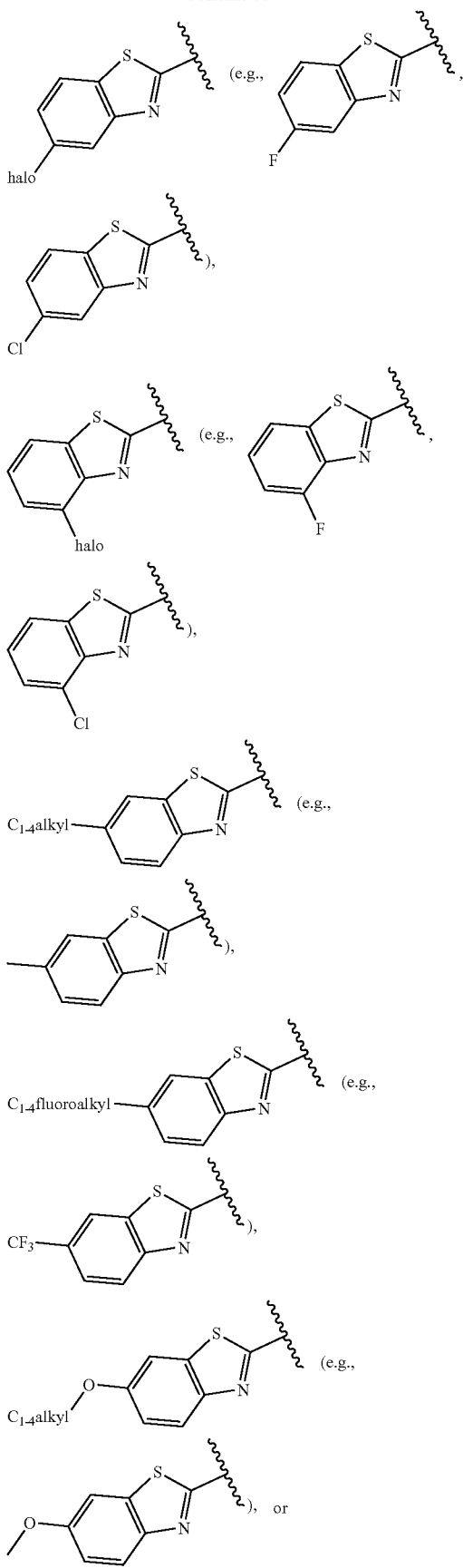

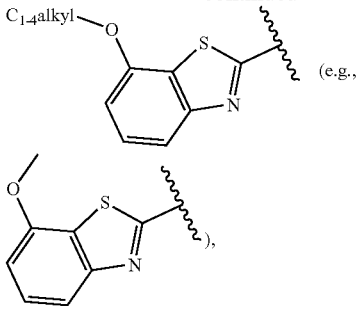

E23. The compound of any of embodiments 1-22.1, or a pharmaceutically acceptable salt thereof, wherein Q is

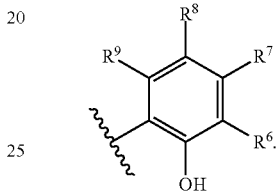

E24. The compound of embodiment 23, or a pharmaceutically acceptable salt thereof, wherein $R^7$ and $R^9$ are hydrogen.
E25. The compound of embodiment 23 or 24, or a pharmaceutically acceptable salt thereof, wherein $R^6$ and $R^8$ are halogen (e.g., choro, bromo).
E25.1 The compound of embodiment 25, or a pharmaceutically acceptable salt thereof, wherein $R^8$ is bromo.
E25.2 The compound of embodiment 25 or 25.1, or a pharmaceutically acceptable salt thereof, wherein $R^6$ is chloro.
E26. The compound of any of embodiments 1-22.1, or a pharmaceutically acceptable salt thereof, wherein Q is

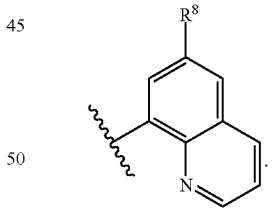

E27. The compound of embodiment 26, or a pharmaceutically acceptable salt thereof, wherein $R^8$ is halogen (e.g., choro, bromo).
E28. A compound selected from the group consisting of;
5-Bromo-3-chloro-N-(1-cyclopentyl-1H-imidazol-4-yl)-2-hydroxybenzenesulfonamide;
5-Bromo-3-chloro-N-(1-cyclobutyl-1H-imidazol-4-yl)-2-hydroxybenzenesulfonamide;
5-Bromo-3-chloro-N-(1-cyclohexyl-1H-imidazol-4-yl)-2-hydroxybenzenesulfonamide;
5-Bromo-3-chloro-N-(1-phenyl-1H-imidazol-4-yl)-2-hydroxybenzenesulfonamide;
5-Bromo-3-chloro-N-(1-(cyclopropylmethyl)-1H-imidazol-4-yl)-2-hydroxybenzenesulfonamide;

5-Bromo-3-chloro-N-(1-(cyclobutanecarbonyl)-1H-imidazol-4-yl)-2-hydroxybenzenesulfonamide;
5-Bromo-3-chloro-N-(1-(cyclopentanecarbonyl)-1H-imidazol-4-yl)-2-hydroxybenzenesulfonamide;
5-Bromo-3-chloro-N-(1-cyclopropyl-1H-imidazol-4-yl)-2-hydroxybenzenesulfonamide;
5-Bromo-3-chloro-N-(1-cyclopentyl-2-methyl-1H-imidazol-4-yl)-2-hydroxybenzenesulfonamide
5-Bromo-3-chloro-N-(1-cyclopentyl-2-ethyl-1H-imidazol-4-yl)-2-hydroxybenzenesulfonamide;
5-Bromo-3-chloro-N-(1-cyclopentyl-5-methyl-1H-imidazol-4-yl)-2-hydroxybenzenesulfonamide;
5-Bromo-3-chloro-2-hydroxy-N-(1-isopentyl-1H-imidazol-4-yl)benzenesulfonamide;
5-Bromo-3-chloro-N-(1-(cyclobutylmethyl)-1H-imidazol-4-yl)-2-hydroxybenzenesulfonamide;
5-Bromo-3-chloro-N-(1-(cyclopentylmethyl)-1H-imidazol-4-yl)-2-hydroxybenzenesulfonamide;
5-Bromo-3-chloro-2-hydroxy-N-(1-((tetrahydrofuran-2-yl)methyl)-1H-imidazol-4-yl)benzenesulfonamide;
5-Bromo-2-hydroxy-N-(1-((tetrahydrofuran-2-yl)methyl)-1H-imidazol-4-yl)benzenesulfonamide;
5-Bromo-3-chloro-N-(1-cyclobutyl-2-methyl-1-imidazol-4-yl)-2-hydroxybenzenesulfonamide;
5-Bromo-3-chloro-N-(1-(dicyclopropylmethyl)-1-imidazol-4-yl)-2-hydroxybenzenesulfonamide;
5-Bromo-3-chloro-2-hydroxy-N-(1-(2-(trifluoromethyl)phenyl)-1H-imidazol-4-yl)benzenesulfonamide;
5-Bromo-3-chloro-N-(1-(cyclopropylmethyl)-2-methyl-1H-imidazol-4-yl)-2-hydroxybenzenesulfonamide;
5-Bromo-3-chloro-N-(1-(cyclopentylmethyl)-2-methyl-1H-imidazol-4-yl)-2-hydroxybenzenesulfonamide;
5-Bromo-3-chloro-N-(1-(cyclobutylmethyl)-2-methyl-1H-imidazol-4-yl)-2-hydroxybenzenesulfonamide;
6-Bromo-N-(1-cyclopentyl-1H-imidazol-4-yl)quinoline-8-sulfonamide;
6-Bromo-N-(1-cyclopentyl-1H-imidazol-5-yl)quinoline-8-sulfonamide;
6-Bromo-N-(1-cyclopentyl-2-methyl-1H-imidazol-4-yl)quinoline-8-sulfonamide;
5-Bromo-3-chloro-N-(1-cyclopentyl-2-(methylsulfonyl)-1H-imidazol-4-yl)-2-hydroxybenzenesulfonamide;
5-Bromo-3-chloro-2-hydroxy-N-(1-isopropyl-1H-imidazol-4-yl)benzenesulfonamide;
Ethyl 4-((5-bromo-3-chloro-2-hydroxyphenyl)sulfonamido)-1-cyclopentyl-1H-imidazole-2-carboxylate;
4-((5-Bromo-3-chloro-2-hydroxyphenyl)sulfonamido)-1-cyclopentyl-1H-imidazole-2-carboxylic acid;
4-((5-Bromo-3-chloro-2-hydroxyphenyl)sulfonamido)-1-cyclopentyl-N-methyl-1H-imidazole-2-carboxamide;
5-Bromo-3-chloro-2-hydroxy-N-(1-(pyrrolidin-3-yl)-1H-imidazol-4-yl)benzenesulfonamide;
5-Bromo-N-(5-(tert-butyl)-1H-pyrazol-3-yl)-3-chloro-2-hydroxybenzenesulfonamide;
5-Bromo-3-chloro-2-hydroxy-N-(1H-pyrazol-3-yl)benzenesulfonamide;
5-Bromo-3-chloro-2-hydroxy-N-(5-cyclobutyl-1H-pyrazol-3-yl)benzenesulfonamide;
5-Bromo-3-chloro-2-hydroxy-N-(5-phenyl-1H-pyrazol-3-yl)benzenesulfonamide;
5-Bromo-3-chloro-N-(1-cyclopentyl-1H-1,2,4-triazol-3-yl)-2-hydroxybenzenesulfonamide;
N-(Benzo[d]thiazol-2-yl)-5-bromo-3-chloro-2-hydroxybenzenesulfonamide;
5-Bromo-3-chloro-N-(2-(cyclopent-1-en-1-yl)thiazol-5-yl)-2-hydroxybenzenesulfonamide;
5-Bromo-3-chloro-N-(6-methoxybenzo[d]thiazol-2-yl)-2-hydroxy-benzenesulfonamide;
5-Bromo-3-chloro-2-hydroxy-N-(6-(trifluoromethoxy)benzo[d]thiazol-2-yl)benzenesulfonamide;
5-Bromo-3-chloro-N-(6-fluorobenzo[d]thiazol-2-yl)-2-hydroxybenzenesulfonamide;
5-Bromo-3-chloro-N-(6-chlorobenzo[d]thiazol-2-yl)-2-hydroxybenzenesulfonamide;
5-Bromo-3-chloro-N-(4-chlorobenzo[d]thiazol-2-yl)-2-hydroxybenzenesulfonamide;
5-Bromo-3-chloro-N-(5-chlorobenzo[d]thiazol-2-yl)-2-hydroxybenzenesulfonamide;
5-Bromo-3-chloro-N-(6-methylbenzo[d]thiazol-2-yl)-2-hydroxybenzenesulfonamide;
5-Bromo-3-chloro-N-(7-methoxybenzo[d]thiazol-2-yl)-2-hydroxybenzenesulfonamide;
5-Bromo-3-chloro-N-(6-(trifluoromethyl)benzo[d]thiazol-2-yl)-2-hydroxybenzenesulfonamide;
5-Bromo-3-chloro-N-(5-cyclopentyl-1H-pyrazol-3-yl)-2-hydroxybenzenesulfonamide;
5-Bromo-3-chloro-N-(1-cyclopentyl-1H-pyrazol-3-yl)-2-hydroxybenzenesulfonamide;
5-Bromo-3-chloro-N-(1-cyclopentyl-1H-pyrazol-4-yl)-2-hydroxybenzenesulfonamide;
5-Bromo-3-chloro-N-(2-cyclopentylthiazol-5-yl)-2-hydroxybenzenesulfonamide;
5-Bromo-3-chloro-N-(1-cyclopentyl-2-(4-(2-methoxyethyl)piperazine-1-carbonyl)-1H-imidazol-4-yl)-2-hydroxybenzenesulfonamide;
5-Bromo-3-chloro-N-(1-cyclopentyl-2-(2,6-diazaspiro[3.3]heptane-2-carbonyl)-1H-imidazol-4-yl)-2-hydroxybenzenesulfonamide;
5-Bromo-3-chloro-N-(1-cyclopentyl-2-(4-(pyrrolidin-3-yl)piperidine-1-carbonyl)-1H-imidazol-4-yl)-2-hydroxybenzenesulfonamide;
or a pharmaceutically acceptable salt thereof.

Throughout the embodiments and description of the compounds of the invention, all instances of haloalkyl may be fluoroalkyl (e.g., any $C_{1-4}$haloalkyl may be $C_{1-4}$fluoroalkyl).

The compound may exist as a stereoisomer wherein asymmetric or chiral centers are present. The stereoisomer is "R" or "S" depending on the configuration of substituents around the chiral carbon atom. The terms "R" and "S" used herein are configurations as defined in IUPAC 1974 Recommendations for Section E, Fundamental Stereochemistry, in Pure Appl. Chem., 1976, 45: 13-30. The disclosure contemplates various stereoisomers and mixtures thereof and these are specifically included within the scope of this invention. Stereoisomers include enantiomers and diastereomers, and mixtures of enantiomers or diastereomers. Individual stereoisomers of the compounds may be prepared synthetically from commercially available starting materials, which contain asymmetric or chiral centers or by preparation of racemic mixtures followed by methods of resolution well-known to those of ordinary skill in the art. These methods of resolution are exemplified by (1) attachment of a mixture of enantiomers to a chiral auxiliary, separation of the resulting mixture of diastereomers by recrystallization or chromatography and optional liberation of the optically pure product from the auxiliary as described in Furniss, Hannaford, Smith, and Tatchell, "Vogel's Textbook of Practical Organic Chemistry", 5th edition (1989), Longman Scientific & Technical, Essex CM20 2JE, England, or (2) direct separation of the mixture of optical enantiomers on chiral chromatographic columns or (3) fractional recrystallization methods.

It should be understood that the compound may possess tautomeric forms, as well as geometric isomers, and that these also constitute an aspect of the invention.

The present disclosure also includes an isotopically-labeled compound, which is identical to those recited in formula (I), but for the fact that one or more atoms are replaced by an atom having an atomic mass or mass number different from the atomic mass or mass number usually found in nature. Examples of isotopes suitable for inclusion in the compounds of the invention are hydrogen, carbon, nitrogen, oxygen, phosphorus, sulfur, fluorine, and chlorine, such as, but not limited to $^2$H, $^3$H, $^{13}$C, $^{14}$C, $^{15}$N, $^{18}$O, $^{17}$O, $^{31}$P, $^{32}$P, $^{35}$S, $^{18}$F, and $^{36}$Cl, respectively. Substitution with heavier isotopes such as deuterium, i.e., $^2$H, can afford certain therapeutic advantages resulting from greater metabolic stability, for example increased in vivo half-life or reduced dosage requirements and, hence, may be preferred in some circumstances. The compound may incorporate positron-emitting isotopes for medical imaging and positron-emitting tomography (PET) studies for determining the distribution of receptors. Suitable positron-emitting isotopes that can be incorporated in compounds of formula (I) are $^{11}$C, $^{13}$N, $^{15}$O, and $^{18}$F. Isotopically-labeled compounds of formula (I) can generally be prepared by conventional techniques known to those skilled in the art or by processes analogous to those described in the accompanying Examples using appropriate isotopically-labeled reagent in place of non-isotopically-labeled reagent.

In the compounds of formula (I), any "hydrogen" or "H," whether explicitly recited or implicit in the structure, encompasses hydrogen isotopes $^1$H (protium) and $^2$H (deuterium).

The disclosed compounds may exist as pharmaceutically acceptable salts. The term "pharmaceutically acceptable salt" refers to salts or zwitterions of the compounds which are water or oil-soluble or dispersible, suitable for treatment of disorders without undue toxicity, irritation, and allergic response, commensurate with a reasonable benefit/risk ratio and effective for their intended use. The salts may be prepared during the final isolation and purification of the compounds or separately by reacting an amino group of the compounds with a suitable acid. For example, a compound may be dissolved in a suitable solvent, such as but not limited to methanol and water and treated with at least one equivalent of an acid, like hydrochloric acid. The resulting salt may precipitate out and be isolated by filtration and dried under reduced pressure. Alternatively, the solvent and excess acid may be removed under reduced pressure to provide a salt. Representative salts include acetate, adipate, alginate, citrate, aspartate, benzoate, benzenesulfonate, bisulfate, butyrate, camphorate, camphorsulfonate, digluconate, glycerophosphate, hemisulfate, heptanoate, hexanoate, formate, isethionate, fumarate, lactate, maleate, methanesulfonate, naphthylenesulfonate, nicotinate, oxalate, pamoate, pectinate, persulfate, 3-phenylpropionate, picrate, oxalate, maleate, pivalate, propionate, succinate, tartrate, thrichloroacetate, trifluoroacetate, glutamate, para-toluenesulfonate, undecanoate, hydrochloric, hydrobromic, sulfuric, phosphoric and the like. The amino groups of the compounds may also be quaternized with alkyl chlorides, bromides and iodides such as methyl, ethyl, propyl, isopropyl, butyl, lauryl, myristyl, stearyl, and the like.

Basic addition salts may be prepared during the final isolation and purification of the disclosed compounds by reaction of a carboxyl group with a suitable base such as the hydroxide, carbonate, or bicarbonate of a metal cation such as lithium, sodium, potassium, calcium, magnesium, or aluminum, or an organic primary, secondary, or tertiary amine. Quaternary amine salts can be prepared, such as those derived from methylamine, dimethylamine, trimethylamine, triethylamine, diethylamine, ethylamine, tributylamine, pyridine, N,N-dimethylaniline, N-methylpiperidine, N-methylmorpholine, dicyclohexylamine, procaine, dibenzylamine, N,N-dibenzylphenethylamine, 1-ephenamine and N,N'-dibenzylethylenediamine, ethylenediamine, ethanolamine, diethanolamine, piperidine, piperazine, and the like.

A. Binding to WDR5

The disclosed compounds may bind to WDR5 and prevent the association of MYC. The compounds may bind to WDR5 and prevent oncogenic processes associated with MYC.

Compounds of formula (I) can bind to WDR5 resulting in a $K_i$ ranging from about 0.01 nM to about 250 μM. The compounds may have a $K_i$ of about 250 PM, about 200 μM, about 150 μM, about 100 μM, about 90 μM, about 80 μM, about 70 μM, about 60 μM, about 50 μM, about 40 μM, about 30 μM, about 20 μM, about 10 μM, about 9 μM, about 8 μM, about 7 μM, about 6 μM, about 5 μM, about 4 μM, about 3 μM, about 2 μM, about 1 μM, about 950 nM, about 900 nM, about 850 nM, about 800 nM, about 850 nM, about 800 nM, about 750 nM, about 700 nM, about 650 nM, about 600 nM, about 550 nM, about 500 nM, about 450 nM, about 400 nM, about 350 nM, about 300 nM, about 250 nM, about 200 nM, about 150 nM, about 100 nM, about 50 nM, about 10 nM, about 5 nM, about 1 nM, about 0.3 nM, about 0.1 nM, about 0.03 nM, or about 0.01 nM. Compounds of formula (I) can bind to WDR5 resulting in a K; of less than 250 μM, less than 200 μM, less than 150 μM, less than 100 μM, less than 90 μM, less than 80 μM less than 70 μM, less than 60 μM, less than 50 μM, less than 40 μM, less than 30 μM, less than 20 μM, less than 10 μM, less than 9 μM, less than 8 μM, less than 7 μM, less than 6 μM, less than 5 μM, less than 4 μM, less than 3 μM, less than 2 μM, less than 1 μM, less than 950 nM, less than 900 nM, less than 850 nM, less than 800 nM, less than 850 nM, less than 800 nM, less than 750 nM, less than 700 nM, less than 650 nM, less than 600 nM, less than 550 nM, less than 500 nM, less than 450 nM, less than 400 nM, less than 350 nM, less than 300 nM, less than 250 nM, less than 200 nM, less than 150 nM, less than 100 nM, less than 50 nM, less than 10 nM, less than 5 nM, less than 1 nM, less than 0.3 nM, less than 0.1 nM, or less than 0.03 nM.

B. General Synthesis

Compounds of formula (I) may be prepared by synthetic processes or by metabolic processes. Preparation of the compounds by metabolic processes includes those occurring in the human or animal body (in vivo) or processes occurring in vitro.

The compounds of the present disclosure can be prepared in a number of ways well known to one skilled in the art of organic synthesis. The compounds of the present disclosure can be synthesized using the methods described below, together with synthetic methods known in the art of synthetic organic chemistry, or variations thereon as appreciated by those skilled in the art. Preferred methods include, but are not limited to, those described below. All references cited herein are hereby incorporated in their entirety by reference as to the subject matter referenced herein. Compounds of formula (I) may be also prepared by metabolic processes. Preparation of the compounds by metabolic processes includes those occurring in the human or animal body (in vivo) or processes occurring in vitro.

The compounds of the disclosure may be prepared using the exemplary reactions and techniques described in this section. The reactions are performed in solvents appropriate to the reagents and materials employed and are suitable for the transformations being effective. Also, in the description of the synthetic methods described below, it is to be understood that all proposed reaction conditions, including solvent, reaction atmosphere, reaction temperature, duration of the experiment, and workup procedures, are chosen to be the conditions standard for that reaction, which should be readily recognized by one skilled in the art. One having ordinary skill in the art may adjust one or more of the conditions described herein. One skilled in the art of organic synthesis understands that the functionality present on various portions of the edict molecule must be compatible with the reagents and reactions proposed. Not all compounds of the disclosure falling into a given class may be compatible with some of the reaction conditions required in some of the methods described. Such restrictions to the substituents, which are compatible with the reaction conditions, will be readily apparent to one skilled in the art and alternate methods can be used.

Compounds of the current invention can be readily synthesized using a number of techniques known to those of skill in the art. In one convenient procedure, compounds of the current invention can be prepared by reacting an appropriately substituted heterocyclic amine with an appropriately substituted sulfonyl chloride in an appropriate solvent, such as dichloromethane, tetrahydrofuran, or the like, and using an appropriate base, such as pyridine, triethyl amine, diisopropylethyl amine, or the like. This procedure is shown in Scheme 1 and exemplified by General Procedure A.

Scheme 1. Sulfonamide coupling.

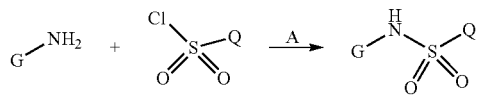

General Procedure A (Sulfonamide Coupling). To a solution containing the corresponding aniline (1 eq), sulfonyl chloride (1.2-1.5 eq), and $CH_2Cl_2$, at 0.2 M at r.t., was added pyridine (3 eq). The reaction mixture was allowed to stir for 1-16 h, then concentrated under reduced pressure and purified by ISCO flash chromatography or preparative HPLC, unless otherwise stated.

It will be recognized by those of ordinary skill in the art that the sulfonyl chlorides required for General Procedure A can be prepared using a number of techniques. In one such technique, appropriately substituted aromatic compounds can be reacted with chlorosulfonic acid, as exemplified by General Procedure B.

Scheme 2. Synthesis of sulfonyl chlorides.

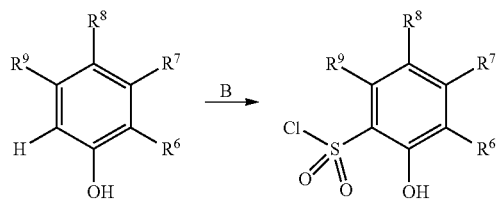

General Procedure B (Chlorosulfonation). Chlorosulfonic acid (7-10 eq) was cooled to −10° C. in a bath of ice/saturated aqueous NaCl. To this was added the corresponding aromatic species (1 eq), portion-wise, as required; the mixture was stirred for 1-16 h. The mixture was quenched by careful addition to a slurry of ice (with or without the addition of saturated aqueous NaCl) and $CH_2Cl_2$, extracting with $CH_2Cl_2$. The crude material was purified by ISCO flash chromatography or used directly with no purification.

Likewise, those of skill in the art will recognize that the synthesis of some compounds of the present invention requires heterocyclic amines with specific substitutions. Such heterocyclic amines can be prepared using several known techniques appropriate to the desired heterocycle. In one such convenient procedure shown in Scheme 3, the appropriate nitro heterocycle (Y is an optionally substituted carbon, X and Z are nitrogen or optionally substituted carbon provided that at least one of X and Z is a nitrogen atom, where $NO_2$ is bonded to a carbon at X, Y, or Z), for example imidazole, triazole, and the like can first be reacted with an appropriate alkyl halide (including substituted alkyl halide to prepare compounds where $R^1/R^{1a}$ is —$C_{1-6}$alkylene-$X^1$, where $X^1$ is as defined herein) or aryl halide (or corresponding halide equivalent, such as a mesylate or tosylate) in the presence of a suitable base, such as potassium carbonate, cesium carbonate, sodium hydride, or the like; in an appropriate solvent, such as acetonitrile, tetrahydrofuran, dimethylformamide, or the like; optionally using sodium iodide or potassium iodide, and at a temperature of about 50° C. to 150° C. Then, the nitro heterocycle can be converted to the corresponding heterocyclic amine using many different conditions known to those of skill in the art. One such set of conditions includes exposing the compound, in an appropriate solvent, such as ethyl acetate, methanol, isopropanol, or the like, to an atmosphere of hydrogen gas and in the presence of an appropriate catalyst, such as palladium on carbon, platinum on carbon, or the like. These procedures are shown in Scheme 3 and are exemplified by General Procedures C and D.

Scheme 3. Alkylation and reduction of nitrogen heterocycles.

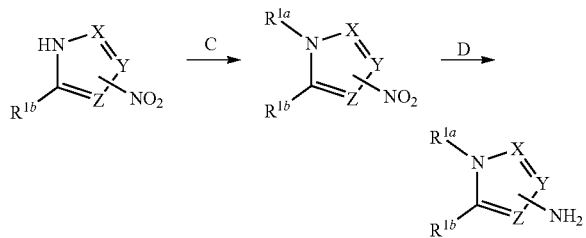

General Procedure C (N-alkylation). A heterocyclic intermediate (1 eq), an aryl or alkyl halide (1.2 eq), $Cs_2CO_3$ (3 eq), and KI (4 eq) were suspended in MeCN ([0.5 M]) in a microwave (MW) vial. The vial was capped and heated in the MW at 135° C. for 45 min, then filtered. The solvents were removed under reduced pressure and the crude material was purified by ISCO flash chromatography.

General Procedure D (Hydrogenation). A mixture containing the corresponding intermediate (1 eq) and Pd/C (10% C by wt., 0.05 eq) in EtOH [0.3 M] was stirred under a $H_2$ atmosphere for 10 min-2 h. When the reaction was complete, as observed by LCMS, 10 eq of a 3M aqueous solution of HCl was added. The mixture was filtered through celite, concentrated, and purified by ISCO flash chromatography if required.

An alternative means of preparing the heterocyclic amines useful for the synthesis of compounds of the present invention is shown in Scheme 4 and exemplified by General Procedures E and D. In this procedure, appropriately substituted heterocycles are first nitrated using nitric acid along with another strong acid, typically sulfuric acid, at a temperature from about −20° C. to about room temperature. The nitrated heterocycle so obtained can be converted to the corresponding heterocyclic amine using many different conditions known to those of skill in the art. One such set of conditions includes exposing the compound, in an appropriate solvent, such as ethyl acetate, methanol, isopropanol, or the like, to an atmosphere of hydrogen gas and in the presence of an appropriate catalyst, such as palladium on carbon, platinum on carbon, or the like.

Scheme 4. Nitration and reduction of substitued heterocycles.

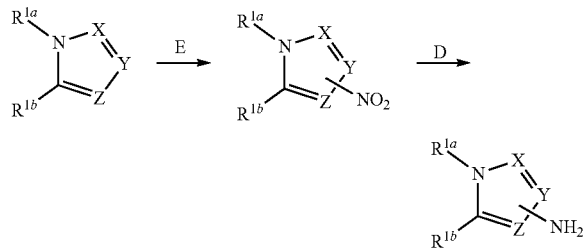

General Procedure E (Nitration). A mixture containing the corresponding intermediate (1 eq) in $H_2SO_4$ (18.4 M, 11.5 eq) was cooled to 0° C. in an ice/water bath. To this was added fuming $HNO_3$ (98% m/v., 14 eq). The reaction mixture was stirred for 4 h, allowing to warm to r.t., then poured over ice and filtered. The crude material was purified by ISCO flash chromatography.

Another alternative means of preparing the heterocyclic amines useful for the synthesis of compounds of the present invention in which G is an imidazole involves the use of an ANRORC (Addition of the Nucleophile, Ring Opening, and Ring Closure) method. To accomplish this set of procedures, an appropriate nitroimidazole is N-nitrated using nitric acid and acetic anhydride, in presence of another acid acting as the solvent, such as acetic acid or the like, and at a temperature from about −20° C. to about room temperature. The dinitroimidazole thus obtained is then reacted with an appropriate amine in a suitable solvent, such as ethanol, methanol, water, tetrahydrofuran, or the like, and at an appropriate temperature, from about −20° C. to about room temperature. The substituted nitroimidazole obtained in this way can be can be converted to the corresponding heterocyclic amine using many different conditions known to those of skill in the art. One such set of conditions includes exposing the compound, in an appropriate solvent, such as ethyl acetate, methanol, isopropanol, or the like, to an atmosphere of hydrogen gas and in the presence of an appropriate catalyst, such as palladium on carbon, platinum on carbon, or the like. These procedures are shown in Scheme 5 and exemplified by General Procedures F, G, and D.

Scheme 5. ANRORC reaction with nitroimidazoles.

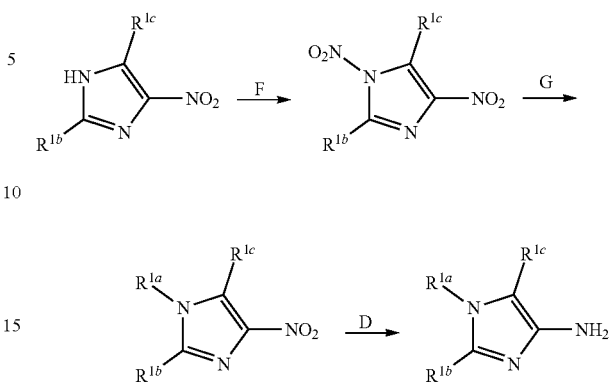

General Procedure F (Nitration). A mixture containing the corresponding 4-nitroimidazole (1 eq) in HOAc (35 eq) was cooled to 0° C. $HNO_3$ (14 eq) and $Ac_2O$ (14.3 eq) were added and stirring was at 0° C. for 10 min, allowing the reaction mixture to reach room temperature. Stirring was further continued for 1 h, and the reaction mixture was quenched by the addition of water. The mixture was extracted with EtOAc, the organic phase was dried with $Na_2SO_4$, and the solvent removed under reduced pressure. The crude product was used without further purification.

General Procedure G (N-alkylation). 1,4-Dinitro-1H-imidazole (1 eq) was dissolved in $MeOH:H_2O$ (1:1 at [0.3 M]) and cooled to 0° C. The corresponding amine/aniline (1.1 eq) was added dropwise and the reaction mixture was allowed to stir overnight. Water was added and the mixture was extracted with EtOAc. The organic phase was dried with $Na_2SO_4$, filtered and the solvent was removed under reduced pressure. The crude product was purified using ISCO flash chromatography.

An alternative means of preparing the heterocyclic amines useful for the synthesis of compounds of the present invention which are substituted with a sulfide, sulfoxide, or sulfone is shown in Scheme 6 and exemplified by General Procedures H, 1, and D. In this procedure, an appropriately heterocycle, substituted with an appropriate halide, such as a chloride, bromide, or iodide, is reacted with sodium methanethiolate in an appropriate solvent, such as tetrahydrofuran or dioxane, in the presence of an appropriate palladium catalyst and a suitable ligand, such as Xantphos, at a temperature of 50-110° C. The heteroaromatic sulfides produced in this way can be converted to the corresponding sulfones via the use of an oxidizing agent, such as Oxone or sodium periodate, in a suitable solvent, such as tetrahydrofuran, methanol, ethanol, water, or the like. One of skill in the art will recognize that this oxidation can also be utilized to produce compounds with corresponding sulfoxides via the use of the same reaction, but with fewer equivalents of oxidizing agent and shorter reaction times compared to the synthesis of the sulfones. Appropriately substituted nitro heteroaromatic compounds synthesized in this way can be converted to the corresponding heterocyclic amine using many different conditions. One such set of conditions includes exposing the compound, in an appropriate solvent, such as ethyl acetate, methanol, isopropanol, or the like, to an atmosphere of hydrogen gas and in the presence of an appropriate catalyst, such as palladium on carbon, platinum on carbon, or the like.

Scheme 6. Synthesis of sulfone-containing heterocyclic amines.

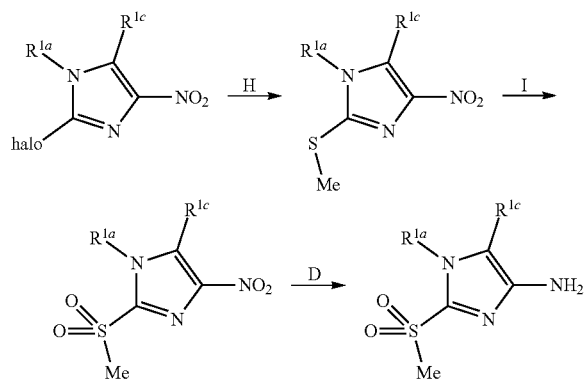

General Procedure H (Methyl sulfide Coupling). A mixture containing the corresponding heteroaryl iodide or bromide (1 eq), sodium methanethiolate (1.05 eq), Pd$_2$(dba)$_3$ (0.025 eq), and Xantphos (0.05 eq) was purged with Ar. To this mixture was added sufficient THF to achieve a final reaction concentration of 0.34 M, along with Et$_3$N (1.25 eq). The reaction mixture was heated at 76° C. for 18 h. Upon cooling, the mixture was filtered and the solvent was removed under reduced pressure. The crude product was purified using ISCO Flash chromatography.

General Procedure I (Sulfide-Sulfone Oxidation). To a 0.32 M solution of the corresponding sulfide in a 1:1 mixture of H$_2$O:EtOH was added Oxone (2 eq). The reaction mixture was stirred at r.t. for 4-20 h. Water was added to the mixture and it was extracted with CH$_2$Cl$_2$. The organic phase was dried using a phase separator and the solvent was removed under reduced pressure. If required, the residue was purified by ISCO flash chromatography.

Another means of preparing the heterocyclic amines useful for the synthesis of compounds of the present invention which are substituted with a sulfone is shown in Scheme 7 and exemplified by General Procedures J and D. To accomplish this procedure, a heterocyclic bromide or iodide can be reacted with sodium methanesulfinate in an appropriate solvent such as dimethylsulfoxide or dimethylformamide, in the presence of a suitable catalyst, such as copper iodide, an appropriate ligand, such as proline, and using a suitable base, such as sodium hydroxide, at a temperature of 40-100° C. Appropriately substituted nitro heteroaromatic compounds synthesized in this way can be converted to the corresponding heterocyclic amine using many different conditions. One such set of conditions includes exposing the compound, in an appropriate solvent, such as ethyl acetate, methanol, isopropanol, or the like, to an atmosphere of hydrogen gas and in the presence of an appropriate catalyst, such as palladium on carbon, platinum on carbon, or the like.

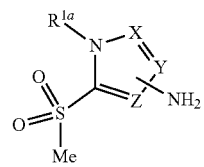

General Procedure J (Sulfone Coupling). The corresponding heteroaryl iodide or bromide (1 eq) was combined with sodium methanesulfinate (1.2 eq), CuI (0.10 eq), L-proline (0.20 eq) and NaOH (0.2 eq). The reaction vessel was purged with Ar, sufficient DMSO to produce a 0.5 M concentration was added, and the mixture was heated at 57-85° C. for 16-20 h. Upon cooling, the mixture was diluted with water and extracted with CH$_2$Cl$_2$. The organic phase was dried and concentrated. The crude material was taken forward without purification, unless otherwise stated.

Another means of preparing the heterocyclic amines useful for the synthesis of compounds of the present invention involves the use of palladium mediated coupling reactions that are well known to those of skill in the art. In this procedure, a heterocycle substituted with a halide, such as a bromide or an iodide, can be reacted with an appropriately substituted boronic acid or boronate ester in the presence of an appropriate palladium catalyst and suitable ligand, such as triphenyl phosphine, dppf, Xantphos, or the like, in an appropriate solvent, such as tetrahydrofuran, dioxane, water, or the like, and in the presence of a suitable base, such as sodium carbonate, cesium carbonate, or potassium phosphate, at a temperature of about 50-150° C. If such compounds are substituted with nitro groups, they then can be converted to the required heterocyclic amines using many different conditions. One such set of conditions includes exposing the compound, in an appropriate solvent, such as ethyl acetate, methanol, isopropanol, or the like, to an atmosphere of hydrogen gas and in the presence of an appropriate catalyst, such as palladium on carbon, platinum on carbon, or the like, as described in General Procedure D. Alternatively, compounds produced from the palladium mediated coupling reaction, if substituted with a carbamate, can be converted to the required heterocyclic amines by treatment with a suitable acid, such as hydrochloric acid or trifluoroacetic acid or the like, in a suitable solvent, such as dichloromethane, dioxane, water, or the like, and at a temperature of about 0° C. to about 50° C. The palladium-mediated coupling reaction and carbamate deprotection are shown in Scheme 8 and are exemplified by General Procedures K and L. Although illustrated for thiazole in Scheme 8, this method may also be applied to the synthesis of other substituted heterocyclic G groups.

Scheme 7. Synthesis pf methyl sulfones by direct coupling.

Scheme 8. Palladium coupling and carbamate deprotection.

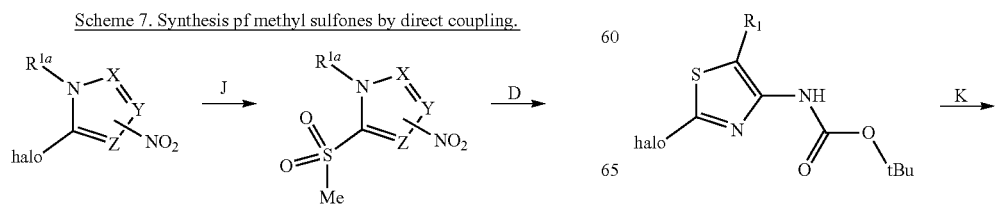

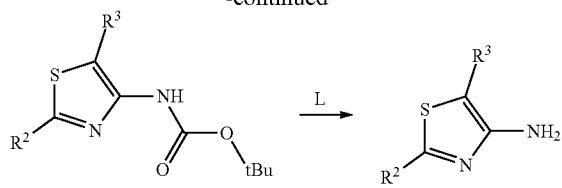

General Procedure K (Suzuki coupling). To a mixture containing a 2.0 M aqueous solution of $Na_2CO_3$ (3 eq) was added dioxane (to achieve a final reaction concentration of 0.24 M), the corresponding bromothiazole (1 eq), $Pd(PPh_3)_4$ (0.05 eq), and the corresponding boronic acid (1.2 eq). The mixture was degassed with Ar and then heated at 100° C. for 18 h. The reaction mixture was diluted with EtOAc and washed with a saturated solution of $NH_4Cl$. The organic phase was dried over a phase separator and the solvent removed under reduced pressure. The residue was purified using ISCO flash chromatography.

General Procedure L (Boc deprotection). A mixture containing the corresponding carbamate (1 eq) and a 4 M solution of HCl in dioxane was heated at 50° C. for 1-4 hours. The solvent was removed under reduced pressure and the residue was purified by ISCO flash chromatography.

Some compounds of the present invention can be synthesized by converting an ester-containing compound into a carboxylic acid-containing compound by hydrolysis of the ester. As will be recognized by those of ordinary skill in the art, there are many ways to accomplish this transformation. One such convenient procedure involves reaction of the ester-containing compound with an appropriate reagent capable of hydrolyzing the ester, such as lithium hydroxide, sodium hydroxide, or the like, in a suitable solvent, such as ether, tetrahydrofuran, methanol, water, or the like, and at a suitable temperature, from about room temperature to about 100° C. This procedure is shown in Scheme 9 and exemplified by General Procedure M. Although illustrated for imidazole in Scheme 9, this method may also be applied to the synthesis of other substituted heterocyclic G groups.

Scheme 9. Ester hydrolysis.

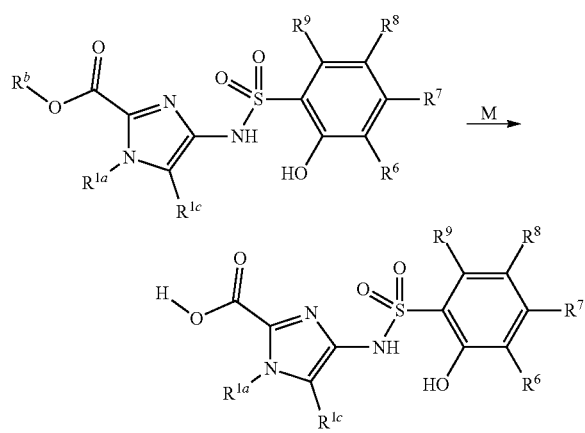

$R^b$ is a suitable alkyl group or substituted alkyl group, such as, but not limited to, methyl, ethyl, benzyl, or the like.

General Procedure M (Ester Hydrolysis). To a 0.2 M solution containing the corresponding ester (1 eq) and THF was added a 2 M aqueous solution of LiOH (5 eq). The reaction mixture was heated at 65° C. for 1-16 h, unless otherwise stated. The mixture was acidified with hydrochloric acid, extracted with EtOAc and washed with brine. The crude material was purified by preparative HPLC.

Some compounds of the present invention can be conveniently synthesized by converting an acid-containing compound to an amide-containing compound using a suitable amine. Those of skill in the art will recognize that there are numerous ways to accomplish this transformation. Methods useful for the preparation of compounds of the current invention which contain an amide include treating an appropriately substituted acid-containing compound with a suitable coupling agent, such as HATU, EDCI, or Pybop, in a suitable solvent, such as dichloromethane, tetrahydrofuran, dimethylformamide, or the like, in the presence of an appropriately substituted amine, and using a suitable base, such as triethyl amine or diisopropyl amine. This procedure is shown in Scheme 10 and exemplified by General Procedure N. Although illustrated for imidazole in Scheme 10, this method may also be applied to the synthesis of other substituted heterocyclic G groups.

Scheme 10. Amide synthesis from coupling.

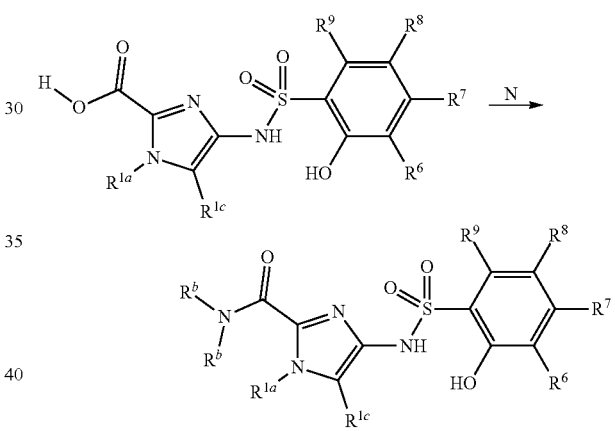

General Procedure N (PyBOP-Mediated Amide Coupling). To a 0.2 M solution containing the corresponding carboxylic acid (1 eq), PyBop (1.5 eq) and DIPEA (2 eq) in $CH_2Cl_2$ was added the corresponding amine (1.5 eq). The reaction mixture was stirred at r.t. for 16 h, then diluted with $CH_2Cl_2$ and washed with saturated aqueous $NaHCO_3$ and concentrated. Crude product was purified by ISCO flash chromatography, or preparative HPLC.

CHEMISTRY EXAMPLES

All chemical reagents and reaction solvents were purchased from commercial suppliers and used as received. All microwave-assisted reactions were performed using a Biotage Initiator 2.0 microwave reactor. Hydrogenation reactions are performed using an atmospheric balloon, or using a Parr hydrogenation shaker apparatus where stated. Analytical thin-layer chromatography (TLC) was performed on Kieselgel 60 F254 glass plates precoated with a 0.25 mm thick silica gel. TLC plates were visualized with UV light and iodine. Normal phase flash silica gel-based column chromatography is performed using ready-to-connect cartridges from ISCO, on irregular silica gel, particle size 15-40 μM using a Teledyne ISCO Combiflash Rf system. Preparative reversed-phase HPLC was performed on a Gilson instrument equipped with a Phenomenex Kinetex C18 column, using varying concentrations of MeCN in $H_2O$ and 0.1% TFA, unless otherwise stated.

All compounds were obtained at 95% purity or higher, unless otherwise noted, as measured by analytical reversed-phase HPLC. Analytical HPLC was performed on an Agilent 1200 series system with UV detection at 214 and 254 nm, along with evaporative light-scattering detection (ELSD). Low-resolution mass spectra were obtained on an Agilent 6140 mass spectrometer with electrospray ionization (ESI). For LCMS characterization of the compounds in the present invention, one of the following methods were used: Method A: A Phenomenex Kinetex 2.6 µm XB-C18 100 Å LC column (50 Å~2.1 mm) was used with a 2 min gradient of 5-95% MeCN in $H_2O$ and 0.1% TFA. Method B: A Phenomenex Kinetex 2.6 µm XB-C18 100 Å LC column (50 Å~2.1 mm) was used with a 1 min gradient of 5-95% MeCN in $H_2O$ and 0.1% TFA.

Proton nuclear magnetic resonance ($^1$H NMR) spectra were recorded at either 400 or 600 MHz on a Bruker spectrometer, as stated. For $^1$H NMR spectra, chemical shifts are reported in parts per million (ppm) relative to residual nondeuterated solvent signals. Coupling constants are reported in hertz (Hz). The following abbreviations (or a combination thereof) are used to describe splitting patterns: s, singlet; d, doublet; t, triplet; q, quartet; pent, pentet; hept, heptet m, multiplet; br, broad.

Compounds obtained as a TFA salt after purification were afforded as free base, unless salt form stated, by dissolving the salt in EtOAc and washing with saturated aqueous $K_2CO_3$.

Abbreviations:
- $Ac_2O$=acetic anhydride
- aq.=aqueous
- conc.=concentrated
- DCM=dichloromethane, $CH_2Cl_2$
- DIPEA=di-isopropyl ethyl amine
- DMSO=dimethylsulfoxide
- dppf=[1,1'-Bis(diphenylphosphino)ferrocene]dichloropalladium(II)
- EDCI=1-Ethyl-3-(3-dimethylaminopropyl)carbodiimide
- eq=equivalents
- EtOH=ethanol
- EtOAc=ethyl acetate
- $Et_3N$=triethylamine
- h=hours
- HOAc=acetic acid
- HATU=1-[Bis(dimethylamino)methylene]-1H-1,2,3-triazolo[4,5-b]pyridinium 3-oxid hexafluorophosphate,
- MeCN=acetonitrile
- MeOH=methanol
- min=minutes
- $Pd_2(dba)_3$=Tris(dibenzylideneacetone)dipalladium(0)
- $Pd(PPh_3)_4$=Tetrakis(triphenylphosphine)palladium(0)
- PyBop=Bromotripyrrolidinophosphonium hexafluorophosphate
- r.t.=room temperature
- rt=room temperature
- sat.=saturated
- TFA=trifluoroacetic acid
- THF=tetrahydrofuran
- TMS=trimethylsilyl
- wt.=weight
- XantPhos=4,5-Bis(diphenylphosphino)-9,9-dimethylxanthene Example 1: 5-Bromo-3-chloro-N-(1-cyclopentyl-1H-imidazol-4-yl)-2-hydroxybenzenesulfonamide

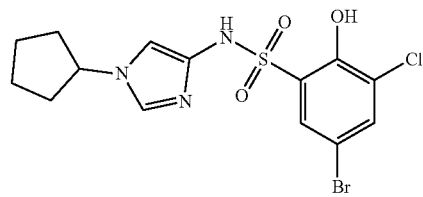 [SMILES: O=S(=O)(Nc1cn(C2CCCC2)cn1)c1cc(Br)cc(Cl)c1O]

Step A: 5-Bromo-3-chloro-2-hydroxybenzenesulfonyl chloride. Using a procedure analogous to General procedure B, starting with 2-chloro-4-bromophenol (2.08 g, 10 mmol), 5-bromo-3-chloro-2-hydroxybenzenesulfonyl chloride as a colorless solid (2.19 g, 7.15 mmol, 72%). $^1$H NMR (400 MHz, Chloroform-d) $\delta_H$ 7.92 (1H, d, J=2.4 Hz), 7.86 (1H, d, J=2.4 Hz); LCMS (Method A) $t_R$=1.50 min; Purity (AUC) ≥95%.

Step B: 1-Cyclopentyl-4-nitro-1H-imidazole. Using a procedure analogous to General procedure C, starting with 900 mg (7.96 mmol) of 4-nitroimidazole and bromocyclopentane (10.35 mmol), 1-cyclopentyl-4-nitro-1H-imidazole was obtained as a pale-yellow liquid (1277 mg, 71%) after purification. $^1$H NMR (400 MHz, Chloroform-d) δ 7.77 (s, 1H), 7.45 (s, 1H), 4.54-4.47 (m, 1H), 2.24 (q, J=8.0 Hz, 2H), 1.89-1.68 (m, 6H). LCMS (Method B) $t_R$=0.591 min, m/z=182.3 [M+H]$^+$; Purity (AUC) ≥95%.

Step C: 1-Cyclopentyl-1H-imidazol-4-aminium chloride. Using a procedure analogous to General procedure D, starting with 50 mg (0.28 mmol) of 1-cyclopentyl-4-nitro-1H-imidazole, 1-cyclopentyl-1H-imidazol-4-aminium chloride was obtained (51 mg) and was used without further purification. LCMS (Method B) $t_R$=0.114 min, m/z=152.3 [M+H]+; Purity (AUC) ≥90%.

Step D: 5-Bromo-3-chloro-N-(1-cyclopentyl-1H-imidazol-4-yl)-2-hydroxybenzenesulfonamide. Using a procedure analogous to General procedure A, starting with 51 mg of crude cyclopentyl-1H-imidazol-4-aminium chloride and 5-bromo-3-chloro-2-hydroxybenzenesulfonyl chloride, the title compound was obtained (13.8 mg, 0.033 mmol, 12%). 1H NMR (400 MHz, Chloroform-d) δ 7.61 (d, J=2.4 Hz, 1H), 7.57 (d, J=2.4 Hz, 1H), 7.51 (d, J=1.6 Hz, 1H), 6.75 (d, J=1.6 Hz, 1H), 4.41 (pent, J=6.7 Hz, 1H), 2.25-2.15 (m, 2H), 1.91-1.71 (m, 6H). LCMS (Method B): $t_R$=0.874 min, m/z=420.1, 422.1 [M+H]+; ≥95% (AUC).

Example 2: 5-Bromo-3-chloro-N-(1-cyclobutyl-1H-imidazol-4-yl)-2-hydroxybenzenesulfonamide

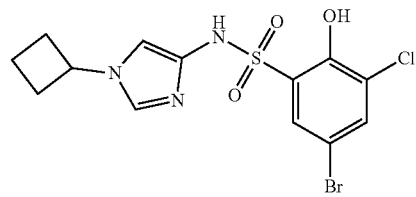 [SMILES: O=S(=O)(Nc1cn(C2CCC2)cn1)c1cc(Br)cc(Cl)c1O]

Step A: 1-Cyclobutyl-4-nitro-1H-imidazole. Using a procedure analogous to General procedure C, starting with 100 mg (0.88 mmol) of 4-nitroimidazole and bromocyclobutane (1.11 mmol), 1-cyclobutyl-4-nitro-1H-imidazole was obtained (100 mg, 0.59 mmol, 67%) after purification. LCMS (Method B) $t_R$=0.097 min, m/z=168.2 [M+H]$^+$; Purity (AUC) ≥95%.

Step B: 1-Cyclobutyl-1H-imidazol-4-aminium chloride. Using a procedure analogous to General procedure D, starting with 100 mg (0.59 mmol) of 1-cyclobutyl-4-nitro-1H-imidazole, 1-cyclobutyl-1H-imidazol-4-aminium chloride was obtained (50 mg) and was used without further purification. LCMS (Method B) $t_R$=0.090 min, m/z=138.1 [M+H]$^+$; Purity (AUC) ≥90%.

Step C: 5-Bromo-3-chloro-N-(1-cyclobutyl-1H-imidazol-4-yl)-2-hydroxybenzenesulfonamide. Using a procedure analogous to General procedure A, starting with 50 mg of crude of cyclobutyl-1H-imidazol-4-aminium chloride and 5-bromo-3-chloro-2-hydroxybenzenesulfonyl chloride, the title compound was obtained (14.0 mg, 0.033 mmol, 6%). $^1$H NMR (400 MHz, Chloroform-d) δ 7.62 (s, 1H), 7.54 (s, 1H), 7.39 (s, 1H), 6.81 (s, 1H), 4.56-4.47 (m, 1H), 2.50 (s, 2H), 2.37-2.28 (m, 2H), 1.89 (dt, J=18.7, 9.5 Hz, 2H). LCMS (Method A): $t_R$=1.385 min, m/z=405.7, 406.8 [M+H]$^+$; ≥95% (AUC).

Example 3: 5-Bromo-3-chloro-N-(1-cyclohexyl-1H-imidazol-4-yl)-2-hydroxybenzenesulfonamide

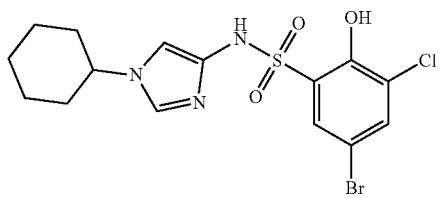 [SMILES: O=S(=O)(Nc1cn(C2CCCCC2)cn1)c1cc(Br)cc(Cl)c1O]

Step A: 1-Cyclohexyl-4-nitro-1H-imidazole. Using a procedure analogous to General procedure C, starting with 500 mg (4.42 mmol) of 4-nitroimidazole and bromocyclohexane (5.53 mmol), 1-cyclohexyl-4-nitro-1H-imidazole was obtained (698 mg) and was used without further purification. LCMS (Method A) $t_R$=1.214 min, m/z=196.2 [M+H]$^+$.

Step B: 1-Cyclohexyl-1H-imidazol-4-aminium chloride. Using a procedure analogous to General procedure D, starting with 698 mg of crude 1-cyclohexyl-4-nitro-1H-imidazole, 1-cyclohexyl-1H-imidazol-4-aminium chloride was obtained (343 mg) and was used without further purification. LCMS (Method A) $t_R$=0.565 min, m/z=166.2 [M+H]$^+$; Purity (AUC) ≥77%.

Step C: 5-Bromo-3-chloro-N-(1-cyclohexyl-1H-imidazol-4-yl)-2-hydroxybenzenesulfonamide. Using a procedure analogous to General procedure A, starting with 150 mg of crude cyclohexyl-1H-imidazol-4-aminium chloride and 5-bromo-3-chloro-2-hydroxybenzenesulfonyl chloride, the title compound was obtained (4 mg, 0.0092 mmol, 0.2%). %). $^1$H NMR (400 MHz, Chloroform-d) δ 7.61 (d, J=2.4 Hz, 1H), 7.57 (d, J=2.4 Hz, 1H), 7.52 (d, J=1.5 Hz, 1H), 6.76 (d, J=1.6 Hz, 1H), 3.93-3.81 (m, 1H), 2.12 (d, J=12.3 Hz, 2H), 1.93 (d, J=13.5 Hz, 2H), 1.76 (d, J=13.2 Hz, 1H), 1.68-1.53 (m, 2H), 1.49-1.35 (m, 2H), 1.32-1.21 (m, 1H). LCMS (Method B): $t_R$=0.951 min, m/z=434.2, 435.3 [M+H]$^+$; ≥95% (AUC).

Example 4: 5-Bromo-3-chloro-N-(1-phenyl-1H-imidazol-4-yl)-2-hydroxybenzenesulfonamide

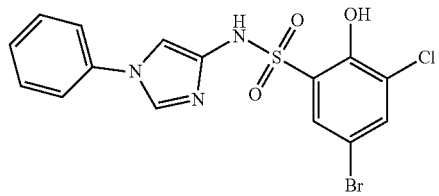 [SMILES: O=S(=O)(Nc1cn(-c2ccccc2)cn1)c1cc(Br)cc(Cl)c1O]

Step A: 1-Phenyl-4-nitro-1H-imidazole. A vial containing 200 mg (1.77 mmol) of 4-nitroimidazole, iodobenzene (1.77 mmol, 1 eq), CuI (0.27 mmol, 0.15 eq), L-proline (0.27 mmol, 0.15 eq) and K$_2$CO$_3$ (3.54 mmol, 2 eq) was purged with argon and then sufficient DMSO was added to achieve a reaction concentration of 1.4 M. The reaction mixture was heated overnight at 85° C., diluted with EtOAc, and filtered. The filtrate was washed with brine and the organic phase was dried over Na$_2$SO$_4$. The solvent was then removed under reduced pressure and the residue was purified using ISCO flash chromatography to afford 1-phenyl-4-nitro-1H-imidazole as a colorless solid (62 mg, 0.33 mmol, 19%). $^1$H NMR (400 MHz, Chloroform-d) δ 8.11 (s, 1H), 7.84-7.75 (m, 1H), 7.62-7.54 (m, 2H), 7.54-7.49 (m, 1H), 7.45 (dd, J=7.2, 1.9 Hz, 2H). LCMS (Method A) $t_R$=0.127 min, m/z=190.2 [M+H]$^+$; ≥95% (AUC).

Step B: 1-Phenyl-1H-imidazol-4-aminium chloride. Using a procedure analogous to General procedure D, starting with 62 mg (0.33 mmol) of 1-phenyl-4-nitro-1H-imidazole, 1-phenyl-1H-imidazol-4-aminium chloride was obtained (64 mg) and was used without further purification. $^{LCMS}$ (Method A) $t_R$=0.097 min, m/z=160.2 [M+H]$^+$; Purity (AUC) ≥95%.

Step C: 5-Bromo-3-chloro-N-(1-phenyl-1H-imidazol-4-yl)-2-hydroxybenzenesulfonamide. Using a procedure analogous to General procedure A, starting with reacting 64 mg of crude phenyl-1H-imidazol-4-aminium chloride and 5-bromo-3-chloro-2-hydroxybenzenesulfonyl chloride, the title compound was (50 mg, 0.12 mmol, 35%). $^1$H NMR (400 MHz, Chloroform-d) δ 9.83 (s, 2H), 8.06 (d, J=1.7 Hz, 1H), 7.74 (d, J=2.4 Hz, 1H), 7.63 (d, J=2.4 Hz, 1H), 7.59-7.48 (m, 3H), 7.46-7.38 (m, 2H), 7.31 (d, J=1.7 Hz, 1H). LCMS (Method A): $t_R$=1.570 min, m/z=427.8, 428.8 [M+H]$^+$; ≥95% (AUC).

Example 5: 5-Bromo-3-chloro-N-(1-(cyclopropylmethyl)-1H-imidazol-4-yl)-2-hydroxybenzenesulfonamide

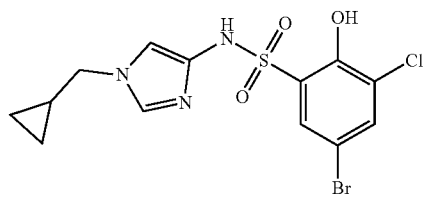 [SMILES: O=S(=O)(Nc1cn(CC2CC2)cn1)c1cc(Br)cc(Cl)c1O]

Step A: 1-(Cyclopropylmethyl)-4-nitro-1H-imidazole. Using a procedure analogous to General procedure C, starting with 200 mg (1.77 mmol) of 4-nitroimidazole and 1-bromo-1-cyclopropylmethane (2.30 mmol), 1-(cyclopropylmethyl)-4-nitro-1H-imidazole was obtained (226 mg, 1.35 mmol, 76%) after purification. LCMS (Method B) $t_R$=0.485 min, m/z=168.4 [M+H]$^+$; Purity (AUC) ≥95%.

Step B: 1-(Cyclopropylmethyl)-1H-imidazol-4-aminium chloride. Using a procedure analogous to General procedure D, starting with 66 mg (0.39 mmol) of 1-cyclopropylmethyl-4-nitro-1H-imidazole, 1-(cyclopropylmethyl)-1H-imidazol-4-aminium chloride was obtained (60 mg) and was used without further purification. LCMS (Method B) $t_R$=0.089 min, m/z=138.2 [M+H]$^+$; Purity (AUC) ≥65%.

Step C: 5-Bromo-3-chloro-N-(1-(cyclopropylmethyl-1H-imidazol-4-yl)-2-hydroxybenzenesulfonamide. Using a procedure analogous to General procedure A, starting with 60 mg of crude 1-(cyclopropylmethyl)-1H-imidazol-4-aminium chloride and 5-bromo-3-chloro-2-hydroxybenzenesulfonyl chloride, the title compound was obtained (8 mg, 0.020 mmol, 5%). $^1$H NMR (400 MHz, Chloroform-d) δ 8.18 (s, 1H), 7.73 (d, J=2.4 Hz, 1H), 7.65 (d, J=2.4 Hz, 1H), 7.11 (d, J=1.7 Hz, 1H), 3.92 (d, J=7.4 Hz, 2H), 1.30-1.19 (m, 1H), 0.87-0.81 (m, 2H), 0.46 (q, J=5.4 Hz, 2H). LCMS (Method B): $t_R$=0.758 min, m/z=406.2 [M+H]$^+$; ≥95% (AUC).

Example 6: 5-Bromo-3-chloro-N-(1-(cyclobutanecarbonyl)-1H-imidazol-4-yl)-2-hydroxybenzenesulfonamide

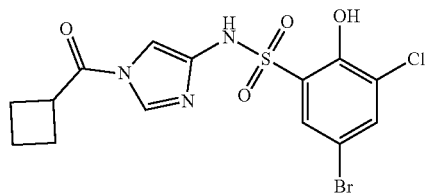 [SMILES: O=C(C1CCC1)n1cnc(NS(=O)(=O)c2cc(Br)cc(Cl)c2O)c1]

Step A: 1-(Cyclobutanecarbonyl)-4-nitro-1H-imidazole. To a mixture containing cyclobutanecarbonyl chloride (210 mg, 1.77 mmol, 1 eq) and sufficient MeCN to obtain a reaction concentration of 5 M was added 4-nitroimidazole (200 mg, 1.77 mmol, 1 eq) and Et$_3$N (250 μL, 1.77 mmol, 1 eq). The reaction mixture was heated overnight at 75° C., filtered, and washed with EtOAc. The solution was dried over a phase separator and the solvent was removed under reduced pressure. The residue was purified using ISCO flash chromatography to afford 1-(cyclobutanecarbonyl)-4-nitro-1H-imidazole (125 mg, 0.34 mmol, 19%). LCMS (Method B): $t_R$=0.987 min, ≥95% (AUC).

Step B: 1-(1-(Cyclobutanecarbonyl)-1H-imidazol-4-aminium chloride. Using a procedure analogous to General procedure D, starting with 125 mg (0.34 mmol) of 1-cyclobutanecarbonyl-4-nitro-1H-imidazole, 1-(1-(cyclobutanecarbonyl)-1H-imidazol-4-aminium chloride was obtained (70 mg) and was used without further purification. LCMS (Method B) $t_R$=0.347 min, m/z=166.3 [M+H]$^+$.

Step C: 5-Bromo-3-chloro-N-(1-(cyclobutanecarbonyl-1H-imidazol-4-yl)-2-hydroxybenzenesulfonamide. Using a procedure analogous to General procedure A, starting with 70 mg of crude 1-(cyclobutanecarbonyl)-1H-imidazol-4-aminium chloride and 5-bromo-3-chloro-2-hydroxybenzenesulfonyl chloride, the title compound was obtained (3 mg, 0.007 mmol, 2%). $^1$H NMR (400 MHz, Chloroform-d) δ 7.94 (d, J=2.4 Hz, 1H), 7.90 (d, J=1.5 Hz, 1H), 7.76 (d, J=2.4 Hz, 1H), 7.69 (s, 1H), 7.55 (s, 1H), 3.14 (t, J=8.4 Hz, 1H), 2.39-2.30 (m, 2H), 2.27-2.17 (m, 2H), 2.02 (s, 1H), 1.96-1.88 (m, 1H). LCMS (Method B) $t_R$=1.020 min, m/z=434.1, 435.2 [M+H]$^+$; Purity (AUC) ≥95%.

Example 7: 5-Bromo-3-chloro-N-(1-(cyclopentanecarbonyl)-1H-imidazol-4-yl)-2-hydroxybenzenesulfonamide

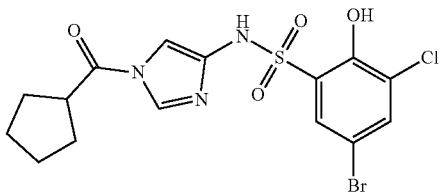 [SMILES: O=C(C1CCCC1)n1cnc(NS(=O)(=O)c2cc(Br)cc(Cl)c2O)c1]

Step A: 1-(Cyclopentanecarbonyl)-4-nitro-1H-imidazole. To a mixture containing cyclopentanecarbonyl chloride (210 mg, 1.77 mmol, 1 eq) and sufficient MeCN to achieve a reaction concentration of 5 M was added 4-nitroimidazole (200 mg, 1.77 mmol, 1 eq) and Et$_3$N (250 μL, 1.77 mmol, 1 eq). The reaction mixture was heated overnight at 75° C., filtered, and washed with EtOAc. The filtrate was dried over a phase separator and the solvent removed under reduced pressure. The residue was purified using ISCO flash chromatography to give 1-(cyclopentanecarbonyl)-4-nitro-1H-imidazole (41 mg, 0.055 mmol, 3%). $^1$H NMR (400 MHz, Chloroform-d) δ 8.26 (d, J=1.7 Hz, 1H), 8.14 (d, J=1.7 Hz, 1H), 3.46-3.34 (m, 1H), 2.13-1.98 (m, 4H), 1.86-1.71 (m, 5H).

Step B: 1-(1-(Cyclopentanecarbonyl)-1H-imidazol-4-aminium chloride. Using a procedure analogous to General procedure D, starting with 41 mg (0.055 mmol, based on $^1$H-NMR purity) of 1-cyclopentanecarbonyl-4-nitro-1H-imidazole, 1-(1-(cyclopentanecarbonyl)-1H-imidazol-4-aminium chloride was obtained (48 mg) and was used without further purification. LCMS (Method B) $t_R$=0.279 min, m/z=198.4 [M+NH$_4$]$^+$. Purity ($^1$H-NMR) ≥21%.

Step C: 5-Bromo-3-chloro-N-(1-(cyclopentanecarbonyl-1H-imidazol-4-yl)-2-hydroxybenzenesulfonamide. Using a procedure analogous to General Procedure C, starting with 48 mg of crude 1-(cyclopentanecarbonyl)-1H-imidazol-4-aminium chloride and 5-bromo-3-chloro-2-hydroxybenzenesulfonyl chloride, the title compound was obtained (4 mg, 0.009 mmol, 33%). $^1$H NMR (400 MHz, Chloroform-d) δ 8.02 (br s, 1H), 7.95 (t, J=2.4 Hz, 2H), 7.76 (d, J=2.4 Hz, 1H), 7.69 (d, J=1.6 Hz, 1H), 2.74-2.68 (m, 1H), 1.93 (d, J=8.2 Hz, 2H), 1.88-1.69 (m, 4H), 1.66-1.56 (m, 2H). LCMS (Method B) $t_R$=1.068 min, m/z=448.1, 449.3 [M+H]$^+$; Purity (AUC) ≥95%.

Example 8: 5-Bromo-3-chloro-N-(1-cyclopropyl-1H-imidazol-4-yl)-2-hydroxybenzenesulfonamide

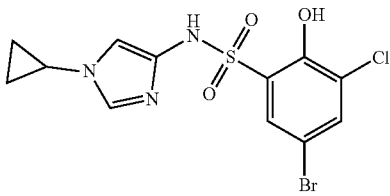 [SMILES: O=S(=O)(Nc1cn(C2CC2)cn1)c1cc(Br)cc(Cl)c1O]

Step A: 1,4-Dinitro-1H-imidazole. Using a procedure analogous to General Procedure F, starting with 500 mg (4.42 mmol) of 4-nitroimidazole, 1,4-dinitro-1H-imidazole was obtained (538 mg, 3.40 mmol, 77%) and used without further purification. $^1$H NMR (400 MHz, Chloroform-d) δ 8.51 (d, J=1.7 Hz, 1H), 8.38 (d, J=1.7 Hz, 1H). LCMS (Method B) $t_R$=0.081 min, m/z=158.3 [M+H]$^+$; Purity (AUC) ≥95%.

Step B: 1-Cyclopropyl-4-nitro-1H-imidazole. Using a procedure analogous to General Procedure G, starting with 150 mg (0.39 mmol) of 1,4-dinitro-1H-imidazole and cyclopropaneamine (1.04 mmol), 1-cyclopropyl-4-nitro-1H-imidazole was obtained (105 mg, 0.69 mmol, 72%) as a yellow solid. $^1$H NMR (400 MHz, Chloroform-d) δ 7.78 (d, J=1.2 Hz, 1H), 7.48 (s, 1H), 3.50-3.40 (m, 1H), 1.15-1.07 (m, 2H), 1.03 (dt, J=6.0, 4.1 Hz, 2H). LCMS (Method B) $t_R$=0.109 min, m/z=154.2 [M+H]$^+$; Purity (AUC) ≥95%.

Step C: 1-(Cyclopropyl)-1H-imidazol-4-aminium chloride. Using a procedure analogous to General procedure D, starting with 50 mg (0.33 mmol) of 1-cyclopropyl-4-nitro-1H-imidazole, 1-(cyclopropyl)-1H-imidazol-4-aminium chloride was obtained (29 mg) and was used without further purification. LCMS (Method B) $t_R$=0.086 min, m/z=124.2 [M+H]$^+$; Purity (AUC) ≥95%.

Step D: 5-Bromo-3-chloro-N-(1-(cyclopentanecarbonyl-1H-imidazol-4-yl)-2-hydroxybenzenesulfonamide. Using a procedure analogous to General procedure A, starting with 29 mg of crude 1-cyclopropyl-1H-imidazol-4-aminium chloride and 5-bromo-3-chloro-2-hydroxybenzenesulfonyl chloride, the title compound was obtained (13 mg, 880.033 mmol, 10%). $^1$H NMR (400 MHz, Chloroform-d) δ 7.93 (s, 1H), 7.73 (d, J=2.4 Hz, 1H), 7.65 (d, J=2.4 Hz, 1H), 7.07 (d, J=1.5 Hz, 1H), 3.57-3.47 (m, 1H), 1.26-1.14 (m, 2H), 1.14-1.06 (m, 2H). LCMS (Method B) $t_R$=0.808 min, m/z=392.2, 393.4 [M+H]$^+$; Purity (AUC) ≥95%.

Example 9: 5-Bromo-3-chloro-N-(1-cyclopentyl-2-methyl-1H-imidazol-4-yl)-2-hydroxybenzenesulfonamide

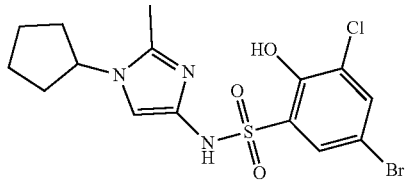 [SMILES: Cc1nc(NS(=O)(=O)c2cc(Br)cc(Cl)c2O)cn1C1CCCC1]

Step A: 2-Bromo-1-cyclopentyl-4-nitro-1H-imidazole. Using a procedure analogous to General procedure C, starting with 700 mg (3.65 mmol) of 2-bromo-4-nitro-1H-imidazole and bromocyclopentane (4.74 mmol mmol), 2-bromo-1-cyclopentyl-4-nitro-1H-imidazole was obtained (691 mg, 2.65 mmol, 72%) after purification. $^1$H NMR (400 MHz, Methanol-d$_4$) δ 8.30 (s, 1H), 4.79-4.67 (m, 1H), 2.34-2.21 (m, 2H), 1.97-1.85 (m, 4H), 1.85-1.77 (m, 1H), 1.77-1.73 (m, 1H). LCMS (Method B) $t_R$=0.837 min, m/z=260.1, 262.1 [M+H]$^+$; Purity (AUC) ≥95%.

Step B: 1-Cyclopentyl-2-methyl-4-nitro-1H-imidazole. To a mixture containing 100 mg (0.38 mmol, 1 eq) of 2-bromo-1-cyclopentyl-4-nitro-1H-imidazole, 44 mg (0.04 mmol, 0.10 eq) of Pd(PPh$_3$)$_4$ and 1.9 mL of dioxane were added, followed by 30 mg (0.50 mmol, 1.3 eq) of methyl boronic acid, 122 mg (1.15 mmol, 3 eq) of Na$_2$CO$_3$, and 0.260 µL of H$_2$O. The reaction vial was purged with argon, capped, and heated at 85° C. for 2 days. Water was added and the mixture extracted with DCM. The organic phase was dried over a phase separator and the solvent was removed under reduced pressure. The residue was purified using ISCO flash chromatography to give 1-cyclopentyl-2-methyl-4-nitro-1H-imidazole as a white solid (21 mg, 0.057 mmol, 11%). $^1$H NMR (400 MHz, Chloroform-d) δ 7.71 (s, 1H), 4.51-4.39 (m, 1H), 2.44 (s, 3H), 2.28-2.17 (m, 2H), 1.95-1.84 (m, 2H), 1.84-1.71 (m, 4H). LCMS (Method B) $t_R$=0.101 min, m/z=196.3 [M+H]$^+$; Purity ($^1$H-NMR) ≥70%.

Step C: 1-Cyclopentyl-2-methyl-1H-imidazol-4-aminium chloride. Using a procedure analogous to General procedure D, starting with 21 mg (0.057 mmol) of cyclopentyl-2-methyl-4-nitro-1H-imidazole, 1-cyclopentyl-2-methyl-1H-imidazol-4-aminium chloride obtained (30 mg) and was used without further purification. LCMS (Method B) $t_R$=0.280 min, m/z=166.4 [M+H]$^+$; Purity (AUC) ≥86%.

Step D: 5-Bromo-3-chloro-N-(Cyclopentyl-2-methyl-1H-imidazol-4-yl)-2-hydroxybenzenesulfonamide. Using a procedure analogous to General procedure A, starting with 30 mg of crude 1-cyclopentyl-2-methyl-1H-imidazol-4-aminium chloride and 5-bromo-3-chloro-2-hydroxybenzenesulfonyl chloride, the title compound was obtained (6 mg, 0.014 mmol, 24%). $^1$H NMR (400 MHz, Chloroform-d) δ 7.72 (d, J=2.4 Hz, 1H), 7.65 (d, J=2.4 Hz, 1H), 6.93 (s, 1H), 4.47 (pent, J=7.2 Hz, 1H), 2.55 (s, 3H), 2.27-2.20 (m, 6H), 1.99-1.89 (m, 6H), 1.87-1.78 (m, 7H). LCMS (Method B) $t_R$=0.843 min, m/z=434.2, 435.2 [M+H]$^+$; Purity (AUC) ≥95%.

Example 10: 5-Bromo-3-chloro-N-(1-cyclopentyl-2-ethyl-1H-imidazol-4-yl)-2-hydroxybenzenesulfonamide

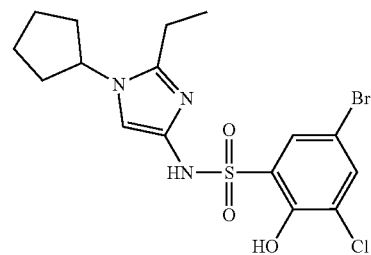 [SMILES: CCc1nc(NS(=O)(=O)c2cc(Br)cc(Cl)c2O)cn1C1CCCC1]

Step A: 1-Cyclopentyl-4-nitro-2-vinyl-1H-imidazole. A mixture containing 100 mg (0.38 mmol, 1 eq) of 2-bromo-1-cyclopentyl-4-nitro-1H-imidazole and a 3.1:0.700 mL mixture of 1,4-dioxane:H$_2$O was degassed with Ar for 10 min. Then, 44 mg (0.04 mmol, 0.10 eq) of Pd(PPh$_3$)$_4$, 65 mg (0.42 mmol, 1.1 eq) of vinyl boronic pinacol ester, and 376 mg (1.15 mmol, 3 eq) of Cs$_2$CO$_3$ were added. The reaction mixture was heated at 135° C. for 36 hours. Water was added and the mixture extracted with DCM. The organic phase was dried over a phase separator and the solvent was removed under reduced pressure. The residue was purified using ISCO flash chromatography to afford 60 mg (0.20 mmol, 53%) of 1-cyclopentyl-4-nitro-2-vinyl-1H-imidazole. $^1$H NMR (400 MHz, Chloroform-d) δ 7.74 (s, 1H), 6.59 (dd, J=17.1, 11.1 Hz, 1H), 6.36 (dd, J=17.1, 1.4 Hz, 1H), 5.58 (dd, J=11.0, 1.4 Hz, 1H), 4.65-4.54 (m, 1H), 2.24-2.17 (m, 2H), 1.89-1.73 (m, 6H). LCMS (Method B) $t_R$=0.748 min, m/z=208.3 [M+H]$^+$; Purity ($^1$H-NMR) ≥89%.

Step B: 1-Cyclopentyl-2-ethyl-1H-imidazol-4-aminium chloride. Using a procedure analogous to General procedure D, starting with 50 mg (0.21 mmol) of 1-cyclopentyl-4-nitro-2-vinyl-1H-imidazole, 1-cyclopentyl-2-ethyl-1H-imidazol-4-aminium chloride obtained (52 mg) and was used without further purification. LCMS (Method B) $t_R$=0.092 min, m/z=180.3 [M+H]$^+$; Purity (AUC) ≥89%.

Step C: 5-Bromo-3-chloro-N-(1-cyclopentyl-2-ethyl-1H-imidazol-4-yl)-2-hydroxybenzenesulfonamide. Using a procedure analogous to General procedure A, starting with 52 mg of crude 1-cyclopentyl-2-ethyl-1H-imidazol-4-aminium chloride and 5-bromo-3-chloro-2-hydroxybenzenesulfonyl chloride, the title compound was obtained (23 mg, 0.0% mmol, 48%). $^1$H NMR (400 MHz, Chloroform-d) δ 7.68 (d, J=2.3 Hz, 1H), 7.54 (d, J=2.3 Hz, 1H), 6.42 (s, 1H), 4.43 (pent, J=7.2 Hz, 1H), 2.96 (q, J=7.3 Hz, 2H), 2.21-2.10 (m, 2H), 1.91 (s, 2H), 1.84-1.70 (m, 4H), 1.30 (t, J=7.3 Hz, 3H). LCMS (Method B) $t_R$=0.901 min, m/z=448.2, 450.2 [M+H]$^+$; Purity (AUC) ≥95%.

Example 11: 5-Bromo-3-chloro-N-(1-cyclopentyl-5-methyl-1H-imidazol-4-yl)-2-hydroxybenzenesulfonamide

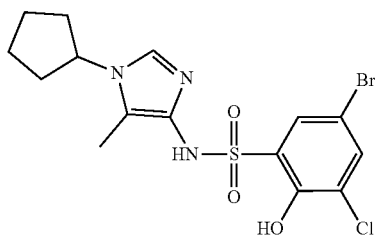 [SMILES: Cc1c(NS(=O)(=O)c2cc(Br)cc(Cl)c2O)ncn1C1CCCC1]

Step A: 1-Cyclopentyl-5-methyl-4-nitro-1H-imidazole. Using a procedure analogous to General procedure C, starting with 300 mg (2.36 mmol) of 5-methyl-4-nitroimidazole and bromocyclopentane (2.05 mmol), 1-cyclopentyl-5-methyl-4-nitro-1H-imidazole was obtained (112 mg, 0.57 mmol, 24%) after purification. $^1$H NMR (400 MHz, Chloroform-d) δ 7.40 (s, 1H), 4.45-4.37 (m, 1H), 2.63 (s, 3H), 2.30-2.16 (m, 2H), 1.94-1.72 (m, 6H). LCMS (Method B) $t_R$=0.724 min, m/z=196.3 [M+H]$^+$; Purity (AUC) ≥95%.

Step B: 1-Cyclopentyl-5-methyl-1H-imidazol-4-aminium chloride. Using a procedure analogous to General procedure D, starting with 112 mg (0.57 mmol) of 1-cyclopentyl-5-methyl-4-nitro-1H-imidazole, 1-cyclopentyl-5-methyl-1H-imidazol-4-aminium chloride was obtained (125 mg) and was used without further purification. LCMS (Method B) $t_R$=0.307 min, m/z=166.4 [M+H]~; Purity (AUC) ≥96%.

Step C: 5-Bromo-3-chloro-N-(1-cyclopentyl-5-methyl-1H-imidazol-4-yl)-2-hydroxybenzenesulfonamide. Using a procedure analogous to General procedure A, starting with 125 mg of crude 1-cyclopentyl-5-methyl-1H-imidazol-4-aminium chloride and 5-bromo-3-chloro-2-hydroxybenzenesulfonyl chloride, the title compound was obtained (15 mg, 0.034 mmol, 6%). $^1$H NMR (400 MHz, Chloroform-d) δ 8.09 (s, 1H), 7.65 (d, J=2.4 Hz, 1H), 7.60 (d, J=2.4 Hz, 1H), 4.51 (h, J=7.0 Hz, 1H), 2.36 (s, 3H), 2.34-2.25 (M, 2H), 1.94-1.78 (m, 6H). LCMS (Method B) $t_R$=0.850 min, m/z=434.2, 435.3 [M+H]$^+$; Purity (AUC) ≥95%.

Example 12: 5-Bromo-3-chloro-2-hydroxy-N-(1-isopentyl-1H-imidazol-4-yl)benzenesulfonamide

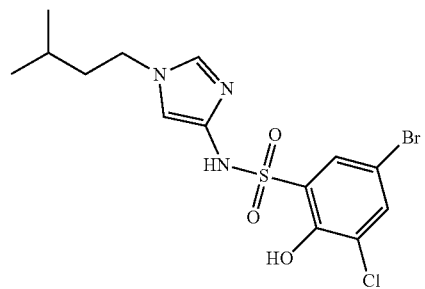 [SMILES: CC(C)CCn1cnc(NS(=O)(=O)c2cc(Br)cc(Cl)c2O)c1]

Step A: 1-Isopentyl-4-nitro-1H-imidazole. Using a procedure analogous to General procedure C, starting with 200 mg (1.57 mmol) of 4-nitro-1H-imidazole and 1-bromo-3-methylbutane (2.05 mmol), 1-isopentyl-4-nitro-1H-imidazole was obtained (182 mg, 0.99 mmol, 63%) after purification. $^1$H NMR (400 MHz, Chloroform-d) δ 7.76 (d, J=1.6 Hz, 1H), 7.41 (d, J=1.6 Hz, 1H), 4.04-3.97 (m, 2H), 1.73-1.64 (m, 2H), 1.54 (dt, J=13.3, 6.7 Hz, 1H), 0.90 (dd, J=6.6, 0.9 Hz, 6H). LCMS (Method A) $t_R$=1.303 min, m/z=184.2 [M+H]$^+$; Purity ($^1$H-NMR) ≥95%.

Step B: 1-Isopentyl-H-imidazol-4-aminium chloride. Using a procedure analogous to General procedure D, starting with 100 mg (0.54 mmol) of 1-isopentyl-4-nitro-1H-imidazole, 1-isopentyl-1H-imidazol-4-aminium chloride was obtained (103 mg) and was used without further purification. LCMS (Method B) $t_R$=0.192 min, m/z=154.3 [M+H]$^+$; Purity (AUC) ≥87%.

Step C: 5-Bromo-3-chloro-2-hydroxy-N-(1-isopentyl-1H-imidazol-4-yl)benzenesulfonamide. Using a procedure analogous to General procedure A, starting with 103 mg of crude 1-isopentyl-1H-imidazol-4-aminium chloride and 5-bromo-3-chloro-2-hydroxybenzenesulfonyl chloride, the title compound was obtained (6 mg, 0.014 mmol, 3%). $^1$H NMR (400 MHz, Chloroform-d) δ 8.07 (s, 1H), 7.73 (d, J=2.4 Hz, 1H), 7.65 (d, J=2.4 Hz, 1H), 7.01 (s, 1H), 4.07 (t, J=7.6 Hz, 2H), 1.75 (dt, J=8.7, 6.7 Hz, 2H), 1.63-1.52 (m, 1H), 0.97 (d, J=6.7 Hz, 6H). LCMS (Method B) $t_R$=0.923 min, m/z=422.2, 423.3 [M+H]$^+$; Purity (AUC) ≥95%.

Example 13: 5-Bromo-3-chloro-N-(1-(cyclobutylmethyl)-1H-imidazol-4-yl)-2-hydroxybenzenesulfonamide

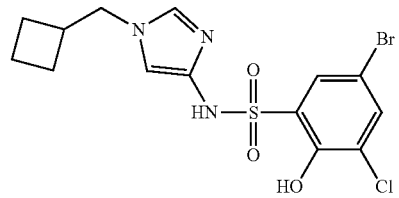 [SMILES: O=S(=O)(Nc1cn(CC2CCC2)cn1)c1cc(Br)cc(Cl)c1O]

Step A: 1-(Cyclobutylmethyl)-4-nitro-1H-imidazole. Using a procedure analogous to General procedure C, starting with 200 mg (1.77 mmol) of 4-nitro-1H-imidazole and (bromomethyl)cyclobutane (2.30 mmol), 1-(cyclobutylmethyl)-4-nitro-1H-imidazole was obtained (320 mg, 1.77 mmol, quant.) after purification. $^1$H NMR (400 MHz, Methanol-d$_4$) δ 8.13 (s, 1H), 7.74 (s, 1H), 4.13 (d, J=7.6 Hz, 2H), 2.79 (pent, J=7.7 Hz, 1H), 2.11-2.00 (m, 2H), 1.97-1.75 (m, 4H). LCMS (Method B) $t_R$=0.223 min, m/z=182.3 [M+H]$^+$; Purity ($^1$H-NMR) ≥95%.

Step B: 1-(Cyclobutylmethyl-1H-imidazol-4-aminium chloride. Using a procedure analogous to General procedure D, starting with 320 mg (1.77 mmol) of 1-(cyclobutylmethyl)-4-nitro-1H-imidazole, 1-(cyclobutylmethyl-1H-imidazol-4-aminium chloride was obtained (500 mg) and was used without further purification. LCMS (Method B) $t_R$=0.090 min, m/z=152.3 [M+H]$^+$; Purity (AUC) ≥95%.

Step C: 5-Bromo-3-chloro-N-(1-(cyclobutylmethyl)-1H-imidazol-4-yl)-2-hydroxybenzenesulfonamide. Using a procedure analogous to General procedure A, starting with 100 mg of crude 1-(cyclobutylmethyl)-1H-imidazol-4-aminium chloride and 5-bromo-3-chloro-2-hydroxybenzenesulfonyl chloride, the title compound was obtained (26 mg, 0.062 mmol, 12%). $^1$H NMR (400 MHz, Chloroform-d) δ 7.88 (d, J=2.4 Hz, 1H), 7.77 (d, J=2.4 Hz, 1H), 7.32 (d, J=1.7 Hz, 1H), 6.76 (s, 1H), 6.72 (d, J=1.7 Hz, 1H), 3.92 (d, J=7.6 Hz, 2H), 2.70 (pent, J=7.6 Hz, 1H), 2.18-2.05 (m, 2H), 2.04-1.86 (m, 2H), 1.81-1.70 (m, 2H). LCMS (Method B) $t_R$=1.111 min, m/z=421.2, 422.3 [M+H]$^+$; Purity (AUC) ≥95%.

Example 14: 5-Bromo-3-chloro-N-(1-(cyclopentylmethyl)-1H-imidazol-4-yl)-2-hydroxybenzenesulfonamide

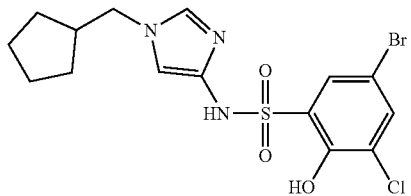 [SMILES: O=S(=O)(Nc1cn(CC2CCCC2)cn1)c1cc(Br)cc(Cl)c1O]

Step A: 1-(Cyclopentylmethyl)-4-nitro-1H-imidazole. Using a procedure analogous to General procedure C, starting with 200 mg (1.77 mmol) of 4-nitro-1H-imidazole and (bromomethyl)cyclopentane (2.30 mmol), 1-(cyclopentylmethyl)-4-nitro-1H-imidazole was obtained (305 mg, 1.56 mmol, 88%) after purification $^1$H NMR (400 MHz, Methanol-d$_4$) δ 8.18 (d, J=1.5 Hz, 1H), 7.76 (d, J=1.5 Hz, 1H), 4.05 (d, J=7.7 Hz, 2H), 2.37 (pent, J=7.7 Hz, 1H), 1.80-1.54 (m, 6H), 1.33-1.20 (m, 2H). LCMS (Method B) $t_R$=0.722 min, m/z=196.3 [M+H]$^+$; Purity (1H-NMR) ≥95%.

Step B: 1-(Cyclopentylmethyl-1H-imidazol-4-aminium chloride. Using a procedure analogous to General procedure D, starting with 305 mg (1.56 mmol) of 1-(cyclopentylmethyl)-4-nitro-1H-imidazole, 1-(Cyclopentylmethyl-1H-imidazol-4-aminium chloride was obtained (204 mg) and was used without further purification. LCMS (Method B) $t_R$=0.095 min, m/z=166.3 [M+H]$^+$; Purity (AUC) ≥65%.

Step C: 5-Bromo-3-chloro-N-(1-(cyclopentylmethyl)-1H-imidazol-4-yl)-2-hydroxybenzenesulfonamide. Using a procedure analogous to General procedure A, starting with 100 mg of crude 1-(cyclopentylmethyl)-1H-imidazol-4-aminium chloride and 5-bromo-3-chloro-2-hydroxybenzenesulfonyl chloride, the title compound was obtained (18 mg, 0.041 mmol, 15%). $^1$H NMR (400 MHz, Chloroform-d) δ 7.92 (d, J=2.4 Hz, 1H), 7.77 (d, J=2.4 Hz, 1H), 7.29 (d, J=1.7 Hz, 1H), 6.74 (d, J=1.7 Hz, 1H), 3.83 (d, J=7.7 Hz, 2H), 2.26 (pent, J=7.7 Hz, 1H), 1.83-1.71 (m, 2H), 1.71-1.55 (m, 4H), 1.26-1.13 (m, 2H). LCMS (Method B) $t_R$=1.151 min, m:=435.2, 436.2 [M+H]$^+$; Purity (AUC) ≥95%.

Example 15: 5-Bromo-3-chloro-2-hydroxy-N-(1-((tetrahydrofuran-2-yl)methyl)-1H-imidazol-4-yl)benzenesulfonamide

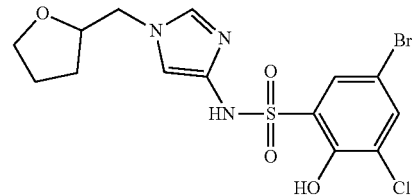 [SMILES: O=S(=O)(Nc1cn(CC2CCCO2)cn1)c1cc(Br)cc(Cl)c1O]

Step A: 4-Nitro-1-((tetrahydrofuran-2-yl)methyl)-1H-imidazole. Using a procedure analogous to General procedure C, starting with 200 mg (1.77 mmol) of 4-nitro-1H-imidazole and 2-(bromomethyl)tetrahydrofuran (2.30 mmol), 4-nitro-1-((tetrahydrofuran-2-yl)methyl)-1H-imidazole was obtained (280 mg, 1.093 mmol, 0.62%), as a mixture with its regioisomer. LCMS (Method B) $t_R$=0.098 min, m/z=198.3 [M+H]$^+$; Purity ($^1$H NMR) ≥77%.

Step B: 1-((Tetrahydrofuran-2-yl)methyl)-1H-imidazol-4-aminium chloride. Using a procedure analogous to General procedure D, starting with 280 mg (1.09 mmol) of the regioisomeric mixture of 4-nitro-1-((tetrahydrofuran-2-yl)methyl)-1H-imidazole, 1-((tetrahydrofuran-2-yl)methyl)-1H-imidazol-4-aminium chloride was obtained (205 mg) and was used without further purification. LCMS (Method B) $t_R$=0.088 min, m/z=168.2 [M+H]$^+$; Purity (AUC) ≥82%.

Step C: 5-Bromo-3-chloro-2-hydroxy-N-(1-((tetrahydrofuran-2-yl)methyl)-1H-imidazol-4-yl)benzenesulfonamide. Using a procedure analogous to General procedure A, starting with 100 mg of crude 1-((tetrahydrofuran-2-yl)methyl)-1H-imidazol-4-aminium chloride and 5-bromo-3-chloro-2-hydroxybenzenesulfonyl chloride, the title compound was obtained was obtained (13 mg, 0.030 mmol, 8%). $^1$H NMR (400 MHz, Methanol-d$_4$) δ 7.67 (d, J=2.5 Hz, 1H), 7.64 (d, J=2.5 Hz, 1H), 7.53 (d, J=1.6 Hz, 1H), 6.83 (d, J=1.6 Hz, 1H), 4.12-4.05 (m, 2H), 3.98-3.90 (m, 1H), 3.78-3.66 (m, 2H), 2.01-1.92 (m, 1H), 1.87-1.76 (m, 11H), 1.66-1.55 (m, 1H), 1.49-1.39 (m, 1H). LCMS (Method B) $t_R$=0.824 min, m/z=436.2, 437.3 [M+H]$^+$; Purity (AUC) ≥95%.

Example 16: 5-Bromo-2-hydroxy-N-(1-((tetrahydrofuran-2-yl)methyl)-1H-imidazol-4-yl)benzenesulfonamide

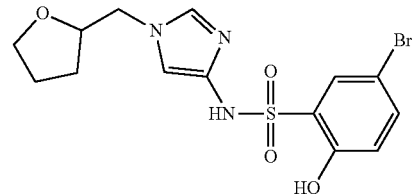 [SMILES: O=S(=O)(Nc1cn(CC2CCCO2)cn1)c1cc(Br)ccc1O]

Using a procedure analogous to General procedure A, starting with 100 mg of crude 1-((tetrahydrofuran-2-yl)methyl)-1H-imidazol-4-aminium chloride and 5-bromo-2-hydroxybenzenesulfonyl chloride (which was prepared by a procedure analogous to that used to prepare Example 1 Step A), the title compound was obtained (16 mg, 0.039 mmol, 10%). $^1$H NMR (400 MHz, Chloroform-d) δ 7.68 (d, J=2.5 Hz, 1H), 7.40 (d, J=1.5 Hz, 1H), 7.24 (d, J=2.5 Hz, 1H), 7.03 (d, J=1.5 Hz, 1H), 6.51 (d, J=8.4 Hz, 1H), 4.17-4.05 (m, 2H), 3.89 (dd, J=14.1, 5.8 Hz, 1H), 3.85-3.73 (m, 2H), 2.08-1.97 (m, 1H), 1.95-1.84 (m, 1H), 1.75-1.63 (m, 1H), 1.52-1.41 (m, 1H). LCMS (Method B) $t_R$=0.746 min, m/z=402.2, 403.3 [M+H]$^+$; Purity (AUC) ≥95%.

Example 17: 5-Bromo-3-chloro-N-(1-cyclobutyl-2-methyl-1-imidazol-4-yl)-2-hydroxybenzenesulfonamide

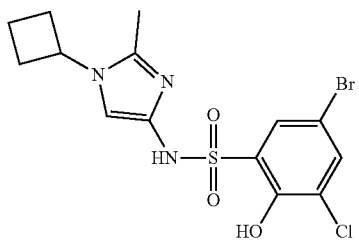 [SMILES: Cc1nc(NS(=O)(=O)c2cc(Br)cc(Cl)c2O)cn1C1CCC1]

Step A: 2-Bromo-1-cyclobutyl-4-nitro-1H-imidazole. Using a procedure analogous to General procedure C, starting with 300 mg (1.56 mmol) of 2-bromo-4-nitro-1H-imidazole and bromocyclobutane (2.03 mmol mmol), 2-bromo-1-cyclobutyl-4-nitro-1H-imidazole was obtained (125 mg) after purification, as a mixture with some impurities. LCMS (Method B) $t_R$=0.564 min, m/z=246.0, 248.2 [M+H]$^+$.

Step B: 1-Cyclobutyl-2-methyl-4-nitro-1H-imidazole. To a mixture containing 125 mg of impure 2-bromo-1-cyclobutyl-4-nitro-1H-imidazole, 59 mg (0.04 mmol, 0.10 eq) of Pd(PPh$_3$)$_4$ and 2.5 mL of dioxane was added 40 mg (0.66 mmol, 1.3 eq) of methyl boronic acid, 162 mg (1.52 mmol, 3 eq) of Na$_2$CO$_3$, and 0.360 μL of H$_2$O. The reaction vial was purged with argon, capped, and heated at 75° C. for 2 days. Water was added and the mixture was extracted with DCM. The organic phase was dried over a phase separator and the solvent was removed under reduced pressure. The residue was purified using ISCO flash chromatography to give 43 mg (0.24 mmol, 15%) 1-cyclobutyl-2-methyl-4-nitro-1H-imidazole as a white solid. LCMS (Method B) $t_R$=0.107 min, m/z=182.3 [M+H]$^+$; Purity (AUC) ≥95%.

Step C: 1-Cyclobutyl-2-methyl-1H-imidazol-4-aminium chloride. Using a procedure analogous to General procedure D, starting with 43 mg (0.24 mmol) of cyclobutyl-2-methyl-4-nitro-1H-imidazole, 1-cyclobutyl-2-methyl-1H-imidazol-4-aminium chloride was obtained (46 mg) and was used without further purification as HCl salt. LCMS (Method B) $t_R$=0.157 min, m/z=152.3 [M+H]$^+$; Purity (AUC) ≥71%.

Step D: 5-Bromo-3-chloro-N-(cyclopentyl-2-methyl-1H-imidazol-4-yl)-2-hydroxybenzenesulfonamide. Using a procedure analogous to General procedure A, starting with 46 mg of crude 1-cyclobutyl-2-methyl-1H-imidazol-4-aminium chloride and 5-bromo-3-chloro-2-hydroxybenzenesulfonyl chloride, the title compound was obtained (5 mg, 0.012 mmol, 5%). $^1$H NMR (400 MHz, Methanol-d$_4$) δ 7.76 (d, J=2.5 Hz, 1H), 7.64 (d, J=2.5 Hz, 1H), 6.85 (s, 1H), 4.69-4.56 (m, 1H), 2.50-2.39 (m, 2H), 2.30-2.20 (m, 5H), 1.91-1.78 (m, 2H). LCMS (Method B) $t_R$=1.044 min, m/z=421.2, 422.2 [M+H]$^+$; Purity (AUC) ≥95%.

Example 18: 5-Bromo-3-chloro-N-(1-(dicyclopropylmethyl)-1-imidazol-4-yl)-2-hydroxybenzenesulfonamide

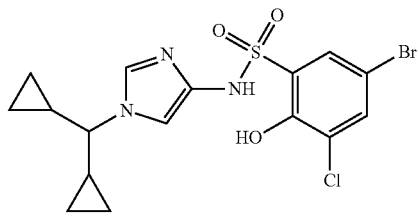 [SMILES: O=S(=O)(Nc1cn(C(C2CC2)C2CC2)cn1)c1cc(Br)cc(Cl)c1O]

Step A: 1-(Dicyclopropylmethyl)-4-nitro-1H-imidazole. Using a procedure analogous to General Procedure G, starting with 100 mg (0.63 mmol) of 1,4-dinitro-1H-imidazole (Example 8, Step A) and dicyclopropylmethaneamine (1.10 mmol), 1-(dicyclopropylmethyl)-4-nitro-1H-imidazole was obtained (37 mg, 0.18 mmol, 28%) as a yellow solid. $^1$H NMR (400 MHz, Chloroform-d) δ 7.97 (d, J=1.6 Hz, 1H), 7.60 (d, J=1.6 Hz, 1H), 2.85 (t, J=8.9 Hz, 1H), 1.30-1.17 (m, 2H), 0.87-0.75 (m, 2H), 0.73-0.62 (m, 2H), 0.56-0.45 (m, 2H), 0.43-0.32 (m, 2H). Purity ($^1$H NMR) ≥94%.

Step B: 1-(Dicyclopropylmethyl)-1H-imidazol-4-aminium chloride. Using a procedure analogous to General procedure D, starting with 37 mg (0.18 mmol) of 1-(dicyclopropylmethyl)-4-nitro-1H-imidazole, 1-(dicyclopropylmethyl)-1H-imidazol-4-aminium chloride was obtained (44 mg) and was used without further purification. LCMS (Method B) $t_R$=0.232 min, m/z=178.3 [M+H]$^+$; Purity (AUC) ≥88%.

Step C: 5-Bromo-3-chloro-N-(1-dicyclopropylmethyl-1-imidazol-4-yl)-2-hydroxybenzenesulfonamide. Using a procedure analogous to General procedure A, starting with 44 mg of crude 1-cyclobutyl-2-methyl-1H-imidazol-4-aminium chloride and 5-bromo-3-chloro-2-hydroxybenzenesulfonyl chloride, the title compound was obtained (8 mg, 0.018 mmol, 10%). $^1$H NMR (400 MHz, Methanol-d$_4$) δ 8.66 (d, =1.7 Hz, 1H), 7.82 (d, J=2.5 Hz, 1H), 7.73 (d, J=2.5 Hz, 1H), 7.30 (d, =1.7 Hz, 1H), 3.01 (t, J=9.3 Hz, 1H), 1.39-1.26 (m, 2H), 0.82-0.72 (m, 2H), 0.62-0.48 (m, 4H), 0.37-0.25 (m, 2H). LCMS (Method A) $t_R$=1.615 min, m/z=445.8, 446.8 [M+H]$^+$; Purity (AUC) ≥95%.

Example 19: 5-Bromo-3-chloro-2-hydroxy-N-(1-(2-(trifluoromethyl)phenyl)-1H-imidazol-4-yl)benzenesulfonamide

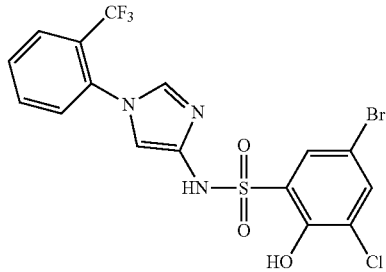 [SMILES: O=S(=O)(Nc1cn(-c2ccccc2C(F)(F)F)cn1)c1cc(Br)cc(Cl)c1O]

Step A: 4-Nitro-1-(2-(trifluoromethyl)phenyl)-1H-imidazole. Using a procedure analogous to General Procedure G starting with 100 mg (0.63 mmol) of 1,4-dinitro-1H-imidazole (Example 8, Step A) with 2-(trifluoromethyl)aniline (1.10 mmol), 4-nitro-1-(2-(trifluoromethyl)phenyl)-1H-imidazole was obtained (20 mg, 0.08 mmol, 12%) as a yellow solid. $^1$H NMR (400 MHz, Chloroform-d) δ 7.96-7.87 (m, 2H), 7.87-7.70 (m, 2H), 7.58 (dd, J=1.6, 0.8 Hz, 1H), 7.52-7.45 (m, 1H). LCMS (Method B) $t_R$=0.777 min, m/z=258.2 [M+H]$^+$; Purity (AUC) ≥95%.

Step B: 1-(2-(Trifluoromethyl)phenyl)-1H-imidazole-4-aminium chloride. Using a procedure analogous to General procedure D, starting with 20 mg (0.08 mmol) of 4-nitro-1-(2-(trifluoromethyl)phenyl)-1H-imidazole, 1-(2-(trifluoromethyl)phenyl)-1H-imidazole-4-aminium chloride was obtained (22 mg) and was used without further purification. LCMS (Method B) $t_R$=0.254 min, m/z=228.3 [M+H]$^+$; Purity (AUC) ≥95%.

Step C: 5-Bromo-3-chloro-2-hydroxy-N-(1-(2-(trifluoromethyl)phenyl)-1-imidazol-4-yl)benzenesulfonamide. Using a procedure analogous to General procedure A, starting with 22 mg of crude 1-(2-(trifluoromethyl)phenyl)-1H-imidazole-4-aminium chloride and 5-bromo-3-chloro-2-hydroxybenzenesulfonyl chloride, the title compound was obtained (18 mg, 0.036 mmol, 45%). $^1$H NMR (400 MHz, Chloroform-d) δ 7.86 (d, J=7.7 Hz, 1H), 7.74 (t, J=7.7 Hz, 1H), 7.71-7.63 (m, 3H), 7.50 (s, 1H), 7.45 (d, J=7.7 Hz, 1H), 7.13 (s, 1H). $^{19}$F NMR (376 MHz, Chloroform-d) δ −59.42 (3F). LCMS (Method B) $t_R$=1.138 min, m/z=496.2, 497.2 [M+H]$^+$; Purity (AUC) ≥95%.

Example 20: 5-Bromo-3-chloro-N-(1-(cyclopropylmethyl)-2-methyl-1H-imidazol-4-yl)-2-hydroxybenzenesulfonamide

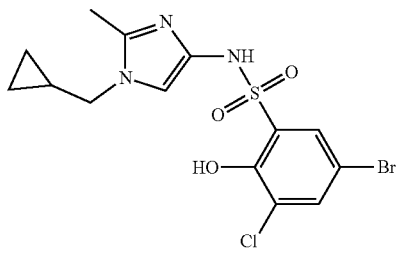 [SMILES: Cc1nc(NS(=O)(=O)c2cc(Br)cc(Cl)c2O)cn1CC1CC1]

Step A: 2-Bromo-1-(cyclopropylmethyl)-4-nitro-1H-imidazole. Using a procedure analogous to General procedure C, starting with 500 mg (2.60 mmol) of 2-bromo-4-nitro-1H-imidazole and 1-bromo-1-cyclopropylmethane (3.39 mmol mmol), 2-bromo-1-(cyclopropylmethyl)-4-nitro-1H-imidazole was obtained (504 mg, 2.05 mmol, 79%) product. $^1$H NMR (400 MHz, Chloroform-d) δ 7.95 (s, 1H), 3.84 (d, J=7.3 Hz, 2H), 1.30-1.18 (m, 1H), 0.78-0.69 (m, 2H), 0.49-0.39 (m, 2H). LCMS (Method B) $t_R$=0.721 min, m/z=246.1, 248.1 [M+H]$^+$; Purity (AUC) ≥95%.

Step B: 1-(Cyclopropylmethyl)-2-methyl-4-nitro-1H-imidazole. To a mixture containing 200 mg (0.81 mmol) of 2-bromo-1-(cyclopropylmethyl)-4-nitro-1H-imidazole, 94 mg (0.08 mmol, 0.10 eq) of Pd(PPh$_3$)$_4$, and 1.45 mL of dioxane was added, 63 mg (1.06 mmol, 1.3 eq) of methyl boronic acid, 258 mg (2.44 mmol, 3 eq) of Na$_2$CO$_3$, and 0.370 μL of H$_2$O. The reaction vial was purged with argon, capped, and heated at 75° C. for 2 days. Water was added and the mixture was extracted with DCM. The organic phase was dried over a phase separator and the solvent was removed under reduced pressure. The residue was purified using ISCO flash chromatography to give 60 mg (0.24 mmol, 15%) of 1-(cyclopropylmethyl)-2-methyl-4-nitro-1H-imidazole as a white solid. $^1$H NMR (400 MHz, Chloroform-d) δ 7.83 (s, 1H), 3.74 (d, J=7.1 Hz, 2H), 2.41 (s, 3H), 1.26-1.12 (m, 1H), 0.79-0.71 (m, 2H), 0.44-0.36 (m, 2H). LCMS (Method B) $t_R$=0.124 min, m/z=181.7 [M+H]$^+$; Purity (AUC) ≥84%.

Step C: 1-(Cyclopropylmethyl)-2-methyl-1H-imidazole-4-aminium chloride. Using a procedure analogous to General procedure D, starting with 60 mg (0.33 mmol) of 1-(cyclopropylmethyl)-2-methyl-4-nitro-1H-imidazole, 1-(cyclopropylmethyl)-2-methyl-1H-imidazole-4-aminium chloride was obtained (36 mg) and was used without further purification. LCMS (Method B) $t_R$=0.129 min, m/z=152.4 [M+H]$^+$; Purity (AUC) ≥73%.

Step D: 5-Bromo-3-chloro-N-(1-(cyclopropylmethyl)-2-methyl-1H-imidazol-4-yl)-2-hydroxybenzenesulfonamide. Using a procedure analogous to General procedure A, starting with 36 mg of crude 1-(cyclopropylmethyl)-2-methyl-1H-imidazole-4-aminium chloride and 5-bromo-3-chloro-2-hydroxybenzenesulfonyl chloride, the title compound was obtained (5 mg, 0.012 mmol, 4%). $^1$H NMR (400 MHz, Chloroform-d) δ 7.89 (d, J=2.4 Hz, 1H), 7.77 (d, J=2.4 Hz, 1H), 6.90 (s, 1H), 3.73 (d, J=7.1 Hz, 2H), 2.48 (s, 3H), 1.21-1.10 (m, 1H), 0.77 (q, J=5.5 Hz, 2H), 0.40 (q, J=5.5 Hz, 2H). LCMS (Method A) $t_R$=1.776 min, m/z=420.7, 421.8 [M+H]$^+$, Purity (AUC) ≥95%.

Example 21: 5-Bromo-3-chloro-N-(1-(cyclopentylmethyl)-2-methyl-1H-imidazol-4-yl)-2-hydroxybenzenesulfonamide

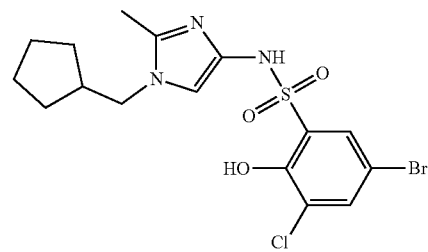 [SMILES: Cc1nc(NS(=O)(=O)c2cc(Br)cc(Cl)c2O)cn1CC1CCCC1]

Step A: 2-Bromo-1-(cyclopentylmethyl)-4-nitro-1H-imidazole. Using a procedure analogous to General procedure C, starting with 400 mg (2.08 mmol) of 2-bromo-4-nitro-1H-imidazole and 1-bromo-1-cyclopentylmethane (2.71 mmol), 2-bromo-1-(cyclopentylmethyl)-4-nitro-1H-imidazole was obtained (352 mg, 1.28 mmol, 62%). $^1$H NMR (400 MHz, Chloroform-d) δ 7.80 (s, 1H), 3.93 (d, J=7.7 Hz, 2H), 2.34 (pent, J=7.7 Hz, 1H), 1.82-1.55 (m, 7H), 1.31-1.25 (m, 1H). LCMS (Method B) $t_R$=0.932 min, m/z=274.2, 275.1 [M+H]$^+$; Purity (AUC) ≥95%.

Step B: 1-(Cyclopropylmethyl)-2-methyl-4-nitro-1H-imidazole. To a mixture containing 119 mg (0.43 mmol) of 2-bromo-1-(cyclopentylmethyl)-4-nitro-1H-imidazole, 50 mg (0.04 mmol, 0.10 eq) of Pd(PPh$_3$)$_4$, and 1.45 mL of dioxane was added 34 mg (047 mmol, 1.3 eq) of methyl boronic acid, 138 mg (1.09 mmol, 3 eq) of Na$_2$CO$_3$, and 0.370 μL of H$_2$O were added. The reaction vial was purged with argon, capped, and stirred for 3 days at 85° C. Water was added and the mixture was extracted with DCM. The organic phase was dried over a phase separator and the solvent was removed under reduced pressure. The residue was purified using ISCO flash chromatography to give 41 mg of 1-(cyclopropylmethyl)-2-methyl-4-nitro-1H-imidazole as an impure yellow oil. LCMS (Method B) $t_R$=0.798 min, m/z=210.2 [M+H]⁺; Purity (¹H NMR) ≥66%.

Step C: 1-(Cyclopentylmethyl)-2-methyl-1H-imidazole-4-aminium chloride. Using a procedure analogous to General procedure D, starting with 41 mg of the mixture containing 1-(cyclopentylmethyl)-2-methyl-4-nitro-1H-imidazole, 1-(cyclopentylmethyl)-2-methyl-1H-imidazole-4-aminium was obtained (54 mg) and was used without further purification as HCl salt. LCMS (Method B) $t_R$=0.092 min, m/z=197.3 [M+NH₄]⁺.

Step D: 5-Bromo-3-chloro-N-(1-(cyclopentylmethyl)-2-methyl-1H-imidazol-4-yl)-2-hydroxybenzenesulfonamide. Using a procedure analogous to General procedure A, starting with 54 mg of crude 1-(cyclopentylmethyl)-2-methyl-1H-imidazole-4-aminium chloride and 5-bromo-3-chloro-2-hydroxybenzenesulfonyl chloride, the title compound was obtained (3 mg, 0.007 mmol, 2%). ¹H NMR (400 MHz, Chloroform-d) δ 7.90 (d, J=2.4 Hz, 1H), 7.76 (d, J=2.4 Hz, 1H), 6.68 (s, 1H), 3.77 (d, J=7.6 Hz, 2H), 2.44 (s, 3H), 2.23 (pent, J=7.7 Hz, 1H), 1.82-1.72 (m, 2H), 1.72-1.59 (m, 4H), 1.27-1.14 (m, 2H). LCMS (Method A) $t_R$=1.972 min, m/z=448.8, 449.8 [M+H]⁺; Purity (AUC) ≥95%.

Example 22: 5-Bromo-3-chloro-N-(1-(cyclobutylmethyl)-2-methyl-1H-imidazol-4-yl)-2-hydroxybenzenesulfonamide

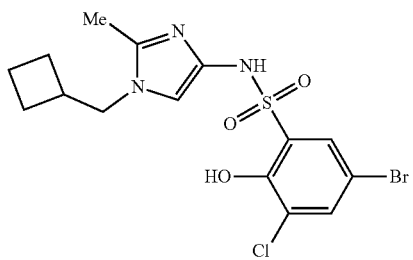 [SMILES: Cc1nc(NS(=O)(=O)c2cc(Br)cc(Cl)c2O)cn1CC1CCC1]

Step A: 1-(Cyclopentylmethyl)-2-methyl-4-nitro-1H-imidazole. Using a procedure analogous to General procedure C, starting with 100 mg (0.79 mmol) of 2-methyl-4-nitro-1H-imidazole and 1-bromo-1-cyclobutylmethane (1.02 mmol mmol), 1-(cyclopentylmethyl)-2-methyl-4-nitro-1H-imidazole was obtained (93 mg, 0.48 mmol, 60%). ¹H NMR (400 MHz, Chloroform-d) δ 7.59 (s, 1H), 3.86 (d, J=7.4 Hz, 2H), 2.65 (pent, J=7.7 Hz, 1H), 2.34 (s, 3H), 2.11-1.98 (m, 2H), 1.95-1.77 (m, 2H), 1.77-1.63 (m, 2H). LCMS (Method B) $t_R$=0.557 min, m/z=196.3 [M+H]⁺; Purity (AUC) ≥95%.

Step B: 1-(Cyclobutylmethyl)-2-methyl-1H-imidazole-4-aminium chloride. Using a procedure analogous to General procedure D, starting with 93 mg (0.48 mmol) of 1-(cyclopentylmethyl)-2-methyl-4-nitro-1H-imidazole, 1-(cyclobutylmethyl)-2-methyl-1H-imidazole-4-aminium was obtained (95 mg) and was used without further purification as HCl salt. LCMS (Method B) $t_R$=0.096 min, m: =166.4 [M+H]⁺; Purity (AUC) ≥95%.

Step C: 5-Bromo-3-chloro-N-(1-(cyclobutylmethyl)-2-methyl-1H-imidazol-4-yl-2-hydroxybenzenesulfonamide. Using a procedure analogous to General procedure A, starting with 95 mg of crude 1-(cyclobutylmethyl)-2-methyl-1H-imidazole-4-aminium chloride and 5-bromo-3-chloro-2-methoxybenzenesulfonyl chloride, the title compound was obtained (15 mg, 0.034 mmol, 8%). ¹H NMR (400 MHz, Chloroform-d) δ 7.90 (d, J=2.4 Hz, 1H), 7.76 (d, J=2.4 Hz, 1H), 6.64 (s, 1H), 3.84 (d, J=7.4 Hz, 2H), 2.68 (pent, J=7.7 Hz, 1H), 2.43 (s, 3H), 2.18-2.06 (m, 2H), 2.03-1.87 (m, 2H), 1.81-1.69 (m, 2H). LCMS (Method B) $t_R$=1.066 min, m/z=435.2, 436.3 [M+H]⁺; Purity (AUC) ≥95%.

Example 23: 6-Bromo-N-(1-cyclopentyl-1H-imidazol-4-yl)quinoline-8-sulfonamide

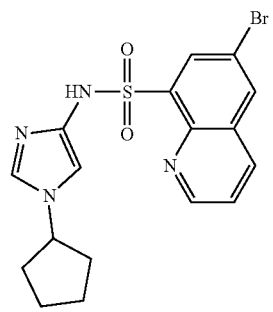 [SMILES: O=S(=O)(Nc1cn(C2CCCC2)cn1)c1cc(Br)cc2cccnc12]

Using a procedure analogous to General procedure A, starting with 80 mg of crude of cyclopentyl-1H-imidazol-4-aminium chloride (Example 1, Step C) and 6-bromoquinoline-sulfonyl chloride (0.47 mmol, 1.1 eq), the title compound was obtained 19 mg (0.045 mmol). ¹H NMR (400 MHz, Chloroform-) S 9.04 (dd, J=4.4, 1.8 Hz, 1H), 8.40 (d, J=2.2 Hz, 1H), 8.24 (d, J=2.2 Hz, 1H), 8.19 (dd, J=8.4, 1.8 Hz, 1H), 8.05 (d, J=1.8 Hz, 1H), 7.60 (dd, J=8.4, 4.4 Hz, 1H), 7.14 (d, J=1.8 Hz, 1H), 4.50 (pent, J=6.8 Hz, 1H), 2.34-2.22 (m, 2H), 1.93-1.75 (m, 6H). LCMS (Method B) $t_R$=0.800 min, m/z=422.3, 423.3 [M+H]⁺; Purity (AUC) ≥95%.

Example 24: 6-Bromo-N-(1-cyclopentyl-1H-imidazol-5-yl)quinoline-8-sulfonamide

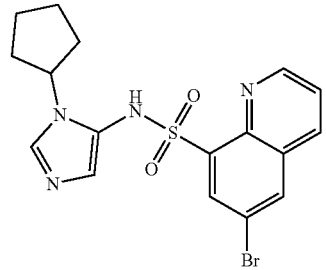 [SMILES: O=S(=O)(Nc1cncn1C1CCCC1)c1cc(Br)cc2cccnc12]

Using a procedure analogous to General procedure A, starting with 80 mg of crude of cyclopentyl-1H-imidazol-4-aminium chloride (Example 1, Step C) and 6-bromoquinoline-sulfonyl chloride (0.47 mmol, 1.1 eq), was obtained (9 mg, 0.021 mmol). ¹H NMR (400 MHz, Chloroform-d) δ 9.20 (dd, J=4.3, 1.8 Hz, 1H), 8.54 (d, J=2.2 Hz, 1H), 8.27 (d, J=2.2 Hz, 1H), 8.17 (dd, J=8.4, 1.8 Hz, 1H), 7.58 (dd, J=8.4, 4.2 Hz, 1H), 7.18 (d, J=1.8 Hz, 1H), 6.83 (d, J=1.8 Hz, 1H), 4.36 (pent, J=6.8 Hz, 1H), 2.22-2.11 (m, 2H), 1.86-1.76 (m, 4H), 11.76-1.67 (m, 2H). LCMS (Method B) $t_R$=1.011 min, m/z=422.3, 423.2 [M+H]⁺; Purity (AUC) ≥95%.

Example 25: 6-Bromo-N-(1-cyclopentyl-2-methyl-1H-imidazol-4-yl)quinoline-8-sulfonamide

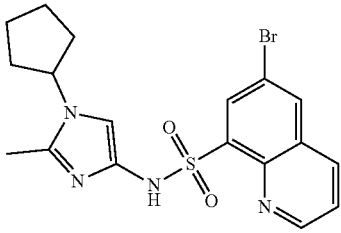 [SMILES: Cc1nc(NS(=O)(=O)c2cc(Br)cc3cccnc23)cn1C1CCCC1]

Using a procedure analogous to General procedure A, starting with 40 mg of crude 1-cyclopentyl-5-methyl-1H-imidazol-4-aminium chloride (Example 11, Step B) and 6-bromoquinoline-sulfonyl chloride (0.22 mmol, 1.1 eq), the title compound was obtained (33 mg, 0.076 mmol). $^1$H NMR (400 MHz, Chloroform-d) δ 9.13 (dd, J=4.3, 1.7 Hz, 1H), 8.99 (s, 1H), 8.50 (d, J=2.2 Hz, 1H), 8.31 (d, J=2.2 Hz, 1H), 8.18 (dd, J=8.4, 1.7 Hz, 1H), 7.59 (dd, J=8.4, 4.3 Hz, 1H), 6.89 (s, 1H), 4.43 (pent, J=7.3 Hz, 1H), 2.39 (s, 3H), 2.27-2.16 (m, 2H), 1.95-1.85 (m, 2H), 1.85-1.72 (m, 4H). LCMS (Method B) ta: 0.974 min, m/z=436.2, 437.3 [M+H]$^+$; Purity (AUC) ≥95%.

Example 26: 5-Bromo-3-chloro-N-(1-cyclopentyl-2-(methylsulfonyl)-1H-imidazol-4-yl)-2-hydroxybenzenesulfonamide

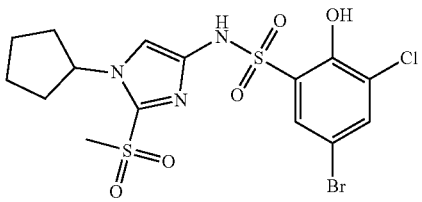 [SMILES: CS(=O)(=O)c1nc(NS(=O)(=O)c2cc(Br)cc(Cl)c2O)cn1C1CCCC1]

Step A: 1-Cyclopentyl-2-(methylthio)-4-nitro-1H-imidazole. Using a procedure analogous to General Procedure H, starting with 500 mg (1.92 mmol) of 2-bromo-1-cyclopentyl-4-nitro-1H-imidazole (Example 9, Step A) and sodium methanethiolate, 1-cyclopentyl-2-(methylthio)-4-nitro-1H-imidazole was obtained (124 mg, 0.55 mmol, 29%). $^1$H NMR (400 MHz, Chloroform-d) δ 7.76 (s, 1H), 4.50-4.40 (m, 1H), 2.66 (s, 3H), 2.28-2.08 (m, 2H), 1.90-1.67 (m, 6H). LCMS (Method B) $t_R$=0.881 min, m/z=228.3 [M+H]$^+$; Purity (AUC) ≥95%.

Step B: 1-Cyclopentyl-2-(methylsulfonyl)-4-nitro-1H-imidazole. Using a procedure analogous to General Procedure I, starting with 124 mg (0.55 mmol) of 1-cyclopentyl-2-(methylthio)-4-nitro-1H-imidazole, 1-cyclopentyl-2-(methylsulfonyl)-4-nitro-1H-imidazole was obtained (142 mg, 0.62 mmol, 90%) as a crude mixture. $^1$H NMR (400 MHz, Chloroform-d) δ 7.92 (s, 1H), 5.33-5.22 (m, 1H), 3.47 (s, 3H), 2.41-2.30 (m, 2H), 1.93-1.74 (m, 6H). $^{13}$C NMR (101 MHz, Chloroform-d) δ 145.5, 142.7, 120.0, 60.34, 42.5, 34.3, 24.0. LCMS (Method B) $t_R$=0.763 min, m/z=260.2 [M+H]$^+$; Purity (AUC) ≥90%.

Step C: 1-Cyclopentyl-2-(methylsulfonyl)-1H-imidazole-4-aminium chloride. Using a procedure analogous to General procedure D, starting with 30 mg (0.13 mmol) of 1-cyclopentyl-2-(methylsulfonyl)-4-nitro-1H-imidazole, 1-cyclopentyl-2-(methylsulfonyl)-1H-imidazole-4-aminium chloride obtained (25 mg) and was used without further purification. LCMS (Method B) $t_R$=0.186 min, m/z=230.3 [M+H]$^+$; Purity (AUC) ≥44%.

Step D: 5-Bromo-3-chloro-N-(1-(cyclobutylmethyl)-2-methyl-1H-imidazol-4-yl)-2-hydroxybenzenesulfonamide. Using a procedure analogous to General procedure A, starting with 25 mg of crude 1-cyclopentyl-2-(methylsulfonyl)-1H-imidazole-4-aminium chloride and 5-bromo-3-chloro-2-hydroxybenzenesulfonyl chloride, the title compound was obtained (13 mg, 0.026 mmol, 20%). $^1$H NMR (400 MHz, Chloroform-d) δ 7.88 (d, J=2.3 Hz, 2H), 7.47 (s, 1H), 5.47 (pent, J=6.8, 6.4 Hz, 1H), 3.44 (s, 3H), 2.56-2.45 (m, 2H), 2.10-2.04 (m, 2H), 2.04-1.92 (m, 4H). $^{13}$C NMR (151 MHz, Chloroform-d) δ 149.9, 140.4, 137.7, 133.7, 130.1, 125.7, 124.4, 112.9, 111.5, 59.2, 43.2, 34.2, 24.12. LCMS (Method B) $t_R$=1.027 min, m/z=498.2, 499.3 [M+H]$^+$; Purity (AUC) ≥95%.

Example 27: 5-Bromo-3-chloro-2-hydroxy-N-(1-isopropyl-1H-imidazol-4-yl)benzenesulfonamide

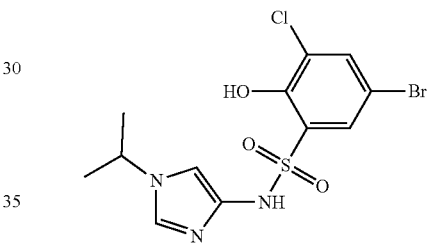

Step A: 1-Isopropyl-4-nitro-1H-imidazole. Using a procedure analogous to General procedure C, starting with 200 mg (1.77 mmol) of 4-nitroimidazole and 2-bromopropane (2.12 mmol), 1-isopropyl-4-nitro-1H-imidazole was obtained (225 mg, 1.45 mmol, 82%). $^1$H NMR (400 MHz, Chloroform-d) δ 7.82 (d, J=1.6 Hz, 1H), 7.49 (d, J=1.6 Hz, 1H), 4.43 (pent, J=6.7 Hz, 1H), 1.55 (d, J=6.7 Hz, 6H). LCMS (Method B) $t_R$=0.125 min, m/z=156.3 [M+H]$^+$; Purity (AUC) ≥95%.

Step B: 1-Isopropyl-1H-imidazol-4-aminium chloride. Using a procedure analogous to General procedure D, starting with 225 mg (1.45 mmol) of 1-isopropyl-4-nitro-1H-imidazole, 1-isopropyl-1H-imidazol-4-aminium chloride was obtained (295 mg) and was used without further purification. LCMS (Method A) $t_R$=0.086 min, m/z=126.3 [M+H]$^+$.

Step C: 5-Bromo-3-chloro-2-hydroxy-N-(1-isopropyl-1-imidazol-4-yl)benzenesulfonamide. Using a procedure analogous to General procedure A, starting with 50 mg of crude 1-isopropyl-1H-imidazol-4-aminium chloride and 5-bromo-3-chloro-2-hydroxybenzenesulfonyl chloride, the title compound was obtained (21 mg, 0.053 mmol, 4%). $^1$H NMR (400 MHz, Chloroform-d) δ 9.77 (s, 1H), 8.08 (d, J=1.8 Hz, 1H), 7.73 (d, J=2.4 Hz, 1H), 7.64 (d, J=2.4 Hz, 1H), 7.05 (d, J=1.7 Hz, 1H), 4.46 (hept, J=6.7 Hz, 1H), 1.57 (d, J=6.7 Hz, 6H). LCMS (Method B) $t_R$=0.807 min, m/z=394.1, 396.2 [M+H]$^+$; Purity (AUC) ≥95%.

Example 28: Ethyl 4-((5-bromo-3-chloro-2-hydroxyphenyl)sulfonamido)-1-cyclopentyl-1H-imidazole-2-carboxylate

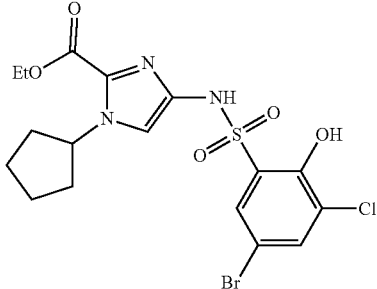

Step A: Ethyl 4-nitro-1H-imidazole-2-carboxylate. Using a procedure analogous to General Procedure E, starting with 560 mg (4.00 mmol) of ethyl 1H-imidazole-2-carboxylate, ethyl 4-nitro-1H-imidazole-2-carboxylate was obtained (386 mg, 2.08 mmol, 82%) and used without further purification. $^1$H NMR (400 MHz, Methanol-$d_4$) δ 7.74 (s, 1H), 3.96 (q, J=7.1 Hz, 2H), 0.93 (t, J=7.1 Hz, 4H). LCMS (Method B) $t_R$=0.100 min, m/z=186.2 [M+H]$^+$; Purity (AUC) ≥95%.

Step B: Ethyl 1-cyclopentyl-4-nitro-1H-imidazole-2-carboxylate. Using a procedure analogous to General procedure C, starting with 300 mg (1.62 mmol) of ethyl 4-nitro-1H-imidazole-2-carboxylate and bromocyclopentane (1.94 mmol), ethyl 1-cyclopentyl-4-nitro-1H-imidazole-2-carboxylate was obtained (252 mg, 0.995 mmol, 61%). $^1$H NMR (400 MHz, Chloroform-d) δ 7.93 (s, 1H), 5.49 (pent, J=7.1 Hz, 2H), 4.41-4.30 (m, 2H), 2.32-2.18 (m, 2H), 1.86-1.69 (m, 6H), 1.38-1.29 (m, 3H). LCMS (Method B) $t_R$=0.873 min, m/z=254.2 [M+H]$^+$; Purity (AUC) ≥95%.

Step C: Ethyl 1-cyclopentyl-1H-imidazole-4-aminium chloride-2-carboxylate. Using a procedure analogous to General procedure D, starting with 150 mg (0.592 mmol) of ethyl 1-cyclopentyl-4-nitro-1H-imidazole-2-carboxylate, ethyl 1-cyclopentyl-1H-imidazole-4-aminium chloride-2-carboxylate was obtained (159 mg) and was used without further purification. LCMS (Method A) $t_R$=0.625 min, m/z=224.3 [M+H]$^+$. Purity (AUC) ≥65%.

Step D: Ethyl 4-((5-bromo-3-chloro-2-hydroxyphenyl)sulfonamido)-1-cyclopentyl-1H-imidazole-2-carboxylate. Using a procedure analogous to General procedure A, starting with 159 mg of crude ethyl 1-cyclopentyl-1H-imidazole-4-aminium chloride-2-carboxylate and 5-bromo-3-chloro-2-hydroxybenzenesulfonyl chloride, the title compound was obtained (76.5 mg, 0.155 mmol, 25$^1$H NMR (400 MHz, Chloroform-d) δ 7.70 (d, J=2.4 Hz, 1H), 7.56 (d, J=2.4 Hz, 1H), 7.14 (s, 1H), 5.61-5.51 (m, 1H), 4.23 (q, J=7.1 Hz, 2H), 2.30-2.19 (m, 2H), 1.90-1.71 (m, 6H), 1.15 (t, J=7.1 Hz, 3H). %). $^{13}$C NMR (101 MHz, Chloroform-d) δ 158.1, 150.8, 137.3, 134.6, 132.8, 130.2, 127.6, 124.5, 112.4, 110.7, 62.0, 59.3, 34.0, 24.2, 13.9. LCMS (Method B) $t_R$=1.128 min, m/z=492.2, 493.3 [M+H]$^+$; Purity (AUC) ≥95%.

Example 29: 4-((5-Bromo-3-chloro-2-hydroxyphenyl)sulfonamido)-1-cyclopentyl-1H-imidazole-2-carboxylic acid

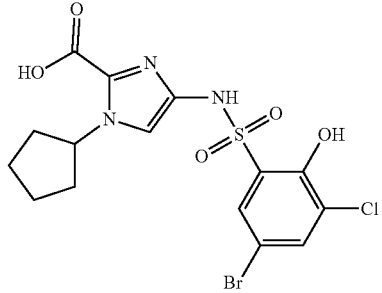 [SMILES: O=C(O)c1nc(NS(=O)(=O)c2cc(Br)cc(Cl)c2O)cn1C1CCCC1]

Using a procedure analogous to General Procedure M starting with 27 mg (0.047 mmol) of ethyl 4-((5-bromo-3-chloro-2-hydroxyphenyl)sulfonamido)-1-cyclopentyl-1H-imidazole-2-carboxylate, the title compound was obtained (6 mg, 0.013 mmol, 27%). $^1$H NMR (400 MHz, Methanol-$d_4$) δ 7.76 (d, J=2.4 Hz, 1H), 7.74 (d, J=2.4 Hz, 1H), 7.14 (s, 1H), 5.59 (pent, J=6.7 Hz, 1H), 2.25-2.15 (m, 2H), 1.87-1.80 (m, 2H), 1.80-1.69 (m, 4H). $^{13}$C NMR (101 MHz, Chloroform-d) δ 158.1, 150.8, 137.3, 134.6, 132.8, 130.2, 127.6, 124.4, 112.4, 110.7, 62.0, 59.3, 34.0, 24.2, 13.9. LCMS (Method A) $t_R$=1.552 min, m/z=463.8, 464.8 [M+H]$^+$: Purity ($^1$H-NMR) ≥95%.

Example 30: 4-((5-Bromo-3-chloro-2-hydroxyphenyl)sulfonamido)-1-cyclopentyl-N-methyl-1H-imidazole-2-carboxamide

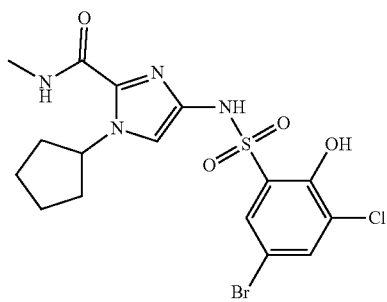 [SMILES: CNC(=O)c1nc(NS(=O)(=O)c2cc(Br)cc(Cl)c2O)cn1C1CCCC1]

Using a procedure analogous to General Procedure N, starting with 20 mg (0.047 mmol) of 4-((5-bromo-3-chloro-2-hydroxyphenyl)sulfonamido)-1-cyclopentyl-1H-imidazole-2-carboxylic acid and methylamine, the title compound was obtained (11 mg, 0.023 mmol, 49%). $^1$H NMR (600 MHz, Methanol-$d_4$) δ 7.74 (d, J=2.4 Hz, 1H), 7.71 (d, J=2.4 Hz, 1H), 6.99 (s, 1H), 5.65 (pent, J=7.3 Hz, 1H), 2.83 (s, 3H), 2.18-2.11 (m, 2H), 1.85-1.76 (m, 2H), 1.76-1.65 (m, 4H). $^{13}$C NMR (151 MHz, Methanol-$d_4$) δ 161.3, 152.3, 137.9, 137.2, 135.8, 131.9, 129.4, 125.5, 112.7, 111.0, 59.7, 34.7, 26.0, 25.0. LCMS (Method A) $t_R$=1.027 min, m/z=477.2, 478.3 [M+H]$^+$; Purity (AUC) ≥95%.

Example 31: 5-Bromo-3-chloro-2-hydroxy-N-(1-(pyrrolidin-3-yl)-1H-imidazol-4-yl)benzenesulfonamide

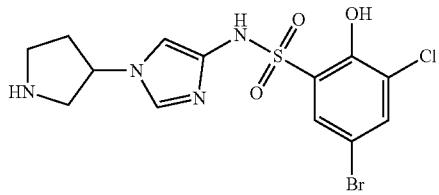 [SMILES: O=S(=O)(Nc1cn(C2CCNC2)cn1)c1cc(Br)cc(Cl)c1O]

Step A: tert-Butyl 3-(4-nitro-1H-imidazole-1-yl)pyrrolidine-1-carboxylate. Using a procedure analogous to General procedure C, starting with 150 mg (1.33 mmol) of 4-nitroimidazole and tert-butyl 3-bromopyrrolidine-1-carboxylate (1.59 mmol), tert-butyl 3-(4-nitro-1H-imidazole-1-yl)pyrrolidine-1-carboxylate was obtained (185 mg, 1.17 mmol, 88%). LCMS (Method B) $t_R$=0.800 min, m/z=283.3 [M+H]$^+$; Purity (AUC) ≥88%.

Step B: 1-(Pyrrolidin-3-yl)-1H-imidazol-4-aminium chloride. Using a procedure analogous to General procedure D, starting with 185 mg (1.17 mmol) tert-butyl 3-(4-nitro-1H-imidazole-1-yl)pyrrolidine-1-carboxylate, 1-(pyrrolidin-3-yl)-1H-imidazol-4-aminium chloride was obtained (183 mg) as a crude mixture. LCMS (Method B) $t_R$=0.084 min, m/z=153.3 [M+H]$^+$. Purity (AUC) ≥61%.

Step C: 5-Bromo-3-chloro-2-hydroxy-N-(1-(pyrrolidin-3-yl)-1H-imidazol-4-yl)benzenesulfonamide. Using a procedure analogous to General procedure A, starting with 183 mg of crude 1-(pyrrolidin-3-yl)-1H-imidazol-4-aminium chloride and 5-bromo-3-chloro-2-hydroxybenzenesulfonyl chloride, the title compound was obtained (8 mg, 0.019 mmol, 2%). $^1$H NMR (600 MHz, Chloroform-d) δ 7.81 (d, J=1.6 Hz, 1H), 7.73 (d, J=2.4 Hz, 1H), 7.71 (d, J=2.4 Hz, 1H), 7.58 (d, J=1.6 Hz, 1H), 4.93-4.87 (m, 1H), 3.80 (dd, J=11.1, 6.3 Hz, 1H), 3.74-3.66 (m, 2H), 3.53-3.45 (m, 1H), 2.65-2.56 (m, 1H), 2.37-2.29 (m, 1H), 1.44 (s, 1H). $^{13}$C NMR (151 MHz, Chloroform-d) δ 150.2, 148.2, 138.1, 135.0, 129.8, 125.1, 123.0, 117.4, 111.9, 56.9, 53.4, 45.8, 32.2. LCMS (Method B) $t_R$=0.918 min, m/z=453.2, 455.2 [M+CH$_3$OH+H]$^+$; Purity (AUC) ≥95%.

Example 32: 5-Bromo-N-(5-(tert-butyl)-1H-pyrazol-3-yl)-3-chloro-2-hydroxybenzenesulfonamide

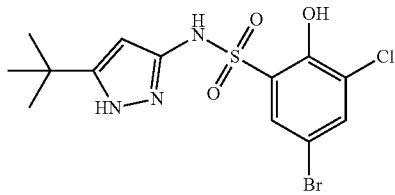 [SMILES: CC(C)(C)c1cc(NS(=O)(=O)c2cc(Br)cc(Cl)c2O)n[nH]1]

Using a procedure analogous to General procedure A, starting with 20 mg (0.14 mmol) of 5-tert-butyl-3-aminopyrazole and 5-bromo-3-chloro-2-hydroxybenzenesulfonyl chloride, the title compound was obtained (25 mg, 0.061 mmol, 44%). $^1$H NMR (400 MHz, Chloroform-d) δ 7.66 (d, J=2.4 Hz, 1H), 7.62 (d, J=2.4 Hz, 1H), 6.55 (br s, 1H), 6.10 (s, 1H), 1.32 (s, 9H). LCMS (Method B) $t_R$=1.070 min, m/z=408.2, 410.2 [M+H]$^+$; Purity (AUC) ≥95%.

Example 33: 5-Bromo-3-chloro-2-hydroxy-N-(1H-pyrazol-3-yl)benzenesulfonamide

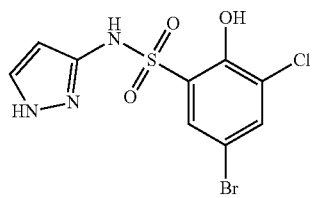 [SMILES: O=S(=O)(Nc1cc[nH]n1)c1cc(Br)cc(Cl)c1O]

Using a procedure analogous to General procedure A, starting with 10 mg (0.12 mmol) of 3-aminopyrazole and 5-bromo-3-chloro-2-hydroxybenzenesulfonyl chloride, the title compound was obtained (9 mg, 0.026 mmol, 21%). $^1$H NMR (400 MHz, Chloroform-d) δ 7.72 (d, J=1.9 Hz, 1H), 7.66 (d, J=1.9 Hz, 1H), 7.52 (s, 1H), 6.33 (s, 1H), 3.51 (s, 1H). LCMS (Method B) $t_R$=0.109 min, m/z=352.0, 355.1 [M+H]$^+$; Purity (AUC) ≥95%.

Example 34: 5-Bromo-3-chloro-2-hydroxy-N-(5-cyclobutyl-1H-pyrazol-3-yl)benzenesulfonamide

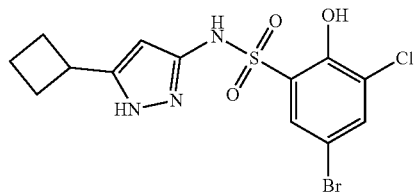 [SMILES: O=S(=O)(Nc1cc(C2CCC2)[nH]n1)c1cc(Br)cc(Cl)c1O]

Using a procedure analogous to General Procedure D, starting with 20 mg (0.15 mmol) of 5-cyclobutyl-3-aminopyrazole and 5-bromo-3-chloro-2-hydroxybenzenesulfonyl chloride, the title compound was obtained (11 mg, 0.027 mmol, 18%). $^1$H NMR (400 MHz, Chloroform-d) δ 7.67 (d, J=2.3 Hz, 1H), 7.62 (d, J=2.3 Hz, 1H), 6.08 (s, 1H), 3.48 (pent, J=8.7, 8.1 Hz, 1H), 2.44-2.32 (m, 2H), 2.16-1.91 (m, 4H). LCMS (Method B) $t_R$=1.044 min, m/z=406.1, 408.2 [M+H]$^+$; Purity (AUC) ≥95%.

Example 35: 5-Bromo-3-chloro-2-hydroxy-N-(5-phenyl-1H-pyrazol-3-yl)benzenesulfonamide

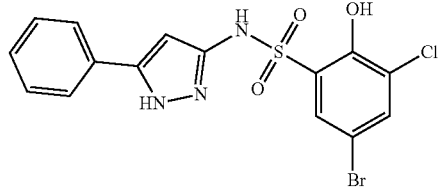 [SMILES: O=S(=O)(Nc1cc(-c2ccccc2)[nH]n1)c1cc(Br)cc(Cl)c1O]

Using a procedure analogous to General procedure A, starting with 20 mg (0.15 mmol) of 5-phenyl-3-aminopyrazole and 5-bromo-3-chloro-2-hydroxybenzenesulfonyl chloride, the title compound was obtained (13 mg, 0.030 mmol, 20%). ¹H NMR (400 MHz, DMSO-d₆) δ 7.91 (d, J=2.5 Hz, 1H), 7.78 (d, J=2.5 Hz, 1H), 7.71-7.64 (m, 2H), 7.43 (dd, J=8.3, 6.9 Hz, 2H), 7.39-7.30 (m, 1H), 6.37 (s, 1H). LCMS (Method B) $t_R$=1.055 min, m/z=428.1, 429.2 [M+H]⁺; Purity (AUC) ≥95%.

Example 36: 5-Bromo-3-chloro-N-(1-cyclopentyl-1H-1,2,4-triazol-3-yl)-2-hydroxybenzenesulfonamide

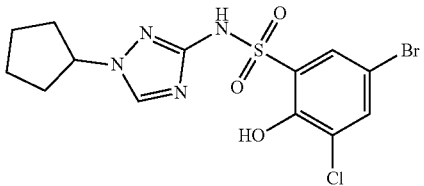 [SMILES: O=S(=O)(Nc1ncn(C2CCCC2)n1)c1cc(Br)cc(Cl)c1O]

Step A: 1-Cyclopentyl-3-nitro-1H-1,2,4-triazole. Using a procedure analogous to General procedure C, starting with 100 mg (0.88 mmol) of 3-nitro-1,2,4-triazole with bromocyclopentane (1.14 mmol), 1-cyclopentyl-3-nitro-1H-1,2,4-triazole was obtained (120 mg, 0.66 mmol, 75%). LCMS (Method B) $t_R$=0.800 min, m/z=283.3 [M+H]⁺; Purity (AUC) ≥88%.

Step B: 1-Cyclopentyl-1H-1,2,4-triazole-3-aminium chloride. Using a procedure analogous to General procedure D, starting with 120 mg (0.66 mmol) of 1-cyclopentyl-3-nitro-1H-1,2,4-triazole, 1-cyclopentyl-1H-1,2,4-triazole-3-aminium chloride was obtained (124 mg) and was used without further purification. LCMS (Method B) $t_R$=0.089 min, m/z=153.3 [M+H]⁺; Purity (AUC) ≥95%.

Step C: 5-Bromo-3-chloro-N-(1-cyclopentyl-1H-1,2,4-triazol-3-yl)-2-hydroxybenzenesulfonamide. Using a procedure analogous to General procedure A, starting with 50 mg (0.27 mmol) of 1-cyclopentyl-1H-1,2,4-triazole-3-aminium chloride and 5-bromo-3-chloro-2-hydroxybenzenesulfonyl chloride, the title compound was obtained (33 mg, 0.030 mmol, 20%). ¹H NMR (400 MHz, Chloroform-d) δ 7.95 (s, 11H), 7.87 (d, J=2.4 Hz, 1H), 7.68 (d, J=2.4 Hz, 1H), 4.60 (t, J=6.2 Hz, 1H), 2.19-2.12 (m, 2H), 2.00-1.85 (m, 4H), 1.77-1.69 (m, 2H). LCMS (Method B) $t_R$=1.038 min, m/z=421.2, 423.1 [M+H]⁺; Purity (AUC) ≥95%.

Example 37: N-(Benzo[d]thiazol-2-yl)-5-bromo-3-chloro-2-hydroxybenzenesulfonamide

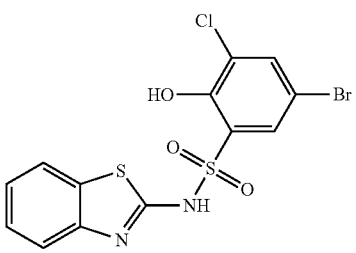 [SMILES: O=S(=O)(Nc1nc2ccccc2s1)c1cc(Br)cc(Cl)c1O]

Using a procedure analogous to General procedure A, starting with 50 mg (0.33 mmol) of benzothiazol-2-amine and 5-bromo-3-chloro-2-hydroxybenzenesulfonyl chloride, the title compound was obtained (9 mg, 0.021 mmol, 6%). ¹H NMR (400 MHz, Chloroform-d) δ 7.82 (d, J=2.4 Hz, 1H), 7.64 (d, J=2.4 Hz, 1H), 7.61 (d, J=7.9 Hz, 1H), 7.49-7.42 (m, 2H), 7.37-7.31 (m, 1H). LCMS (Method B) $t_R$=1.099 min, m/z=419.1, 422.2 [M+H]⁺; Purity (AUC) ≥95%.

Example 38: 5-Bromo-3-chloro-N-(2-(cyclopent-1-en-1-yl)thiazol-5-yl)-2-hydroxybenzenesulfonamide

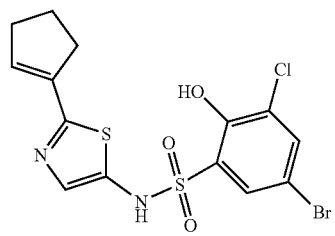 [SMILES: O=S(=O)(Nc1cnc(C2=CCCC2)s1)c1cc(Br)cc(Cl)c1O]

Step A: tert-Butyl (2-(cyclopent-1-en-1-yl)thiazol-5-yl)carbamate. Using a procedure analogous to General Procedure K, starting with 200 mg (0.716 mmol) of tert-butyl (2-bromothiazol-5-yl)carbamate and cyclopent-1-en-ylboronic acid (0.860 mmol), tert-butyl (2-(cyclopent-1-en-1-yl)thiazol-5-yl)carbamate was obtained following purification by ISCO flash chromatography (157 mg, 0.589 mmol, 82%). ¹H NMR (400 MHz, Chloroform-d) δ 7.46 (br s, 1H), 7.25 (s, 1H), 6.33 (t, J=2.3 Hz, 1H), 2.83-2.73 (m, 2H), 2.58-2.48 (m, 2H), 2.00 (pent, J=7.5 Hz, 2H). LCMS (Method B) $t_R$=0.956 min, m/z=267.3 [M+H]⁺; Purity (AUC) ≥95%.

Step B: 2-(Cyclopent-1-en-1-yl)thiazol-5-aminium chloride. Using a procedure analogous to General Procedure L, starting with 30 mg (0.11 mmol) of tert-butyl (2-(cyclopent-1-en-1-yl)thiazol-5-yl)carbamate, 2-(cyclopent-1-en-1-yl)thiazol-5-aminium chloride was obtained (75 mg) and was used without further purification. ¹H NMR (400 MHz, Methanol-d₄) δ 6.78 (s, 1H), 3.76-3.55 (m, 1H), 2.78 (d, J=6.5 Hz, 2H), 2.69-2.61 (m, 2H), 2.11 (pent, J=7.6 Hz, 2H).

Step C: 5-Bromo-3-chloro-N-(2-(cyclopent-1-en-1-yl)thiazol-5-yl)-2-hydroxybenzenesulfonamide. Using a procedure analogous to General procedure A, starting with 30 mg of crude 2-(cyclopent-1-en-1-yl)thiazol-5-aminium chloride and 5-bromo-3-chloro-2-hydroxybenzenesulfonyl chloride, the title compound was obtained. ¹H NMR (400 MHz, Chloroform-d) δ 7.74 (d, J=2.3 Hz, 1H), 7.70 (d, J=2.4 Hz, 1H), 7.59 (s, 1H), 6.75 (s, 1H), 2.79-2.75 (m, 2H), 2.65-2.61 (m, 2H), 2.09 (pent, J=7.6 Hz, 2H). LCMS (Method B) $t_R$=1.125 min, m/z=435.1, 436.2 [M+H]⁺; Purity (AUC) ≥95%.

Example 39: 5-Bromo-3-chloro-N-(6-methoxybenzo[d]thiazol-2-yl)-2-hydroxy-benzenesulfonamide

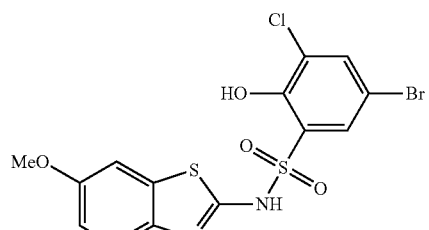

Using a procedure analogous to General procedure A, starting with 20 mg (0.11 mmol) of 6-methoxy-1,3-benzothiazol-2-amine and 5-bromo-3-chloro-2-hydroxybenzenesulfonyl chloride, the title compound was obtained (6 mg, 0.013 mmol, 12%). $^1$H NMR (400 MHz, Chloroform-d) δ 7.80 (d, J=2.4 Hz, 1H), 7.63 (d, J=2.4 Hz, 1H), 7.41 (d, J=8.9 Hz, 1H), 7.10 (d, J=2.5 Hz, 1H), 7.04-6.97 (m, 1H), 3.85 (s, 3H). LCMS (Method B) $t_R$=1.002 min, m/z=429.2, 430.3 [M+H]$^+$; Purity (AUC) ≥95%.

Example 40: 5-Bromo-3-chloro-2-hydroxy-N-(6-(trifluoromethoxy)benzo[d]thiazol-2-yl)benzenesulfonamide

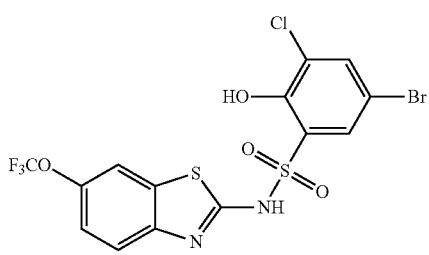 [SMILES: COc1ccc2nc(NS(=O)(=O)c3cc(Br)cc(Cl)c3O)sc2c1]

Using a procedure analogous to General procedure A, starting with 20 mg (0.085 mmol) of 6-(trifluoromethoxy)benzo[d]thiazol-2-amine and 5-bromo-3-chloro-2-hydroxybenzenesulfonyl chloride, the title compound was obtained (5 mg, 0.010 mmol, 12%). $^1$H NMR (400 MHz, Chloroform-d) δ 7.82 (d, J=2.4 Hz, 1H), 7.66 (d, J=2.4 Hz, 1H), 7.58 (d, J=8.9 Hz, 1H), 7.50 (s, 1H), 7.32 (d, J=8.9 Hz, 1H). $^{19}$F NMR (376 MHz, Chloroform-d) δ −58.27. LCMS (Method B) $t_R$=1.204 min, m/z=503.1, 505.3 [M+H]$^+$; Purity (AUC) ≥95%.

Example 41: 5-Bromo-3-chloro-N-(6-fluorobenzo[d]thiazol-2-yl)-2-hydroxybenzenesulfonamide

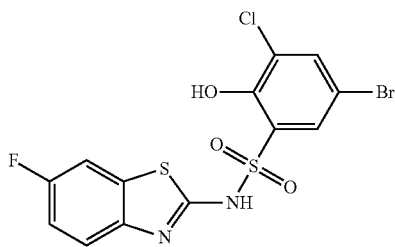 [SMILES: O=S(=O)(Nc1nc2ccc(F)cc2s1)c1cc(Br)cc(Cl)c1O]

Using a procedure analogous to General procedure A, starting with 20 mg (0.12 mmol) of 6-fluorobenzo[d]thiazol-2-amine and 5-bromo-3-chloro-2-hydroxybenzenesulfonyl chloride, the title compound was obtained (6 mg, 0.014 mmol, 11%). $^1$H NMR (400 MHz, Methanol-$d_4$) δ 7.88 (d, J=2.6 Hz, 1H), 7.72 (d, J=2.6 Hz, 1H), 7.53 (dd, J=8.7, 2.6 Hz, 1H), 7.35 (dd, J=8.7, 4.3 Hz, 1H), 7.18 (td, J=8.7, 2.6 Hz, 1H). $^{19}$F NMR (376 MHz, Methanol-$d_4$) δ −119.83. LCMS (Method B) $t_R$=1.099 min, m/z=437.1 [M+H]$^+$; Purity ($^1$H-NMR) ≥95%.

Example 42: 5-Bromo-3-chloro-N-(6-chlorobenzo[d]thiazol-2-yl)-2-hydroxybenzenesulfonamide

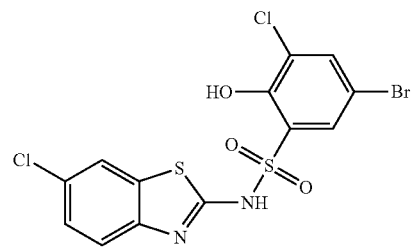 [SMILES: O=S(=O)(Nc1nc2ccc(Cl)cc2s1)c1cc(Br)cc(Cl)c1O]

Using a procedure analogous to General procedure A, starting with 20 mg (0.11 mmol) of 6-chlorobenzo[d]thiazol-2-amine and 5-bromo-3-chloro-2-hydroxybenzenesulfonyl chloride, the title compound was obtained (4 mg, 0.0088 mmol, 8%). $^1$H NMR (400 MHz, Chloroform-d) δ 7.80 (d, J=2.3 Hz, 1H), 7.65 (d, J=2.3 Hz, 1H), 7.59 (d, J=2.3 Hz, 1H), 7.51 (d, J=2.3 Hz, 1H), 7.00 (s, 1H). LCMS (Method B) $t_R$=1.161 min, m/z=453.0, 455.0 [M+H]$^+$; Purity (AUC) ≥95%.

Example 43: 5-Bromo-3-chloro-N-(4-chlorobenzo[d]thiazol-2-yl)-2-hydroxybenzenesulfonamide

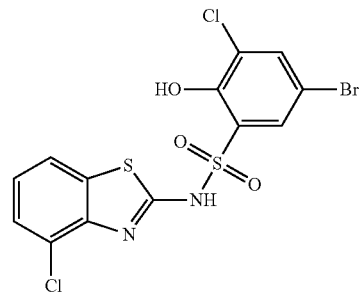 [SMILES: O=S(=O)(Nc1nc2c(Cl)cccc2s1)c1cc(Br)cc(Cl)c1O]

Using a procedure analogous to General procedure A, starting with 20 mg (0.11 mmol) of 4-chlorobenzo[d]thiazol-2-amine and 5-bromo-3-chloro-2-hydroxybenzenesulfonyl chloride, the title compound was obtained (2 mg, 0.0044 mmol, 4%). $^1$H NMR (400 MHz, Chloroform-d) δ 7.81 (d, J=2.3 Hz, 1H), 7.65 (d, J=2.3 Hz, 1H), 7.50 (d, J=8.0 Hz, 1H), 7.42 (d, J=8.0 Hz, 1H), 7.28 (d, J=8.0 Hz, 1H). (Method B) $t_R$=1.135 min, m/z=453.1, 455.1[M+H]$^+$; Purity (AUC) ≥95%.

Example 44: 5-Bromo-3-chloro-N-(5-chlorobenzo[d]thiazol-2-yl)-2-hydroxybenzenesulfonamide

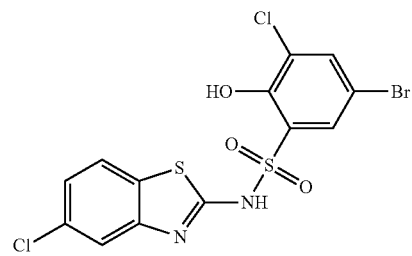 [SMILES: O=S(=O)(Nc1nc2cc(Cl)ccc2s1)c1cc(Br)cc(Cl)c1O]

Using a procedure analogous to General procedure A, starting with 20 mg (0.11 mmol) of 5-chlorobenzo[d]thiazol-2-amine and 5-bromo-3-chloro-2-hydroxybenzenesulfonyl chloride, the title compound was obtained (18 mg, 0.040 mmol, 36%). $^1$H NMR (400 MHz, Chloroform-d) δ 7.77 (d, =2.4 Hz, 1H), 7.71 (d, J=2.4 Hz, 1H), 7.61 (d, J=8.6 Hz, 1H), 7.30 (d, J=2.4 Hz, 1H), 7.11 (dd, J=8.6, 2.4 Hz, 1H). LCMS (Method B) $t_R$=1.149 min, m/z=475.0, 477.0 [M+Na]$^+$; Purity (AUC) ≥95%.

Example 45: 5-Bromo-3-chloro-N-(6-methylbenzo[d]thiazol-2-yl)-2-hydroxybenzenesulfonamide

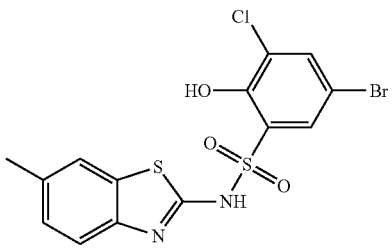 [SMILES: Cc1ccc2nc(NS(=O)(=O)c3cc(Br)cc(Cl)c3O)sc2c1]

Using a procedure analogous to General procedure A, starting with 20 mg (0.12 mmol) of 6-methylbenzo[d]thiazol-2-amine and 5-bromo-3-chloro-2-hydroxybenzenesulfonyl chloride, the title compound was obtained (9 mg, 0.021 mmol, 17%). $^1$H NMR (400 MHz, Chloroform-d) δ 7.81 (d, J=2.4 Hz, 1H), 7.62 (d, J=2.4 Hz, 1H), 7.44 (d, J=8.7 Hz, 1H), 7.39 (s, 1H), 7.23 (d, =8.7 Hz, 1H), 2.43 (s, 3H). LCMS (Method B) $t_R$=1.157 min, m/z=433.1, 434.3 [M+H]$^+$; Purity (AUC) ≥95%.

Example 46: 5-Bromo-3-chloro-N-(7-methoxybenzo[d]thiazol-2-yl)-2-hydroxybenzenesulfonamide

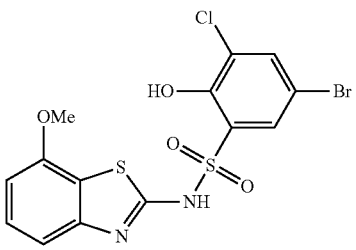 [SMILES: COc1cccc2nc(NS(=O)(=O)c3cc(Br)cc(Cl)c3O)sc12]

Using a procedure analogous to General procedure A, starting with 20 mg (0.11 mmol) of 6-methylbenzo[d]thiazol-2-amine and 5-bromo-3-chloro-2-hydroxybenzenesulfonyl chloride, the title compound was obtained (2 mg, 0.0044 mmol, 4%). $^1$H NMR (400 MHz, Chloroform-d) δ 7.80 (d, J=2.4 Hz, 1H), 7.62 (d, J=2.4 Hz, 1H), 7.26 (d, J=16.2 Hz, 1H), 7.17 (dd, J=8.1, 0.9 Hz, 1H), 6.90 (dd, J=8.2, 0.9 Hz, 1H), 3.96 (s, 3H). LCMS (Method B) $t_R$=1.124 min, m/z=449.1, 450.2 [M+H]$^+$; Purity (AUC) ≥95%.

Example 47: 5-Bromo-3-chloro-N-(6-(trifluoromethyl)benzo[d]thiazol-2-yl)-2-hydroxybenzenesulfonamide

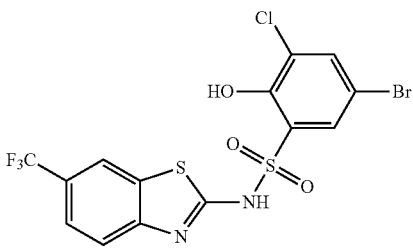 [SMILES: O=S(=O)(Nc1nc2ccc(C(F)(F)F)cc2s1)c1cc(Br)cc(Cl)c1O]

Using a procedure analogous to General procedure A, starting with 20 mg (0.092 mmol) of 6-(trifluoromethyl)benzo[d]thiazol-2-amine and 5-bromo-3-chloro-2-hydroxybenzenesulfonyl chloride, the title compound was obtained (4 mg, 0.0082 mmol, 9%). $^1$H NMR (400 MHz, Methanol-$d_4$) δ 8.09 (d, =1.8 Hz, 1H), 7.90 (d, J=2.5 Hz, 1H), 7.73 (d, J=2.5 Hz, 1H), 7.69 (dd, J=8.5, 1.8 Hz, 1H), 7.50 (d, J=8.5 Hz, 1H). $^{19}$F NMR (376 MHz, Methanol-$d_4$) δ −63.05. LCMS (Method B) $t_R$=1.189 min, m/z=487.1, 488.2 [M+H]$^+$; Purity (AUC) ≥95%.

Example 48: 5-Bromo-3-chloro-N-(5-cyclopentyl-1H-pyrazol-3-yl)-2-hydroxybenzenesulfonamide

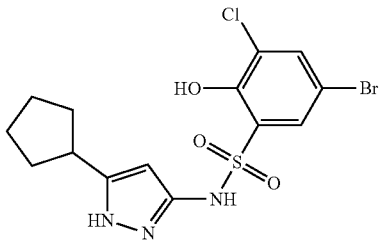 [SMILES: O=S(=O)(Nc1cc(C2CCCC2)[nH]n1)c1cc(Br)cc(Cl)c1O]

Using a procedure analogous to General procedure A, starting with 50 mg (0.33 mmol) of 5-cyclopentyl-1H-pyrazol-3-amine and 5-bromo-3-chloro-2-hydroxybenzenesulfonyl chloride, the title compound was obtained 25 mg (0.059 mmol, 18%). $^1$H NMR (400 MHz, Chloroform-d) δ 7.84 (d, J=2.4 Hz, 1H), 7.73 (d, J=2.4 Hz, 1H), 5.32 (s, 1H), 2.95 (pent, =8.0 Hz, 1H), 2.05-1.94 (m, 2H), 1.77-1.57 (m, 6H). $^{13}$C NMR (101 MHz, Chloroform-d) δ 164.2, 151.4, 149.8, 139.1, 129.16, 127.3, 127.0, 110.5, 88.9, 39.2, 32.2, 25.4. LCMS (Method B) $t_R$=1.232 min, m/z=420.2, 422.2 [M+H]$^+$; Purity (AUC) ≥95%.

Example 49: 5-Bromo-3-chloro-N-(1-cyclopentyl-1H-pyrazol-3-yl)-2-hydroxybenzenesulfonamide

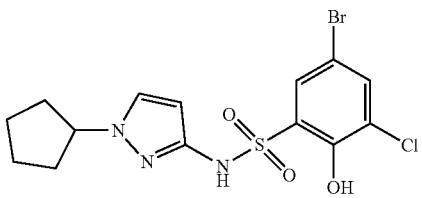 [SMILES: O=S(=O)(Nc1ccn(C2CCCC2)n1)c1cc(Br)cc(Cl)c1O]

Using a procedure analogous to General procedure A, starting with 30 mg (0.20 mmol) of 1-cyclopentyl-1H-pyrazol-3-amine and 5-bromo-3-chloro-2-hydroxybenzenesulfonyl chloride, the title compound was obtained (71 mg, 0.17 mmol, 84%). $^1$H NMR (400 MHz, Chloroform-d) δ 7.61 (d, J=2.3 Hz, 1H), 7.57 (d, J=2.4 Hz, 1H), 7.32 (d, J=2.4 Hz, 1H), 6.15 (d, J=2.4 Hz, 1H), 4.63-4.52 (m, 1H), 2.16-2.04 (m, 2H), 1.90-1.61 (m, 6H). $^{13}$C NMR (101 MHz, Chloroform-d) δ 150.5, 143.7, 137.6, 129.9, 129.4, 125.8, 124.6, 111.2, 99.1, 63.4, 32.9, 24.1. LCMS (Method B) $t_R$=1.118 min, m/z=420.1, 422.2 [M+H]$^+$; Purity (AUC) ≥95%.

Example 50: 5-Bromo-3-chloro-N-(1-cyclopentyl-1H-pyrazol-4-yl)-2-hydroxybenzenesulfonamide

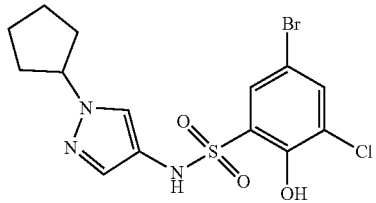 [SMILES: O=S(=O)(Nc1cnn(C2CCCC2)c1)c1cc(Br)cc(Cl)c1O]

Using a procedure analogous to General procedure A, starting with 30 mg (0.15 mmol) of 1-cyclopentyl-1H-pyrazol-4-aminium chloride and 5-bromo-3-chloro-2-hydroxybenzenesulfonyl chloride, the title compound was obtained (38 mg, 0.090 mmol, 59%). $^1$H NMR (400 MHz, Chloroform-d) δ 7.68 (d, J=2.3 Hz, 1H), 7.60 (d, J=2.3 Hz, 1H), 7.37 (d, J=0.8 Hz, 1H), 7.22 (d, J=0.8 Hz, 1H), 6.45 (s, 1H), 4.65-4.54 (m, 1H), 2.19-2.08 (m, 2H), 1.97-1.86 (m, 2H), 1.86-1.65 (m, 4H). LCMS (Method B) $t_R$=1.056 min, m/z=420.2, 422.2 [M+H]$^+$; Purity (AUC) ≥95%.

Example 51: 5-Bromo-3-chloro-N-(2-cyclopentylthiazol-5-yl)-2-hydroxybenzenesulfonamide

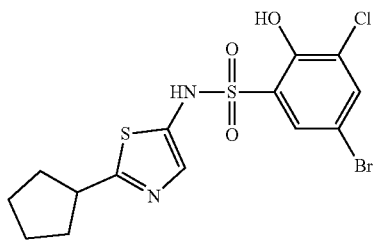 [SMILES: O=S(=O)(Nc1cnc(C2CCCC2)s1)c1cc(Br)cc(Cl)c1O]

Step A: 2-Cyclopentylthiazol-5-aminium chloride. Using a procedure analogous to General procedure D, starting with 75 mg of crude 2-(cyclopent-1-en-1-yl)thiazol-5-aminium chloride (Example 38, Step B), 2-cyclopentylthiazol-5-aminium chloride was obtained (50 mg) and was used without further purification. LCMS (Method A) $t_R$=0.214 min, m/z=169.3 [M+H]$^+$.

Step B: 5-Bromo-3-chloro-N-(2-cyclopentylthiazol-5-yl)-2-hydroxybenzenesulfonamide. Using a procedure analogous to General procedure A, starting with 50 mg of crude 2-cyclopentylthiazol-5-aminium chloride and 5-bromo-3-chloro-2-hydroxybenzenesulfonyl chloride, the title compound was obtained (3 mg, 0.007 mmol, 1% yield over 4 steps). $^1$H NMR (400 MHz, Chloroform-d) δ 7.71 (d, J=2.4 Hz, 1H), 7.68 (d, J=2.4 Hz, 1H), 7.33 (s, 1H), 3.41-3.29 (m, 1H), 2.20-2.12 (m, 2H), 1.83-1.76 (m, 2H), 1.76-1.71 (m, 2H), 1.71-1.65 (m, 2H). $^{13}$C NMR (101 MHz, Chloroform-d) δ 176.9, 149.8, 138.0, 137.8, 130.7, 130.5, 124.9, 124.4, 112.1, 44.5, 34.2, 25.5. LCMS (Method B) $t_R$=1.088 min, m/z=437.1, 439.2 [M+H]$^+$; Purity (AUC) ≥95%.

Example 52: 5-Bromo-3-chloro-N-(1-cyclopentyl-2-(4-(2-methoxyethyl)piperazine-1-carbonyl)-1H-imidazol-4-yl)-2-hydroxybenzenesulfonamide

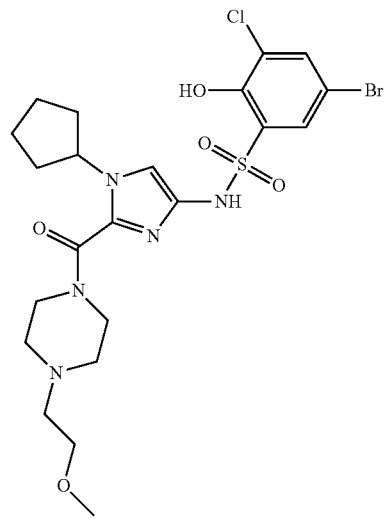 [SMILES: COCCN1CCN(C(=O)c2nc(NS(=O)(=O)c3cc(Br)cc(Cl)c3O)cn2C2CCCC2)CC1]

To a mixture containing 40 mg (0.086 mmol, 1 eq) of 4-((5-bromo-3-chloro-2-hydroxyphenyl)sulfonamido)-1-cyclopentyl-1H-imidazole-2-carboxylic acid, DIPEA (0.26 mmol, 3 eq), 1-(2-methoxyethyl)piperazine (0.17 mmol, 2 eq), and sufficient DCM to achieve a reaction concentration of 0.29 M was added HATU (0.099 mmol, 1.15 eq). The reaction mixture was allowed to stir at room temperature for 17 hours, then diluted with water and extracted with EtOAc. The organic phase was dried using a filter separator and the solvent was removed under reduced pressure. After purification by preparative HPLC, the title compound was obtained (16 mg, 0.086 mmol, 31% H NMR (400 MHz, Chloroform-d) δ 7.59 (d, J=2.4 Hz, 1H), 7.55 (d, J=2.4 Hz, 1H), 7.04 (s, 1H), 4.90 (p, =7.2 Hz, 1H), 3.77 (br s, 2H), 3.41-3.27 (m, 6H), 2.22 (br s, 2H), 1.86 (br s, 2H). LCMS (Method A) $t_R$=0.879 min, m/z=590.3, 592.3 [M+H]$^+$, Purity (AUC) ≥95%.

Example 53: 5-Bromo-3-chloro-N-(1-cyclopentyl-2-(2,6-diazaspiro[3.3]heptane-2-carbonyl)-1H-imidazol-4-yl)-2-hydroxybenzenesulfonamide

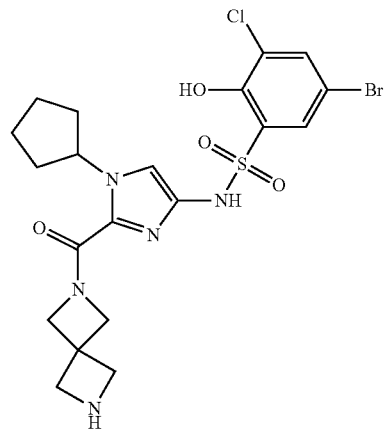 [SMILES: O=C(c1nc(NS(=O)(=O)c2cc(Br)cc(Cl)c2O)cn1C1CCCC1)N1CC2(CNC2)C1]

Step A: tert-Butyl 6-(4-((5-bromo-3-chloro-2-hydroxyphenyl)sulfonamido)-1-cyclopentyl-1H-imidazole-2-carbonyl)-2,6-diazaspiro[3.3]heptane-2-carboxylate. To a mixture containing 40 mg (0.086 mmol, 1 eq) of 4-((5-bromo-3-chloro-2-hydroxyphenyl)sulfonamido)-1-cyclopentyl-1H-imidazole-2-carboxylic acid, DIPEA (0.26 mmol, 3 eq), tert-butyl 2,6-diazaspiro[3.3]heptane-2-carboxylate (0.17 mmol, 2 eq), and sufficient DCM to achieve a reaction concentration of 0.29 M was added HATU (0.099 mmol, 1.15 eq). The reaction mixture was allowed to stir at room temperature for 17 hours, then diluted with water and extracted with EtOAc. The organic phase was dried using a filter separator and the solvent was removed under reduced pressure. tert-butyl 6-(4-((5-bromo-3-chloro-2-hydroxyphenyl)sulfonamido)-1-cyclopentyl-1H-imidazole-2-carbonyl)-2,6-diazaspiro[3.3]heptane-2-carboxylate was obtained (98 mg) and was used without further purification. LCMS (Method B) $t_R$=0.851 min, m/z=544.3, 546.3 [M+H]$^+$; Purity (AUC) ≥95%.

Step B: 5-Bromo-3-chloro-N-(1-cyclopentyl-2-(2,6-diazaspiro[3.3]heptane-2-carbonyl)-1H-imidazol-4-yl-2-hydroxybenzenesulfonamide. Using a procedure analogous to General Procedure M, starting with 98 mg of crude tert-butyl 6-(4-((5-bromo-3-chloro-2-hydroxyphenyl)sulfonamido)-1-cyclopentyl-1H-imidazole-2-carbonyl)-2,6-diazaspiro[3.3]heptane-2-carboxylate, the title compound was obtained (7.0 mg, 0.87 mmol, 15%). 1H NMR (400 MHz, Methanol-d$_4$) δ 7.82 (d, J=2.4 Hz, 1H), 7.77 (d, J=2.4 Hz, 1H), 7.09 (s, 1H), 5.58-5.50 (m, 1H), 4.59 (s, 2H), 4.32 (s, 2H), 2.31 (d, J=6.5 Hz, 4H), 2.19-2.10 (m, 2H), 1.82 (d, J=10.3 Hz, 2H), 1.76-1.62 (m, 4H). LCMS (Method B) $t_R$=0.851 min, m/z=544.3, 546.3 [M+H]$^+$; Purity (AUC) ≥95%.

Example 54: 5-Bromo-3-chloro-N-(1-cyclopentyl-2-(4-(pyrrolidin-3-yl)piperidine-1-carbonyl)-1H-imidazol-4-yl)-2-hydroxybenzenesulfonamide

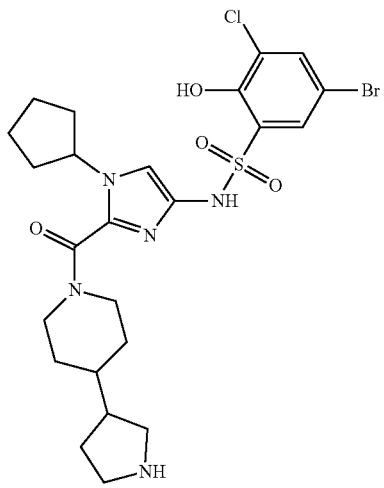 [SMILES: O=C(c1nc(NS(=O)(=O)c2cc(Br)cc(Cl)c2O)cn1C1CCCC1)N1CCC(C2CCNC2)CC1]

Step A: tert-Butyl 3-(1-(4-((5-bromo-3-chloro-2-hydroxyphenyl)sulfonamido)-1-cyclopentyl-1H-imidazole-2-carbonyl)piperidin-4-yl)pyrrolidine-1-carboxylate. To a mixture containing 33 mg (0.071 mmol, 1 eq) of 4-((5-bromo-3-chloro-2-hydroxyphenyl)sulfonamido)-1-cyclopentyl-1H-imidazole-2-carboxylic acid, DIPEA (0.21 mmol, 3 eq), tert-butyl 3-(piperazin-1-yl)pyrrolidine-1-carboxylate (0.14 mmol, 2 eq), and sufficient DCM to achieve a reaction concentration of 0.29 M was added HATU (0.082 mmol, 1.15 eq). The reaction mixture was allowed to stir at room temperature for 17 hours, then diluted with water and extracted with EtOAc. The organic phase was dried using a filter separator and the solvent was removed under reduced pressure. tert-Butyl 3-(1-(4-((5-bromo-3-chloro-2-hydroxyphenyl)sulfonamido)-1-cyclopentyl-1H-imidazole-2-carbonyl)piperidin-4-yl)pyrrolidine-1-carboxylate was obtained (97 mg) and was used without further purification. LCMS (Method B) $t_R$=0.975 min, m/z=701.5, 702.5 min [M+H]$^+$; Purity (AUC) ≥95%.

Step B: 5-Bromo-3-chloro-N-(1-cyclopentyl-2-(4-(pyrrolidin-3-yl)piperidine-1-carbonyl)-1H-imidazol-4-yl)-2-hydroxybenzenesulfonamide. Using a procedure analogous to General Procedure L, starting with 50 mg of crude tert-butyl 3-(1-(4-((5-bromo-3-chloro-2-hydroxyphenyl)sulfonamido)-1-cyclopentyl-1H-imidazole-2-carbonyl)piperidin-4-yl)pyrrolidine-1-carboxylate, the title compound was obtained (7.0 mg, 0.87 mmol, 15%). $^1$H NMR (400 MHz, DMSO-d$_6$) δ 8.88 (br s, 1H), 7.40 (d, J=2.7 Hz, 1H), 7.21 (d, J=2.7 Hz, 1H), 6.98 (s, 1H), 4.78 (p, J=7.3 Hz, 1H), 3.54 (br s, 2H), 3.43 (br s, 2H), 3.37-3.24 (m, 3H), 3.20-3.09 (m, 1H), 3.05-2.88 (m, 2H), 2.46-2.20 (m, 4H), 2.12-1.97 (m, 3H), 1.86-1.52 (m, 7H). LCMS (Method B) $t_R$=0.765 min, m/z=601.3, 602.4 [M+H]$^+$; Purity (AUC) ≥95%.

3. Pharmaceutical Compositions

The disclosed compounds may be incorporated into pharmaceutical compositions suitable for administration to a subject (such as a patient, which may be a human or non-human).

The pharmaceutical compositions may include a "therapeutically effective amount" or a "prophylactically effective amount" of the agent. A "therapeutically effective amount" refers to an amount effective, at dosages and for periods of time necessary, to achieve the desired therapeutic result. A therapeutically effective amount of the composition may be determined by a person skilled in the art and may vary according to factors such as the disease state, age, sex, and weight of the individual, and the ability of the composition to elicit a desired response in the individual. A therapeutically effective amount is also one in which any toxic or detrimental effects of a compound of the invention [e.g., a compound of formula (I)] are outweighed by the therapeutically beneficial effects. A "prophylactically effective amount" refers to an amount effective, at dosages and for periods of time necessary, to achieve the desired prophylactic result. Typically, since a prophylactic dose is used in subjects prior to or at an earlier stage of disease, the prophylactically effective amount will be less than the therapeutically effective amount.

For example, a therapeutically effective amount of a compound of formula (I), may be about 1 mg/kg to about 1000 mg/kg, about 5 mg/kg to about 950 mg/kg, about 10 mg/kg to about 900 mg/kg, about 15 mg/kg to about 850 mg/kg, about 20 mg/kg to about 800 mg/kg, about 25 mg/kg to about 750 mg/kg, about 30 mg/kg to about 700 mg/kg, about 35 mg/kg to about 650 mg/kg, about 40 mg/kg to about 600 mg/kg, about 45 mg/kg to about 550 mg/kg, about 50 mg/kg to about 500 mg/kg, about 55 mg/kg to about 450 mg/kg, about 60 mg/kg to about 400 mg/kg, about 65 mg/kg to about 350 mg/kg, about 70 mg/kg to about 300 mg/kg, about 75 mg/kg to about 250 mg/kg, about 80 mg/kg to about 200 mg/kg, about 85 mg/kg to about 150 mg/kg, and about 90 mg/kg to about 100 mg/kg.

The pharmaceutical compositions may include pharmaceutically acceptable carriers. The term "pharmaceutically acceptable carrier," as used herein, means a non-toxic, inert solid, semi-solid or liquid filler, diluent, encapsulating material or formulation auxiliary of any type. Some examples of materials which can serve as pharmaceutically acceptable carriers are sugars such as, but not limited to, lactose, glucose and sucrose; starches such as, but not limited to, corn starch and potato starch; cellulose and its derivatives such as, but not limited to, sodium carboxymethyl cellulose, ethyl cellulose and cellulose acetate; powdered tragacanth; malt; gelatin; talc; excipients such as, but not limited to, cocoa butter and suppository waxes; oils such as, but not limited to, peanut oil, cottonseed oil, safflower oil, sesame oil, olive oil, corn oil and soybean oil; glycols; such as propylene glycol; esters such as, but not limited to, ethyl oleate and ethyl laurate; agar; buffering agents such as, but not limited to, magnesium hydroxide and aluminum hydroxide; alginic acid; pyrogen-free water; isotonic saline; Ringer's solution; ethyl alcohol, and phosphate buffer solutions, as well as other non-toxic compatible lubricants such as, but not limited to, sodium lauryl sulfate and magnesium stearate, as well as coloring agents, releasing agents, coating agents, sweetening, flavoring and perfuming agents, preservatives and antioxidants can also be present in the composition, according to the judgment of the formulator.

Thus, the compounds and their physiologically acceptable salts and solvates may be formulated for administration by, for example, solid dosing, eye drop, in a topical oil-based formulation, injection, inhalation (either through the mouth or the nose), implants, or oral, buccal, parenteral, or rectal administration. Techniques and formulations may generally be found in "Remington's Pharmaceutical Sciences", (Meade Publishing Co., Easton, Pa.). Therapeutic compositions must typically be sterile and stable under the conditions of manufacture and storage.

The route by which the disclosed compounds are administered and the form of the composition will dictate the type of carrier to be used. The composition may be in a variety of forms, suitable, for example, for systemic administration (e.g., oral, rectal, nasal, sublingual, buccal, implants, or parenteral) or topical administration (e.g., dermal, pulmonary, nasal, aural, ocular, liposome delivery systems, or iontophoresis).

Carriers for systemic administration typically include at least one of diluents, lubricants, binders, disintegrants, colorants, flavors, sweeteners, antioxidants, preservatives, glidants, solvents, suspending agents, wetting agents, surfactants, combinations thereof, and others. All carriers are optional in the compositions.

Suitable diluents include sugars such as glucose, lactose, dextrose, and sucrose; diols such as propylene glycol; calcium carbonate; sodium carbonate; sugar alcohols, such as glycerin; mannitol; and sorbitol. The amount of diluent(s) in a systemic or topical composition is typically about 50 to about 90%.

Suitable lubricants include silica, talc, stearic acid and its magnesium salts and calcium salts, calcium sulfate; and liquid lubricants such as polyethylene glycol and vegetable oils such as peanut oil, cottonseed oil, sesame oil, olive oil, corn oil and oil of theobroma. The amount of lubricant(s) in a systemic or topical composition is typically about 5 to about 10%.

Suitable binders include polyvinyl pyrrolidone; magnesium aluminum silicate; starches such as corn starch and potato starch; gelatin; tragacanth; and cellulose and its derivatives, such as sodium carboxymethylcellulose, ethyl cellulose, methylcellulose, microcrystalline cellulose, and sodium carboxymethylcellulose. The amount of binder(s) in a systemic composition is typically about 5 to about 50%.

Suitable disintegrants include agar, alginic acid and the sodium salt thereof, effervescent mixtures, croscarmellose, crospovidone, sodium carboxymethyl starch, sodium starch glycolate, clays, and ion exchange resins. The amount of disintegrant(s) in a systemic or topical composition is typically about 0.1 to about 10%.

Suitable colorants include a colorant such as an FD&C dye. When used, the amount of colorant in a systemic or topical composition is typically about 0.005 to about 0.1%.

Suitable flavors include menthol, peppermint, and fruit flavors. The amount of flavor(s), when used, in a systemic or topical composition is typically about 0.1 to about 1.0%.

Suitable sweeteners include aspartame and saccharin. The amount of sweetener(s) in a systemic or topical composition is typically about 0.001 to about 1%.

Suitable antioxidants include butylated hydroxyanisole ("BHA"), butylated hydroxytoluene ("BHT"), and vitamin E. The amount of antioxidant(s) in a systemic or topical composition is typically about 0.1 to about 5%.

Suitable preservatives include benzalkonium chloride, methyl paraben and sodium benzoate. The amount of preservative(s) in a systemic or topical composition is typically about 0.01 to about 5%.

Suitable glidants include silicon dioxide. The amount of glidant(s) in a systemic or topical composition is typically about 1 to about 5%.

Suitable solvents include water, isotonic saline, ethyl oleate, glycerine, hydroxylated castor oils, alcohols such as ethanol, and phosphate buffer solutions. The amount of solvent(s) in a systemic or topical composition is typically from about 0 to about 100%.

Suitable suspending agents include AVICEL RC-591 (from FMC Corporation of Philadelphia, PA) and sodium alginate. The amount of suspending agent(s) in a systemic or topical composition is typically about 1 to about 8%.

Suitable surfactants include lecithin, Polysorbate 80, and sodium lauryl sulfate, and the TWEENS from Atlas Powder Company of Wilmington, Delaware. Suitable surfactants include those disclosed in the C.T.F.A. Cosmetic Ingredient Handbook, 1992, pp. 587-592; Remington's Pharmaceutical Sciences, 15th Ed. 1975, pp. 335-337; and McCutcheon's Volume 1, Emulsifiers & Detergents, 1994, North American Edition, pp. 236-239. The amount of surfactant(s) in the systemic or topical composition is typically about 0.1% to about 5%.

Although the amounts of components in the systemic compositions may vary depending on the type of systemic composition prepared, in general, systemic compositions include 0.01% to 50% of active [e.g., compound of formula (I)] and 50% to 99.99% of one or more carriers. Compositions for parenteral administration typically include 0.1% to 10% of actives and 90% to 99.9% of a carrier including a diluent and a solvent.

Compositions for oral administration can have various dosage forms. For example, solid forms include tablets, capsules, granules, and bulk powders. These oral dosage forms include a safe and effective amount, usually at least about 5%, and more particularly from about 25% to about 50% of actives. The oral dosage compositions include about 50% to about 95% of carriers, and more particularly, from about 50% to about 75%.

Tablets can be compressed, tablet triturates, enteric-coated, sugar-coated, film-coated, or multiple-compressed. Tablets typically include an active component, and a carrier comprising ingredients selected from diluents, lubricants, binders, disintegrants, colorants, flavors, sweeteners, glidants, and combinations thereof. Specific diluents include calcium carbonate, sodium carbonate, mannitol, lactose and cellulose. Specific binders include starch, gelatin, and sucrose. Specific disintegrants include alginic acid and croscarmellose. Specific lubricants include magnesium stearate, stearic acid, and talc. Specific colorants are the FD&C dyes, which can be added for appearance. Chewable tablets preferably contain sweeteners such as aspartame and saccharin, or flavors such as menthol, peppermint, fruit flavors, or a combination thereof.

Capsules (including implants, time release and sustained release formulations) typically include an active compound [e.g., a compound of formula (I)], and a carrier including one or more diluents disclosed above in a capsule comprising gelatin. Granules typically comprise a disclosed compound, and preferably glidants such as silicon dioxide to improve flow characteristics. Implants can be of the biodegradable or the non-biodegradable type.

The selection of ingredients in the carrier for oral compositions depends on secondary considerations like taste, cost, and shelf stability, which are not critical for the purposes of this invention.

Solid compositions may be coated by conventional methods, typically with pH or time-dependent coatings, such that a disclosed compound is released in the gastrointestinal tract in the vicinity of the desired application, or at various points and times to extend the desired action. The coatings typically include one or more components selected from the group consisting of cellulose acetate phthalate, polyvinyl acetate phthalate, hydroxypropyl methyl cellulose phthalate, ethyl cellulose, EUDRAGIT coatings (available from Rohm & Haas G.M.B.H. of Darmstadt, Germany), waxes and shellac.

Compositions for oral administration can have liquid forms. For example, suitable liquid forms include aqueous solutions, emulsions, suspensions, solutions reconstituted from non-effervescent granules, suspensions reconstituted from non-effervescent granules, effervescent preparations reconstituted from effervescent granules, elixirs, tinctures, syrups, and the like. Liquid orally administered compositions typically include a disclosed compound and a carrier, namely, a carrier selected from diluents, colorants, flavors, sweeteners, preservatives, solvents, suspending agents, and surfactants. Peroral liquid compositions preferably include one or more ingredients selected from colorants, flavors, and sweeteners.

Other compositions useful for attaining systemic delivery of the subject compounds include sublingual, buccal and nasal dosage forms. Such compositions typically include one or more of soluble filler substances such as diluents including sucrose, sorbitol and mannitol; and binders such as acacia, microcrystalline cellulose, carboxymethyl cellulose, and hydroxypropyl methylcellulose. Such compositions may further include lubricants, colorants, flavors, sweeteners, antioxidants, and glidants.

The disclosed compounds can be topically administered. Topical compositions that can be applied locally to the skin may be in any form including solids, solutions, oils, creams, ointments, gels, lotions, shampoos, leave-on and rinse-out hair conditioners, milks, cleansers, moisturizers, sprays, skin patches, and the like. Topical compositions include: a disclosed compound [e.g., a compound of formula (I)], and a carrier. The carrier of the topical composition preferably aids penetration of the compounds into the skin. The carrier may further include one or more optional components.

The amount of the carrier employed in conjunction with a disclosed compound is sufficient to provide a practical quantity of composition for administration per unit dose of the medicament. Techniques and compositions for making dosage forms useful in the methods of this invention are described in the following references: Modern Pharmaceutics, Chapters 9 and 10, Banker & Rhodes, eds. (1979); Lieberman et al., Pharmaceutical Dosage Forms: Tablets (1981); and Ansel, Introduction to Pharmaceutical Dosage Forms, 2nd Ed., (1976).

A carrier may include a single ingredient or a combination of two or more ingredients. In the topical compositions, the carrier includes a topical carrier. Suitable topical carriers include one or more ingredients selected from phosphate buffered saline, isotonic water, deionized water, monofunctional alcohols, symmetrical alcohols, aloe vera gel, allantoin, glycerin, vitamin A and E oils, mineral oil, propylene glycol, PPG-2 myristyl propionate, dimethyl isosorbide, castor oil, combinations thereof, and the like. More particularly, carriers for skin applications include propylene glycol, dimethyl isosorbide, and water, and even more particularly, phosphate buffered saline, isotonic water, deionized water, monofunctional alcohols, and symmetrical alcohols.

The carrier of a topical composition may further include one or more ingredients selected from emollients, propellants, solvents, humectants, thickeners, powders, fragrances, pigments, and preservatives, all of which are optional.

Suitable emollients include stearyl alcohol, glyceryl monoricinoleate, glyceryl monostearate, propane-1,2-diol, butane-1,3-diol, mink oil, cetyl alcohol, isopropyl isostearate, stearic acid, isobutyl palmitate, isocetyl stearate, oleyl alcohol, isopropyl laurate, hexyl laurate, decyl oleate, octadecan-2-ol, isocetyl alcohol, cetyl palmitate, di-n-butyl sebacate, isopropyl myristate, isopropyl palmitate, isopropyl stearate, butyl stearate, polyethylene glycol, triethylene glycol, lanolin, sesame oil, coconut oil, arachis oil, castor oil, acetylated lanolin alcohols, petroleum, mineral oil, butyl myristate, isostearic acid, palmitic acid, isopropyl linoleate, lauryl lactate, myristyl lactate, decyl oleate, myristyl myristate, and combinations thereof. Specific emollients for skin include stearyl alcohol and polydimethylsiloxane. The amount of emollient(s) in a skin-based topical composition is typically about 5% to about 95%.

Suitable propellants include propane, butane, isobutane, dimethyl ether, carbon dioxide, nitrous oxide, and combinations thereof. The amount of propellant(s) in a topical composition is typically about 0% to about 95%.

Suitable solvents include water, ethyl alcohol, methylene chloride, isopropanol, castor oil, ethylene glycol monoethyl ether, diethylene glycol monobutyl ether, diethylene glycol monoethyl ether, dimethylsulfoxide, dimethyl formamide, tetrahydrofuran, and combinations thereof. Specific solvents include ethyl alcohol and homotopic alcohols. The amount of solvent(s) in a topical composition is typically about 0% to about 95%.

Suitable humectants include glycerin, sorbitol, sodium 2-pyrrolidone-5-carboxylate, soluble collagen, dibutyl phthalate, gelatin, and combinations thereof. Specific humectants include glycerin. The amount of humectant(s) in a topical composition is typically 0% to 95%.

The amount of thickener(s) in a topical composition is typically about 0% to about 95%.

Suitable powders include beta-cyclodextrins, hydroxypropyl cyclodextrins, chalk, talc, fullers earth, kaolin, starch, gums, colloidal silicon dioxide, sodium polyacrylate, tetra alkyl ammonium smectites, trialkyl aryl ammonium smectites, chemically-modified magnesium aluminum silicate, organically-modified Montmorillonite clay, hydrated aluminum silicate, fumed silica, carboxyvinyl polymer, sodium carboxymethyl cellulose, ethylene glycol monostearate, and combinations thereof. The amount of powder(s) in a topical composition is typically 0% to 95%.

The amount of fragrance in a topical composition is typically about 0% to about 0.5%, particularly, about 0.001% to about 0.1%.

Suitable pH adjusting additives include HCl or NaOH in amounts sufficient to adjust the pH of a topical pharmaceutical composition.

4. Methods of Treatment

The disclosed compounds and compositions may be used in methods for treatment of MYC-related cancers. The methods of treatment may comprise administering to a subject in need of such treatment a composition comprising a therapeutically effective amount of the compound of formula (I).

In one aspect, disclosed is a method of treating cancer, the method comprising administration of a therapeutically effective amount of a compound of formula (I), or a pharmaceutically acceptable salt thereof to a subject in need thereof.

In certain embodiments, the cancer being treated is associated with overexpression of MYC.

In certain embodiments, the cancer is at least one of leukemia, ovarian cancer, breast cancer, colorectal cancer, pancreatic cancer, gastric cancer, stomach cancer, lung cancer, cervical cancer, uterine cancer, cancers of the blood, and cancers of the lymphatic system.

In another aspect, disclosed is a method of disrupting the protein-protein interaction between WDR5 and MYC, the method comprising administration of a therapeutically effective amount of a compound of formula (I), or a pharmaceutically acceptable salt thereof to a subject in need thereof.

The compositions can be administered to a subject in need thereof to bind WDR5 and modulate MYC, to treat a variety of diverse cancers. The present disclosure is directed to methods for administering the composition to inhibit the protein-protein interaction between WDR5 its binding partners such chromatin, cognate transcription and other regulatory factors, including for example the histone methyltransferase MLL.

The compositions may be useful for treating certain cancers in humans and animals related to MYC overexpression. Treatment of such cancers may be effected by modulating MYC binding to WDR5 in a subject, by administering a compound or composition of the invention, either alone or in combination with another active agent as part of a therapeutic regimen to a subject in need thereof.

Disruption of the interaction between WDR5 and its binding partners (such as MYC) may lead to treatment and reduction of cancer or tumor growth, and/or reduce metastasis of cancerous or tumor cells. Accordingly, the disclosed compositions may be used in methods that treat and/or prevent cancer or tumors in a subject administered the composition. The method can treat cancer or tumor-based growth and can be any type of cancer such as, but not limited to, leukemia (mixed-lineage leukemia), ovarian cancer, breast cancer, colorectal cancer, pancreatic cancer, gastric cancer, stomach cancer, lung cancer, cervical cancer, uterine cancer, cancers of the blood, and cancers of the lymphatic system.

In some embodiments, the administered composition to a subject in need thereof may mediate reduction, clearance or prevention of additional growth of tumor cells by disrupting the ability of MYC, another transcription factor, or chromatin to associate with WDR5, thereby reducing growth/proliferation of tumor cells, but does not have an effect on normal cells.

In some embodiments, the administered composition may increase tumor free survival, reduce tumor mass, slow tumor growth, increase tumor survival, or a combination thereof in the subject. The administered composition may reduce tumor volume in the subject in need thereof. The administered composition may increase tumor free survival in the subject after administration of the composition.

In some embodiments, the composition may be administered to clear or eliminate the cancer or tumor expressing the one or more oncogenes without damaging or causing illness or death in the subject administered the composition.

A. Modes of Administration

Methods of treatment may include any number of modes of administering a disclosed composition. Modes of administration may include tablets, pills, dragees, hard and soft gel capsules, granules, pellets, aqueous, lipid, oily or other solutions, emulsions such as oil-in-water emulsions, liposomes, aqueous or oily suspensions, syrups, elixirs, solid emulsions, solid dispersions or dispersible powders. For the preparation of pharmaceutical compositions for oral administration, the agent may be admixed with commonly known and used adjuvants and excipients such as for example, gum arabic, talcum, starch, sugars (such as, e.g., mannitose, methyl cellulose, lactose), gelatin, surface-active agents, magnesium stearate, aqueous or non-aqueous solvents, paraffin derivatives, cross-linking agents, dispersants, emulsifiers, lubricants, conserving agents, flavoring agents (e.g., ethereal oils), solubility enhancers (e.g., benzyl benzoate or benzyl alcohol) or bioavailability enhancers (e.g. Gelucire™). In the pharmaceutical composition, the agent may also be dispersed in a microparticle, e.g. a nanoparticulate composition.

For parenteral administration, the agent can be dissolved or suspended in a physiologically acceptable diluent, such as, e.g., water, buffer, oils with or without solubilizers, surface-active agents, dispersants or emulsifiers. As oils for example and without limitation, olive oil, peanut oil, cottonseed oil, soybean oil, castor oil and sesame oil may be used. More generally spoken, for parenteral administration, the agent can be in the form of an aqueous, lipid, oily or other kind of solution or suspension, or even administered in the form of liposomes or nano-suspensions.

The term "parenterally," as used herein, refers to modes of administration which include intravenous, intramuscular, intraperitoneal, intrasternal, subcutaneous and intraarticular injection and infusion.

B. Combination Therapies

Additional therapeutic agent(s) may be administered simultaneously or sequentially with the disclosed compounds and compositions. Sequential administration includes administration before or after the disclosed compounds and compositions. In some embodiments, the additional therapeutic agent or agents may be administered in the same composition as the disclosed compounds. In other embodiments, there may be an interval of time between administration of the additional therapeutic agent and the disclosed compounds. In some embodiments, administration of an additional therapeutic agent with a disclosed compound may allow lower doses of the other therapeutic agents and/or administration at less frequent intervals. When used in combination with one or more other active ingredients, the compounds of the present invention and the other active ingredients may be used in lower doses than when each is used singly. Accordingly, the pharmaceutical compositions of the present invention include those that contain one or more other active ingredients, in addition to a compound of Formula (I). The above combinations include combinations of a compound of the present invention not only with one other active compound, but also with two or more other active compounds. For example, the compound of Formula (I) can be combined with a variety of different anti-cancer drugs such as chemotherapeutics, anti-tumor agents, and anti-proliferative agents.

Further, the compound of formula (I) can be combined with the following, but not limited to, actinomycins, alkylating agents, anthracyclines, antifolates, antiestrogen agents, anti-metabolites, anti-androgens, antimicrotubule agents, aromatase inhibitors, bleomycins, bromodomain inhibitors, $Ca^{2+}$ adenosine triphosphate (ATP)ase inhibitors, cytosine analogs, deltoids/retinoids, dihydrofolate reductase inhibitors, deoxyribonucleic acid (DNA) topoisomerase inhibitors, dopaminergic neurotoxins, glucocorticoids, histone deacetylase inhibitors, hormonal therapies, immunotherapeutic agents, inosine monophosphate (IMP) dehydrogenase inhibitors, isoprenylation inhibitors, luteinizing hormone-releasing hormone agonists, mammalian target of rapamycin (mtor) inhibitors, multi-drug resistance (MDR) inhibitors, mitomycins, photodyamic therapies, proteasome inhibitors, platinum containing compounds, radiation, receptor tyrosine kinase inhibitors, ribonucleotide reductase inhibitors, thrombospondin mimetics, uracil analogs, vinca alkaloids, vitamin D3 analogs, γ-radiation, DOT1L inhibitors, agents targeting epigenetic mechanisms, or an additional chemotherapeutic agent such as N-Ac-Sar-Gly-Val-D-alloIle-Thr-Nva-Ile-Arg-Pro-NHCH2CH3 or a salt thereof, actinomycin D, AG13736, 17-allylamino-17-demethoxygeldanamycin, 9-aminocamptothecin, N-(4-(3-amino-1H-indazol-4-yl)phenyl}-N-(2-fluoro-5-methylphenyl)urea or a salt thereof, N-(4-(4-aminothieno[2,3-d]pyrimidin-5-yl)phenyl)-N-(2-fluoro-5-(trifluoromethyl)phenyl)urea or a salt thereof, temozolomide, nedaplatin, satraplatin, triplatin tetranitrate, procarbazine, altretamine, mitozolomide, anastozole, AP-23573, asparaginase, azacitidine, bevacizurnab, bicalutamide, bleomycin a2, bleomycin b2, bortezemib, busulfan, campathecins, carboplatin, carmustine (BCNU), CB1093, cetuximab, CHOP (C: Cytoxan® (cyclophosphamide); H: Adriamycin® (hydroxydoxorubicin); O: Vincristine (Oncovin®); P: prednisone), chlorambucil, CHIR258, cisplatin, CNF-101, CNF-1001, CNF-2024, CP547632, crisnatol, cytarabine, cyclophosphamide, cytosine arabinoside, daunorubicin, dacarbazine, dactinomycin, dasatinib, daunorubicin, deferoxamine, demethoxyhypocrellin A, depsipeptide, dexamethasone, 17-dimethylaminoethylamino-17-demethoxygeldanamycin, docetaxel, doxifluridine, doxorubicin, EB 1089, epothilone D, epirubicin, 5-ethynyl-1-13-D-ribofuranosylimidazole-4-carboxamide (EICAR), erlotinib, etoposide, everolimus, 5-fluorouracil (5-FU), floxuridine, fludarabine, flutamide, gefitinib, geldanamycin, gemcitabine, goserelin, N-(2-(4-hydroxyanilino}-3-pyridinyl}-4-methoxybenzenesulfonamide or a salt thereof, hydroxyurea, idarubicin, ifosfamide, imatinab, interferon-a, interferon-y, IPI-504, irinotecan, KH 1060, lapatanib, leucovorin calcium, LAQ824, leuprolide acetate, letrozole, lomustine (CCNU), lovastatin, megestrol, melphalan, mercaptopurine, methotrexate, 1-methyl-4-phenylpyridinium, MG132, mitomycin, mitoxantrone, MLN518, MLN4924, MS-275, mycophenolic acid, mitomycin C, nitrosoureas, oprelvekin, oxaliplatin, paclitaxel, PARP inhibitors (e.g., rucaparib, niraparib, olaparib, iniparib, talazoparib, and veliparib), PD98059, peplomycin, photosensitizer Pc4, phthalocyanine, pirarubicin, plicamycin, prednisone, procarbazine, PTK787, PU24FC1, PU3, radicicol, raloxifene, rapamycin, raltitrexed, retinoids such as pheuretinide, ribavirin, rituximab (Rituxin®), sorafenib, staurosporine, steroids such as dexamethasone and prednisone, suberoylanilide hydroxamic acid, tamoxifen, taxol, temozolamide, teniposide, thapsigargin, thioguanine, thrombospondin-1, tiazofurin, topotecan, trapoxin, trastuzumab, treosulfan, trichostatin A, trimetrexate, trofosfamide, tumor necrosis factor, valproic acid, VER49009, verapamil, vertoporfin, vinblastine, vincristine, vindesine, vinorelbine vitamin D3, VX-680, zactima, ZK-EPO, zorubicin, bevacizumab, enzastaurin, temsirolimus, cilengitide, lapatinib, sunitinib, axitinib, pazopanib, vemurafenib, dabrafenib, JQ1 or combinations thereof.

The disclosed compounds may be included in kits comprising the compound [e.g., one or more compounds of formula (I)], a systemic or topical composition described above, or both; and information, instructions, or both that use of the kit will provide treatment for medical conditions in mammals (particularly humans). The information and instructions may be in the form of words, pictures, or both, and the like. In addition, or in the alternative, the kit may include the medicament, a composition, or both; and information, instructions, or both, regarding methods of application of medicament, or of composition, preferably with the benefit of treating or preventing medical conditions in mammals (e.g., humans).

5. Biological Activity

Biological Example 1. Fluorescence Polarization Anisotropy Assay

Compounds of the present invention were assessed for their ability to bind to WDR5 using a competition-based fluorescence polarization anisotropy assay, similar to the method previously described. (Thomas, Fesik, Tansey, et al, *Molecular Cell* 2015 (58): 440-452). Fluorescence polarization measurements were performed in 384-well plates (Greiner Bio One) using a Cytation 3 plate reader (BioTek). Fluorescein isothiocyanate (FITC)-labeled peptide probe (FITC-AHx-SEEEIDVVSV) was purchased from GenScript USA Inc and used without further purification. Fluorescein isothiocyanate (FITC)-labeled small molecule probes were synthesized using procedures analogous to the procedures described above. The assay buffer contained 200 mM phosphate, 300 mM NaCl, and 0.5 mM TCEP and 0.1% Chaps at pH 6.0. Compounds were serially diluted in assay buffer at a top concentration sufficient to yield a 9-point dose-response curve. The change in fluorescence anisotropy was measured and used to calculate an $IC_{50}$ (inhibitor concentration at which 50% of bound probe is displaced) by fitting the inhibition data using a single-site binding model implemented in the XL Fit software (XLfit). This was converted into a binding dissociation constant ($K_i$ value) according to the formula:

$$K_i = [I]50/([L]50/K_d + [P]0/K_d + 1)$$

where [I]50 is the concentration of the free inhibitor at 500% inhibition, [L]50 is the concentration of the free labeled ligand at 50% inhibition, [P]0 is the concentration of the free protein at 0% inhibition, and $K_d$ represents the dissociation constant of the FITC labeled probe (Nikolovska-Coleska et al., 2004).

Data shown in Table 1 below represents a $K_i$ determined from this method for each Example, using a FITC small molecule probe N-(4-(3-((5-bromo-3-chloro-2-hydroxyphenyl)sulfonamido)-5-chloro-2-hydroxybenzamido)butyl)-3',6'-dihydroxy-3-oxo-3H-spiro[isobenzofuran-1,9'-xanthene]-5-carboxamide).

TABLE 1

| Example | $K_i$ (µM) |
|---|---|
| 1 | 0.16 |
| 2 | 0.21 |
| 3 | 0.52 |
| 4 | 1.05 |
| 5 | 0.82 |
| 6 | 12.04 |
| 7 | 7.56 |
| 8 | 3.88 |
| 9 | 0.13 |
| 10 | 0.12 |
| 11 | 16.97 |
| 12 | 2.11 |
| 13 | 3.51 |
| 14 | 2.57 |
| 15 | 4.03 |
| 16 | 19.24 |
| 17 | 0.66 |
| 18 | 0.97 |
| 19 | 1.37 |
| 20 | 10.76 |
| 21 | 5.50 |
| 22 | 4.37 |
| 23 | >40 |
| 24 | 32.75 |
| 25 | 37.71 |
| 26 | 0.04 |
| 27 | 4.29 |
| 28 | 0.07 |
| 29 | 0.26 |
| 30 | 0.13 |
| 31 | 10.35 |
| 32 | 0.10 |
| 33 | 23.09 |
| 34 | 0.15 |
| 35 | 1.10 |
| 36 | 3.64 |
| 37 | 0.12 |
| 38 | 2.97 |
| 39 | 27.75 |
| 40 | 3.90 |
| 41 | 15.70 |
| 42 | 1.79 |
| 43 | 13.61 |
| 44 | 0.34 |
| 45 | 5.31 |
| 46 | 7.85 |
| 47 | 2.25 |
| 48 | 8.48 |
| 49 | 2.30 |
| 50 | 0.37 |
| 51 | 0.46 |
| 52 | 3.80 |
| 53 | 1.79 |
| 54 | 0.99 |

Biological Example 2. Co-Immunoprecipitation Experiments

Some compounds of the present invention were also assessed for their ability to interrupt the binding between MYC and WDR5 in whole cells and/or cellular lysates.

To prepare the cells, procedures analogous to the following procedures were used. HEK293 cells stably expressing MYC2HA were made by retroviral transduction followed by selection in Hygromycin (50 µg/mL). The mixed population was then infected with pBabe-Puro expressing GFP or WDR5 with selection in puromycin (1 µg/mL). For retroviral transductions, HEK293T cells were transfected with the appropriate pBabe vector, the pCL10A packaging vector, and pMax-GFP to estimate transfection efficiency. Viral supernatant was collected and used to infect HEK293 class over three days. HEK293 cells were maintained in DMEM supplemented with 10% FBS. Hygromycin B (50 µg/mL) and puromycin (100 ng/mL) were added to media to maintain plasmid expression. Both cell lines were tested and confirmed negative of mycoplasma using the VenorGem PCR test kit (Sigma Aldrich). After thawing from liquid nitrogen, cells were passaged at least twice before use in experiments, and passaged for a maximum of 25 times.

To assess inhibition of binding between MYC and WDR5 in cell lysates, procedures analogous to the following procedures were used. HEK293 cells were harvested and lysates were prepared on ice in lysis buffer (50 mM Tris-HCl pH 8.0, 150 mM NaCl, 5 mM EDTA, 1% Triton X100 and supplemented with protease and phosphatase inhibitors). Equal amounts of protein lysate were treated with 50 µM of the indicated compound and were subject to immunoprecipitation with M2 agarose overnight (for WDR5-c-MYC). Immune complexes were recovered, washed in lysis buffer, and resolved by SDS-PAGE. Immunoblotting was performed using the indicated primary antibodies (the following primary antibodies were used for this study: α-c-MYC (#5605), α-WDR5 (#13105), α-FLAG (#8146) all purchased from Cell Signaling), incubated with labeled secondary antibodies and membranes were scanned using the Odyssey imager (LiCor).

The results of co-immunoprecipitation experiments for selected compounds of the invention tested at 50 µM are shown in the FIG. 1.

Figure 2:
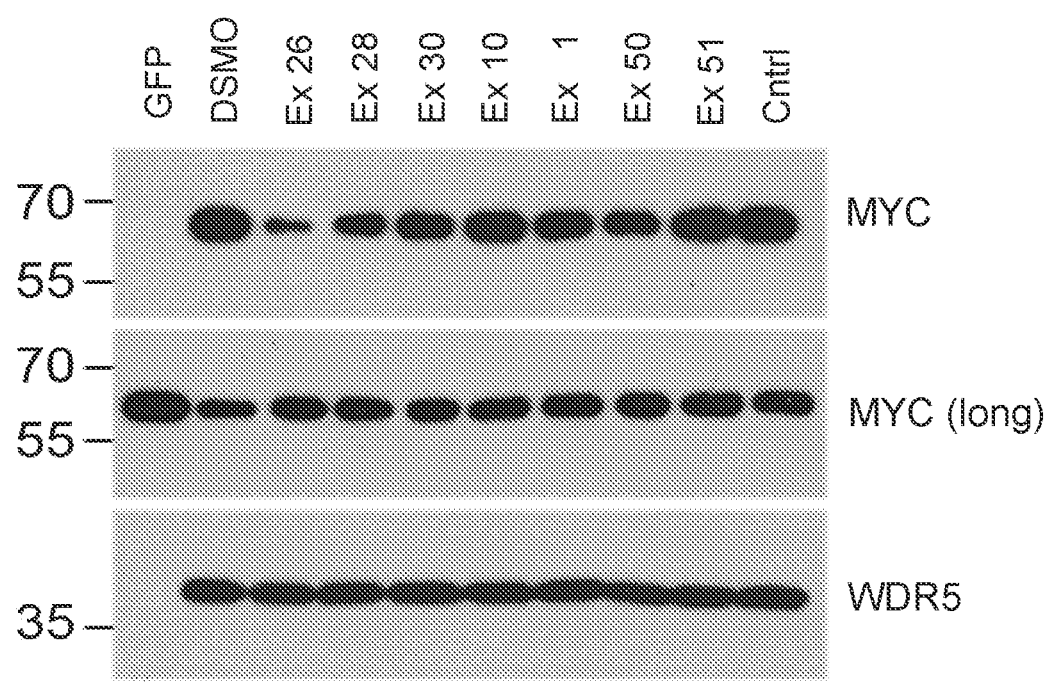
FIG. 2 shows the inhibition of binding between MYC and WDR5 in whole cells for selected example compounds at a concentration of 5 μM, as described in Biological Example 2.

To assess inhibition of binding between MYC and WDR5 in whole cells, procedures analogous to the following procedures were used. HEK293 cells were grown to approximately 70% confluence, washed once with PBS, then treated for 24 h with 5 µM of compound in OptiMEM media before harvesting. Cells were harvested and lysates were prepared on ice in lysis buffer (50 mM Tris-HCl pH 8.0, 150 mM NaCl, 5 mM EDTA, 1% Triton X100 and supplemented with protease and phosphatase inhibitors). Equal amounts of protein lysate were subjected to immunoprecipitation with M2 agarose overnight at 4° C. and immune complexes were recovered, washed in lysis buffer, and resolved by SDS-PAGE. Immunoblotting was performed using the indicated primary antibodies. Results are shown in FIG. 2.

Biological Example 3. Disruption of Binding of MYC to Chromatin

HEK293 cells expressing HA-tagged MYC and GFP were plated in growth media. Upon reaching approximately 70% confluence, cells were washed once with PBS then treated for 10 h with 20 µM compound in OptiMEM media. Cells were cross linked at room temperature in PBS containing 1% Formaldehyde for 10 minutes, then cells were scraped into 1.5 mL PBS supplemented with 125 mM Glycine. Cells were collected by centrifugation, washed once with PBS+ 125 mM Glycine, and pellets stored frozen. Chromatin was prepared by lysing cells at $80 \times 10^6$ per mL in ChIP Lysis Buffer (50 mM Tris pH 8.0, 140 mM NaCl, 1 mM EDTA, 1% Triton, 1% SDS and supplemented with protease inhibitor cocktail), Samples were sonicated (BioRuptor) for 30 minutes and cleared by centrifugation. Precipitation was performed essentially as described [Thomas L R 2015 Mol Cell] by diluting chromatin 1:9 in ChIP buffer without SDS. Decrosslinked DNA was diluted to 500 µL with water and 7.5 µL was used for each qPCR reaction. Percent input was calculated by comparison to a 30-fold dilution of decrosslinked chromatin. Primers used for ChIP have been described in Thomas, L. R.; Adams, C. M.; Wang, J.; Weissmiller, A. M.; Creighton, J.; Lorey, S. L.; Liu, Q.; Fesik, S. W.; Eischen, C. M.; Tansey, W. P. Interaction of the Oncoprotein Transcription Factor MYC with its Chromatin Cofactor WDR5 is Essential for Tumor Maintenance. *Proc. Natl. Acad. Sci. U.S.A.* 2019, 116 (50), 1-9. doi.org/10.1073/pnas.1910391116.

Figure 3:
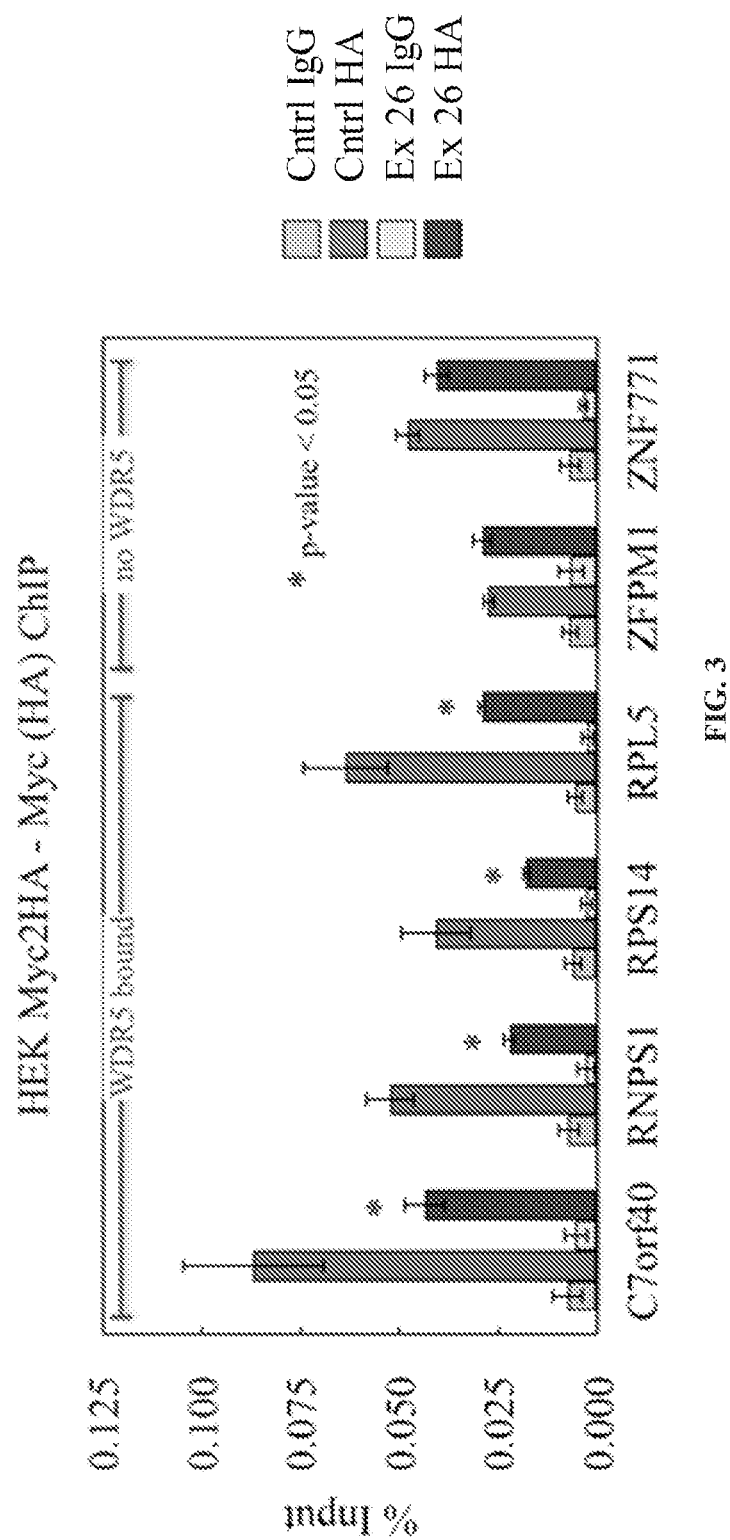
FIG. 3 shows disruption of binding of MYC to target genes for Example 26.
Figure 4:
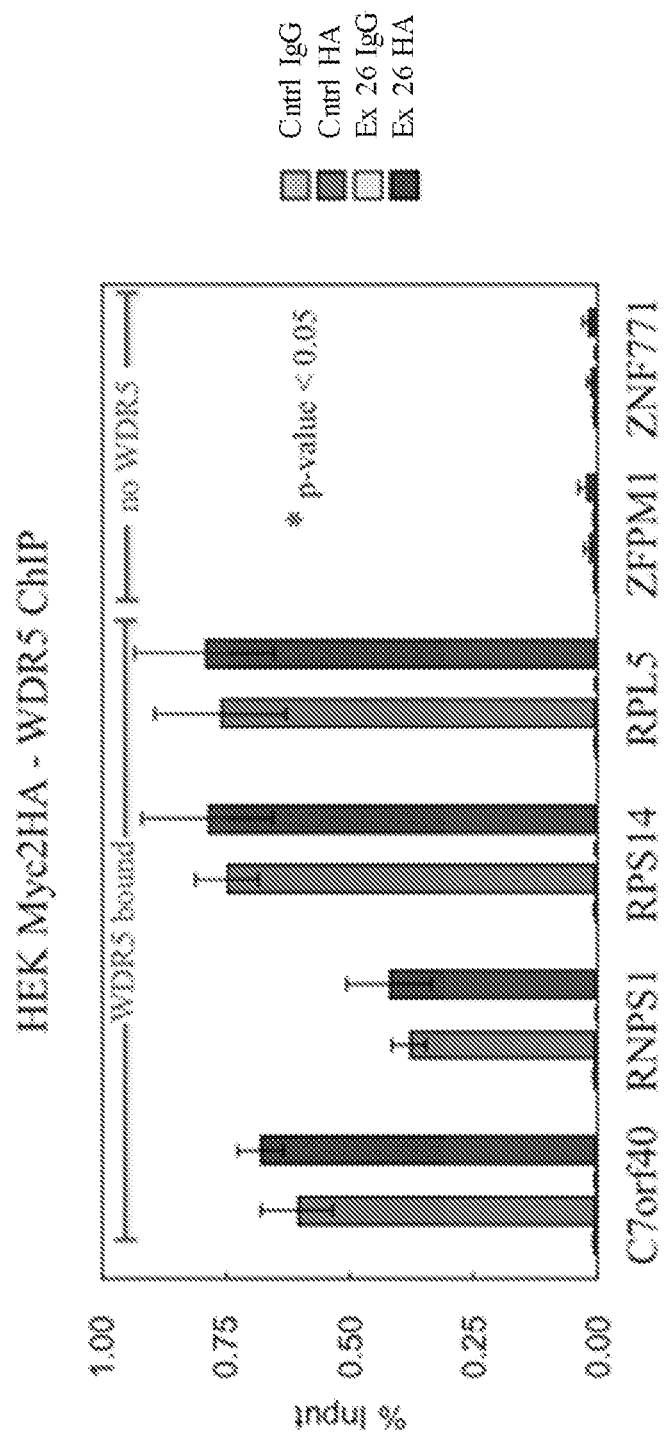
FIG. 4 shows that Example 26 does not affect WDR5 binding to chromatin.

A reduction was observed in the amount of MYC at loci where MYC recruitment is dependent on WDR5 (C7orf40, RNPS1, RPS14, and RPL5) when cells were treated with 20 µM of Example 26 for 10 h. The amount of MYC remained nearly unaffected at ZFPM1 and ZMF771, two sites where MYC binding is independent of WDR5 (FIG. 3). This result was not due to altered expression or binding of WDR5 to these loci because ChIP experiments for WDR5 demonstrated comparable levels between cells treated with Example 26 and a negative control compound that does not bind WDR5 (FIG. 4).

Biological Example 4. Inhibition of Biochemical Histone Methyl Transferase Activity Histone methyltransferase activity was assessed in a radiometric HotSpot assay using a complex consisting of the MLL1 complex, WDR5, RBBP5, ASH2L, and DPY30. Compound performance is measured over 10 doses. A functional effect of compounds binding to WDR5 is shown in Table 2, as they inhibited the biochemical histone methyltransferase activity of MLL-1 in the full WDR5, RBBP5, ASH2L, and DPY30 (WRAD) complex. It is known that a functional WRAD MLL complex requires binding of proteins to both the WIN and WBM site of WDR5; these data confirm that disrupting the interaction at the WBM site can inactivate the transferase activity of the complex, presumably by disrupting the interaction of WDR5-RBBP5, thus preventing the assembly of the WRAD complex.

TABLE 2

| Compound | FPA $K_d$ (µM) | HMT $IC_{50}$ (µM)$^a$ |
| --- | --- | --- |
| Ex 50 | 0.5 ± 0.1 | 2.05 |
| Ex 28 | 0.11 ± 0.03 | 0.581 |
| Ex 30 | 0.17 ± 0.03 | 1.08 |
| Ex 26 | 0.10 ± 0.01 | 0.404 |

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

REFERENCES

Conacci-Sorrell M, McFerrin L, Eisenman R N. 2014. An overview of MYC and its interactome. *Cold Spring Harbor perspectives in medicine* 4: a014357.

Dang C V. 2011. Therapeutic targeting of Myc-reprogrammed cancer cell metabolism. *Cold Spring Harbor symposia on quantitative biology* 76: 369-374.

Delmore J E, Issa G C, Lemieux M E, Rahl P B, Shi J, Jacobs H M, Kastritis E, Gilpatrick T, Paranal R M, Qi J et al. 2011. BET bromodomain inhibition as a therapeutic strategy to target c-Myc. *Cell* 146: 904-917.

Lorenzin F, Benary U, Baluapuri A, Walz S, Jung L A, von Eyss B, Kisker C, Wolf J, Eilers M, Wolf E. 2016. Different promoter affinities account for specificity in MYC-dependent gene regulation. *eLife* 5:e15161.

Soucek L, Whitfield J R, Sodir N M, Masso-Valles D, Serrano E, Karnezis A N, Swigart L B, Evan G I. 2013. Inhibition of Myc family proteins eradicates KRas-driven lung cancer in mice. *Genes Dev* 27: 504-513.

Sun Y, Bell J L, Carter D R, Gherardi S, Poulos R C, Milazzo G, Wong J W, Al-Awar R, Tee A E, Liu P Y et al. 2015. WDR5 supports an N-Myc transcriptional complex that drives a pro-tumorigenic gene expression signature in neuroblastoma. *Cancer Res.* 75: 5143-5154.

Tansey W P. 2014. Mammalian MYC proteins and cancer. *New Journal of Science* 2014: 1-27.

Thomas L R, Wang Q, Grieb B C, Phan J, Foshage A M, Sun Q, Olejniczak E T, Clark T, Dey S, Lorey S et al. 2015. Interaction with WDR5 Promotes Target Gene Recognition and Tumorigenesis by MYC. *Mol Cell* 58: 440-452.

What is claimed is:

1. A compound of formula (I), or a pharmaceutically acceptable salt thereof,

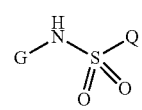

(I)

wherein
G is

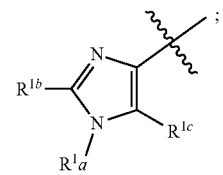

$R^{1a}$ is $G^1$, hydrogen, $C_{1-8}$alkyl, $C_{1-8}$haloalkyl, —C(O)$R^b$, —$C_{1-6}$alkylene-$G^1$, or —CH($G^1$)$_2$;
$R^{1b}$ is —SO$_2$$R^a$, hydrogen, $C_{1-8}$alkyl, $C_{1-8}$haloalkyl, —C(O)$R^b$, —C(O)O$R^b$, —C(O)N($R^b$)$_2$, or $G^1$;
$R^{1c}$ is hydrogen or $C_{1-4}$alkyl;
Q is

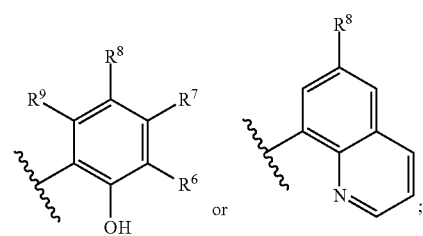

$R^a$, at each occurrence, is independently $C_{1-8}$alkyl, $C_{1-8}$haloalkyl, $G^1$, —$C_{1-6}$alkylene-$G^1$, —CH$(G^1)_2$, or -$G^1$-$G^2$, $R^b$, at each occurrence, is independently hydrogen, $C_{1-8}$alkyl, $C_{1-8}$haloalkyl, $G^1$, —$C_{1-6}$alkylene-$G^1$, —CH$(G^1)_2$, or -$G^1$-$G^2$, $G^1$ and $G^2$, at each occurrence, are independently a $C_{3-12}$carbocyclyl, a 6- to 12-membered aryl, a 4- to 12-membered heterocyclyl, or a 5- to 12-membered heteroaryl, wherein $G^1$ and $G^2$ are independently unsubstituted or substituted with 1-5 substituents independently selected from the group consisting of halogen, $C_{1-4}$alkyl, $C_{1-4}$haloalkyl, oxo, $X^2$, and —$C_{1-6}$alkylene-$X^2$;

$X^2$ is cyano, —OR$^{10}$, —N(R$^{10}$)$_2$, —C(O)R$^{10}$, —SR$^{10}$, —SOR$^{10}$, —SO$_2$R$^{10}$, —C(O)OR$^{10}$, —C(O)N(R$^{10}$)$_2$, —SO$_2$N(R$^{10}$)$_2$, —N(R$^{10}$)C(O)R$^{10}$, —N(R$^{10}$)C(O)OR$^{10}$, —N(R$^{10}$)C(O)N(R$^{10}$)$_2$, or —N(R$^{10}$)SO$_2$R$^{10}$, $R^{10}$ is hydrogen, $C_{1-4}$alkyl, —$C_{1-4}$haloalkyl, $C_{3-6}$cycloalkyl, or —$C_{1-3}$alkylene-$C_{3-6}$cycloalkyl, wherein alternatvely two R$^{10}$, together with a common nitrogen to which they attach, form a 4- to 8-membered heterocyclyl optionally substituted with 1-4 substituents independently selected from the group consisting of halogen, $C_{1-4}$alkyl, $C_{1-4}$haloalkyl, and oxo;

$R^6$ is halogen, hydrogen, cyano, C(O)OH, SF$_5$, NO$_2$, $C_{1-4}$alkyl, $C_{1-4}$haloalkyl, —OC$_{1-4}$alkyl, —OC$_{1-4}$haloalkyl, —$C_{1-6}$alkylene-OH, —$C_{1-6}$alkylene-OC$_{1-4}$alkyl, $C_{3-6}$cycloalkyl, or a 4- to 7-membered heterocyclyl, wherein the cycloalkyl and heterocyclyl are optionally substituted with 1-4 substituents independently selected from the group consisting of halogen, cyano, $C_{1-4}$alkyl, and $C_{1-4}$haloalkyl;

$R^8$ is halogen, hydrogen, cyano, SF$_5$, NO$_2$, $C_{1-4}$alkyl, $C_{1-4}$haloalkyl, —OC$_{1-4}$alkyl, —OC$_{1-4}$haloalkyl, or $C_{3-6}$cycloalkyl; and $R^7$ and $R^9$ are independently hydrogen, halogen, cyano, SF$_5$, NO$_2$, $C_{1-4}$alkyl, $C_{1-4}$haloalkyl, —OC$_{1-4}$alkyl, —OC$_{1-4}$haloalkyl, or $C_{3-6}$cycloalkyl.

2. The compound of claim 1, or a pharmaceutically acceptable salt thereof, wherein
$R^{1a}$ is $G^1$, hydrogen, $C_{1-8}$alkyl, $C_{1-8}$haloalkyl, —C(O)$G^1$, —$C_{1-6}$alkylene-$G^1$, or —CH$(G^1)_2$; and
$R^{1b}$ is —SO$_2$C$_{1-8}$alkyl, hydrogen, $C_{1-8}$alkyl, $C_{1-8}$haloalkyl, —C(O)$G^1$, —C(O)$G^1$-$G^2$, —C(O)OC$_{1-8}$alkyl, COOH, —C(O)NH$_2$, —C(O)NHC$_{1-8}$alkyl, —C(O)N(C$_{1-8}$alkyl)$_2$, or $G^1$.

3. The compound of claim 2, or a pharmaceutically acceptable salt thereof, wherein:
$G^1$ and $G^2$ are each independently a $C_{3-8}$cycloalkyl, phenyl, or a 4- to 8-membered heterocyclyl, wherein $G^1$ and $G^2$ are independently unsubstituted or substituted with 1-5 substituents independently selected from the group consisting of halogen, cyano, $C_{1-4}$alkyl, $C_{1-4}$haloalkyl, oxo, —OR$^{10}$, —N(R$^{10}$)$_2$, —$C_{1-6}$alkylene-OR$^{10}$, and —$C_{1-6}$alkylene-N(R$^{10}$)$_2$.

4. The compound of claim 1, or a pharmaceutically acceptable salt thereof, wherein:
$R^{1a}$ is a $C_{3-6}$cycloalkyl, $C_{1-8}$alkyl, $C_{1-8}$haloalkyl, —C(O)$C_{3-6}$cycloalkyl, phenyl, —CH(C$_{3-6}$cycloalkyl)$_2$, —$C_{1-3}$alkylene-$C_{3-6}$cycloalkyl, or —$C_{1-3}$alkylene-$G^1$, wherein the phenyl is optionally substituted with 1-5 substituents independently selected from the group consisting of halogen, cyano, $C_{1-4}$alkyl, $C_{1-4}$haloalkyl, and —OC$_{1-4}$alkyl;

$R^{1b}$ is —SO$_2$C$_{1-8}$alkyl, hydrogen, $C_{1-8}$alkyl, $C_{1-8}$haloalkyl, —C(O)$G^1$, —C(O)$G^1$-$G^2$, —C(O)OC$_{1-8}$alkyl, COOH, —C(O)NH$_2$, —C(O)NHC$_{1-8}$alkyl, or —C(O)N(C$_{1-8}$alkyl)$_2$;

$R^{1c}$ is hydrogen or $C_{1-4}$alkyl; and $G^1$ and $G^2$ are each independently a 4- to 8-membered heterocyclyl, wherein $G^1$ and $G^2$ are independently optionally substituted with 1-5 substituents independently selected from the group consisting of $C_{1-4}$alkyl, $C_{1-4}$haloalkyl, oxo, —OR$^{10}$, —N(R$^{10}$)$_2$, —$C_{1-6}$alkylene-OR$^{10}$, or —$C_{1-6}$alkylene-N(R$^{10}$)$_2$.

5. The compound of claim 1, or a pharmaceutically acceptable salt thereof, wherein G is:

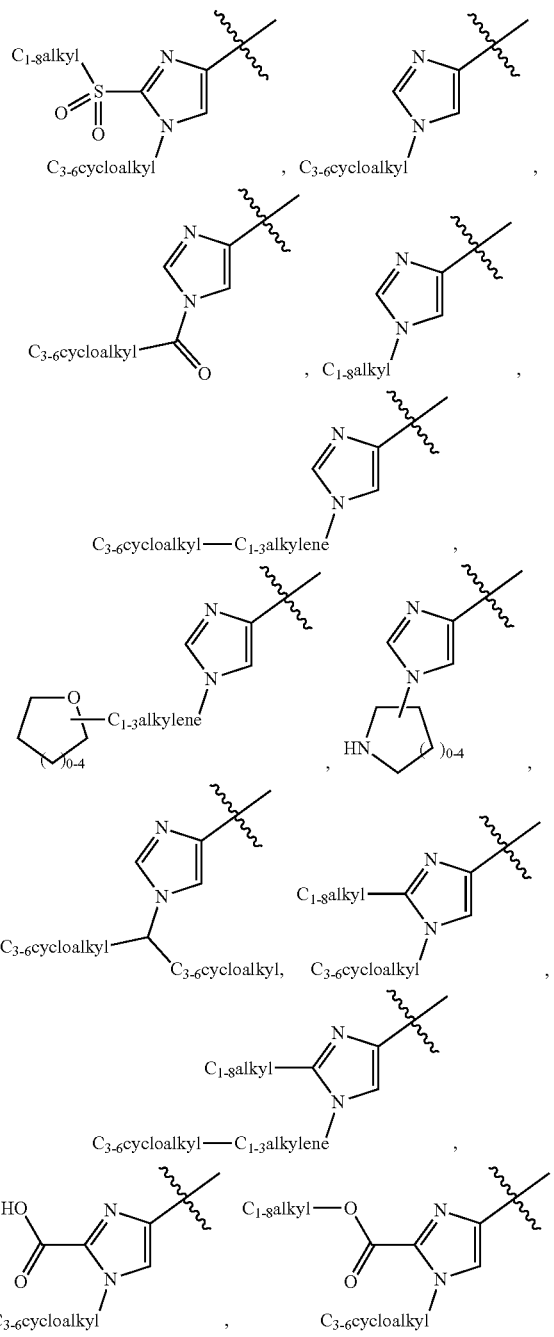

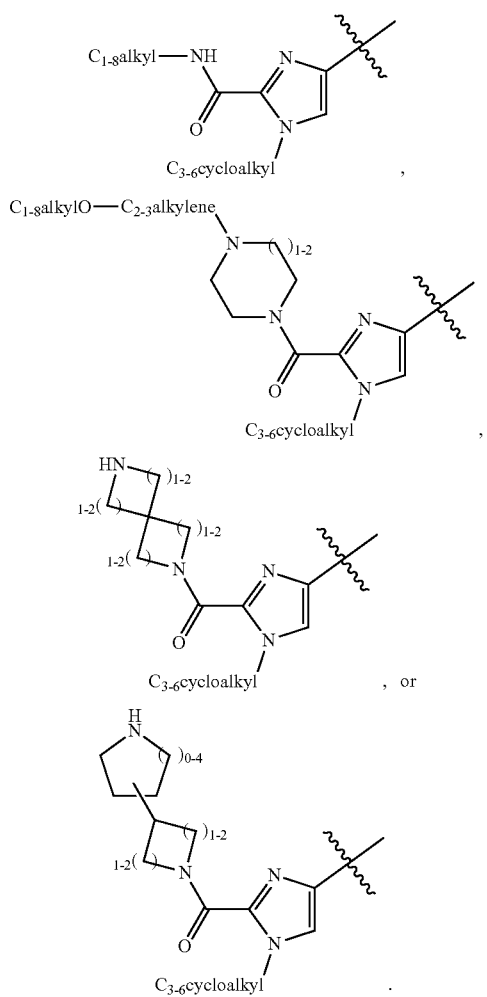

6. The compound of claim 1, or a pharmaceutically acceptable salt thereof, wherein
Q is

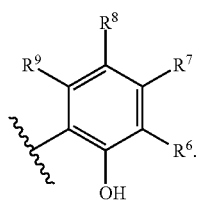

7. The compound of claim 6, or a pharmaceutically acceptable salt thereof, wherein
$R^7$ and $R^9$ are hydrogen.

8. The compound of claim 7, or a pharmaceutically acceptable salt thereof, wherein
$R^6$ and $R^8$ are halogen.

9. The compound of claim 1, or a pharmaceutically acceptable salt thereof, wherein
Q is

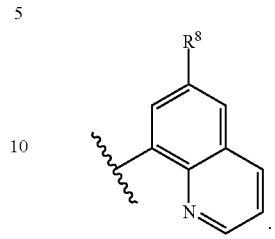

10. The compound of claim 9, or a pharmaceutically acceptable salt thereof, wherein
$R^8$ is halogen.

11. The compound of claim 1 selected from the group consisting of
5-Bromo-3-chloro-N-(1-cyclopentyl-2-(methylsulfonyl)-1H-imidazol-4-yl)-2-hydroxybenzenesulfonamide;
5-Bromo-3-chloro-N-(1-cyclopentyl-1H-imidazol-4-yl)-2-hydroxybenzenesulfonamide;
5-Bromo-3-chloro-N-(1-cyclobutyl-1H-imidazol-4-yl)-2-hydroxybenzenesulfonamide;
5-Bromo-3-chloro-N-(1-cyclohexyl-1H-imidazol-4-yl)-2-hydroxybenzenesulfonamide;
5-Bromo-3-chloro-N-(1-phenyl-1H-imidazol-4-yl)-2-hydroxybenzenesulfonamide;
5-Bromo-3-chloro-N-(1-(cyclopropylmethyl)-1H-imidazol-4-yl)-2-hydroxybenzenesulfonamide;
5-Bromo-3-chloro-N-(1-(cyclobutanecarbonyl)-1H-imidazol-4-yl)-2-hydroxybenzenesulfonamide;
5-Bromo-3-chloro-N-(1-(cyclopentanecarbonyl)-1H-imidazol-4-yl)-2-hydroxybenzenesulfonamide;
5-Bromo-3-chloro-N-(1-cyclopropyl-1H-imidazol-4-yl)-2-hydroxybenzenesulfonamide;
5-Bromo-3-chloro-N-(1-cyclopentyl-2-methyl-1H-imidazol-4-yl)-2-hydroxybenzenesulfonamide
5-Bromo-3-chloro-N-(1-cyclopentyl-2-ethyl-1H-imidazol-4-yl)-2-hydroxybenzenesulfonamide;
5-Bromo-3-chloro-N-(1-cyclopentyl-5-methyl-1H-imidazol-4-yl)-2-hydroxybenzenesulfonamide;
5-Bromo-3-chloro-2-hydroxy-N-(1-isopentyl-1H-imidazol-4-yl) benzenesulfonamide;
5-Bromo-3-chloro-N-(1-(cyclobutylmethyl)-1H-imidazol-4-yl)-2-hydroxybenzenesulfonamide;
5-Bromo-3-chloro-N-(1-(cyclopentylmethyl)-1H-imidazol-4-yl)-2-hydroxybenzenesulfonamide;
5-Bromo-3-chloro-2-hydroxy-N-(1-((tetrahydrofuran-2-yl) methyl)-1H-imidazol-4-yl) benzenesulfonamide;
5-Bromo-2-hydroxy-N-(1-((tetrahydrofuran-2-yl) methyl)-1H-imidazol-4-yl) benzenesulfonamide;
5-Bromo-3-chloro-N-(1-cyclobutyl-2-methyl-1-imidazol-4-yl)-2-hydroxybenzenesulfonamide;
5-Bromo-3-chloro-N-(1-(dicyclopropylmethyl)-1-imidazol-4-yl)-2-hydroxybenzenesulfonamide;
5-Bromo-3-chloro-2-hydroxy-N-(1-(2-(trifluoromethyl) phenyl)-1H-imidazol-4-yl) benzenesulfonamide;
5-Bromo-3-chloro-N-(1-(cyclopropylmethyl)-2-methyl-1H-imidazol-4-yl)-2-hydroxybenzenesulfonamide;
5-Bromo-3-chloro-N-(1-(cyclopentylmethyl)-2-methyl-1H-imidazol-4-yl)-2-hydroxybenzenesulfonamide;
5-Bromo-3-chloro-N-(1-(cyclobutylmethyl)-2-methyl-1H-imidazol-4-yl)-2-hydroxybenzenesulfonamide;

6-Bromo-N-(1-cyclopentyl-1H-imidazol-4-yl) quinoline-8-sulfonamide;

6-Bromo-N-(1-cyclopentyl-2-methyl-1H-imidazol-4-yl) quinoline-8-sulfonamide;

5-Bromo-3-chloro-2-hydroxy-N-(1-isopropyl-1H-imidazol-4-yl) benzenesulfonamide;

Ethyl 4-((5-bromo-3-chloro-2-hydroxyphenyl) sulfonamido)-1-cyclopentyl-1H-imidazole-2-carboxylate;

4-((5-Bromo-3-chloro-2-hydroxyphenyl) sulfonamido)-1-cyclopentyl-1H-imidazole-2-carboxylic acid;

4-((5-Bromo-3-chloro-2-hydroxyphenyl) sulfonamido)-1-cyclopentyl-N-methyl-1H-imidazole-2-carboxamide;

5-Bromo-3-chloro-2-hydroxy-N-(1-(pyrrolidin-3-yl)-1H-imidazol-4-yl) benzenesulfonamide;

5-Bromo-3-chloro-N-(1-cyclopentyl-2-(4-(2-methoxyethyl) piperazine-1-carbonyl)-1H-imidazol-4-yl)-2-hydroxybenzenesulfonamide;

5-Bromo-3-chloro-N-(1-cyclopentyl-2-(2,6-diazaspiro[3.3]heptane-2-carbonyl)-1H-imidazol-4-yl)-2-hydroxybenzenesulfonamide; and 5-Bromo-3-chloro-N-(1-cyclopentyl-2-(4-(pyrrolidin-3-yl) piperidine-1-carbonyl)-1H-imidazol-4-yl)-2-hydroxybenzenesulfonamide;

or a pharmaceutically acceptable salt thereof.

12. A pharmaceutical composition comprising the compound of claim 1, or a pharmaceutically acceptable salt thereof, and a pharmaceutically acceptable carrier.

13. The compound of claim 1, or a pharmaceutically acceptable salt thereof, wherein G is

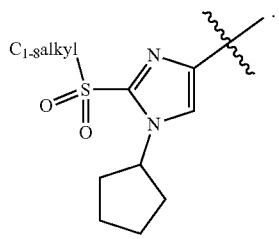

14. The compound of claim 1, or a pharmaceutically acceptable salt thereof, wherein G is

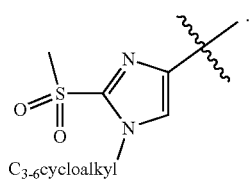

15. The compound of claim 1, or a pharmaceutically acceptable salt thereof, wherein G is

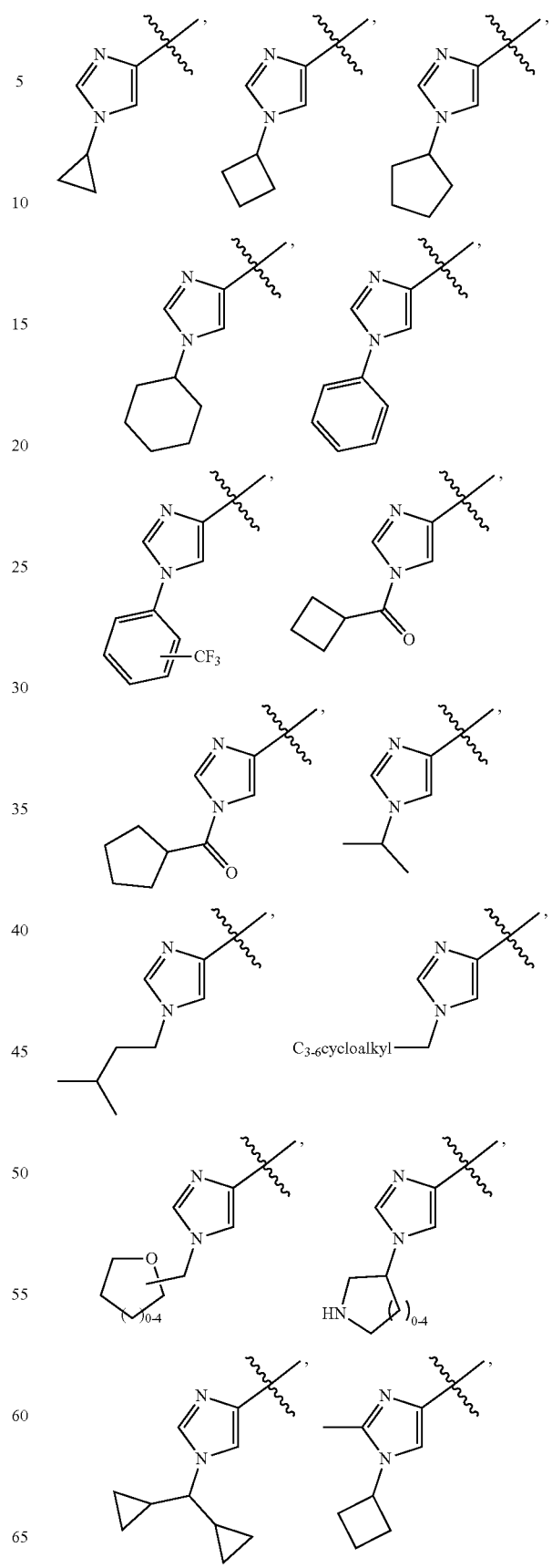

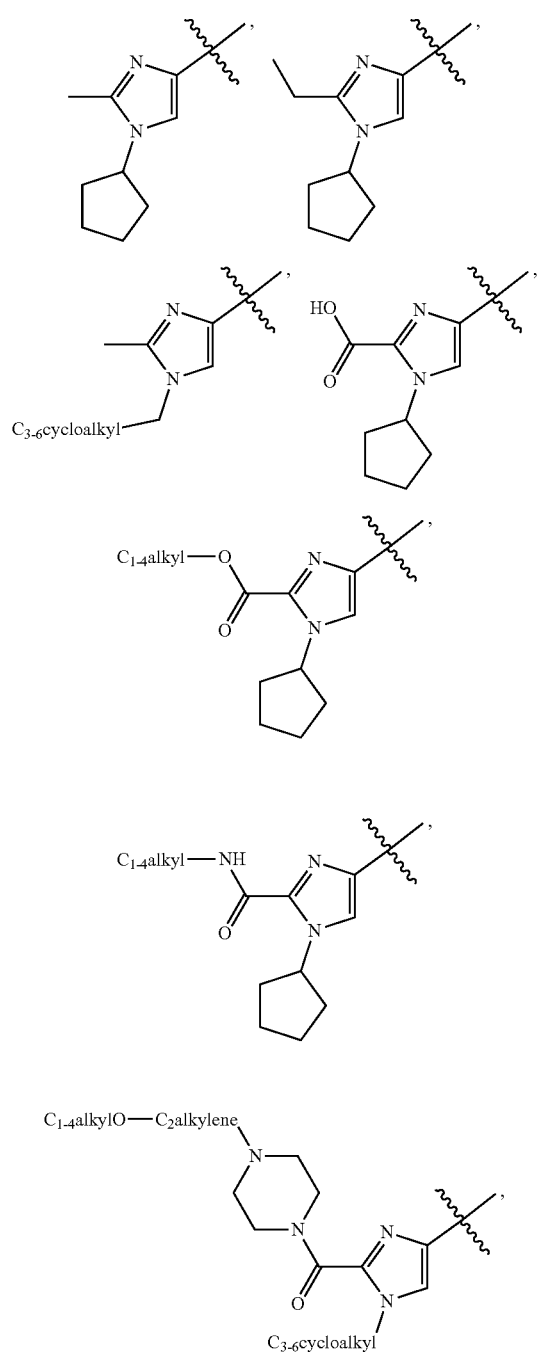
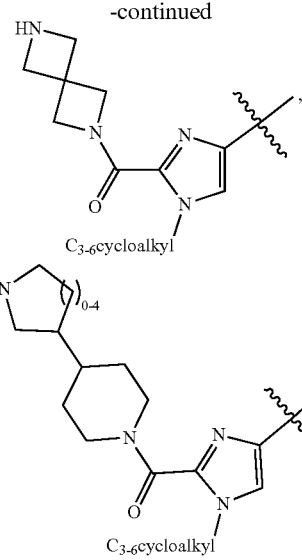
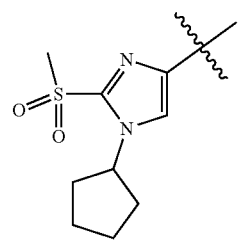
16. The compound of claim 1, or a pharmaceutically acceptable salt thereof, wherein G is
17. The compound of claim 1, or a pharmaceutically acceptable salt thereof, wherein the compound is 5-bromo-3-chloro-N-(1-cyclopentyl-2-(methylsulfonyl)-1H-imidazol-4-yl)-2-hydroxybenzenesulfonamide.
* * * * *